(12) United States Patent
Bland, Jr. et al.

(10) Patent No.: US 11,057,525 B1
(45) Date of Patent: Jul. 6, 2021

(54) COMMUNICATION SYSTEM FOR COVERT AND HANDS-FREE COMMUNICATION

(71) Applicant: BIZLIFE, LLC, Winter Park, FL (US)

(72) Inventors: G. Thomas Bland, Jr., Orlando, FL (US); Erik David Olson, Orlando, FL (US)

(73) Assignee: BIZLIFE, LLC, Winter Park, FL (US)

( * ) Notice: Subject to any disclaimer, the term of this patent is extended or adjusted under 35 U.S.C. 154(b) by 0 days.

(21) Appl. No.: 15/461,079

(22) Filed: Mar. 16, 2017

Related U.S. Application Data

(63) Continuation-in-part of application No. 15/215,021, filed on Jul. 20, 2016, now Pat. No. 10,417,898.

(60) Provisional application No. 62/194,481, filed on Jul. 20, 2015.

(51) Int. Cl.
| | |
|---|---|
| *H04M 3/527* | (2006.01) |
| *H04M 7/00* | (2006.01) |
| *H04M 1/60* | (2006.01) |
| *H04M 3/436* | (2006.01) |

(52) U.S. Cl.
CPC ......... *H04M 3/527* (2013.01); *H04M 1/6041* (2013.01); *H04M 3/436* (2013.01); *H04M 7/0024* (2013.01)

(58) Field of Classification Search
CPC .... H04M 3/527; H04M 3/436; H04M 1/6041; H04M 7/0024
USPC .................................................. 455/404.2
See application file for complete search history.

(56) References Cited

U.S. PATENT DOCUMENTS

| | | |
|---|---|---|
| 4,706,689 A | 11/1987 | Man |
| 5,258,746 A | 11/1993 | Leitten et al. |
| 5,429,301 A | 7/1995 | Franks |
| 5,517,180 A | 5/1996 | Masi et al. |
| 5,629,678 A | 5/1997 | Gargano et al. |
| 5,760,692 A | 6/1998 | Block |
| 6,239,705 B1 | 5/2001 | Glen |
| 6,272,781 B1 | 8/2001 | Resnick |
| 6,317,049 B1 | 11/2001 | Toubia |

(Continued)

OTHER PUBLICATIONS https://m.youtube.com/watch?v=sCli18ChRqo, "Vintage Tear Gas Pen Demonstration," uploaded Jul 28, 2009.

(Continued)

*Primary Examiner* — Farid Seyedvosoghi
(74) *Attorney, Agent, or Firm* — Erica M. Cipparone; Wolter VanDyke Davis, PLLC

(57) ABSTRACT

A communications system embodiment including an input device reactive to user input, circuitry, an output device, and an electronic device communicatively connected to the input device and/or the output device is provided. A tangible non-transitory computer readable medium having program instructions executed by a processor for determining a preselected public or private mode, determining a preselected type of communication for receipt, and filtering the communication based on the mode selected and the type of communication selected as well as whether the sender is on a particular contact list. The communications system embodiment may provide for responding to the incoming communication by speech response or via an input device or an output device, to reduce or eliminate the need for a user of the system to view the electronic device or contact the electronic device to receive or send communications, in some embodiments.

11 Claims, 39 Drawing Sheets

(56) References Cited

U.S. PATENT DOCUMENTS

| | | | |
|---|---|---|---|
| 6,771,186 B1 | 8/2004 | Boveja et al. | |
| 6,828,908 B2 | 12/2004 | Clark | |
| 6,888,464 B1 | 5/2005 | Maloney | |
| 7,486,798 B2 | 2/2009 | Anjanappa et al. | |
| 7,551,079 B2 | 6/2009 | Ortelle | |
| 8,823,491 B2 | 9/2014 | Luke et al. | |
| 9,471,059 B1 | 10/2016 | Wilkins | |
| 9,505,494 B1 | 11/2016 | Marlow et al. | |
| 2002/0008620 A1 | 1/2002 | Whalen | |
| 2002/0137493 A1* | 9/2002 | Dutta | H04M 1/663 455/414.1 |
| 2003/0003926 A1* | 1/2003 | Peters | H04M 1/663 455/458 |
| 2006/0043164 A1* | 3/2006 | Dowling | H04W 40/02 235/375 |
| 2006/0097007 A1 | 5/2006 | Motyka et al. | |
| 2009/0042534 A1 | 2/2009 | Levanen | |
| 2009/0088140 A1* | 4/2009 | Caspi | H04M 1/578 455/415 |
| 2009/0237236 A1 | 9/2009 | Maassarani | |
| 2010/0004032 A1* | 1/2010 | Kuhl | H04M 1/56 455/566 |
| 2010/0238042 A1 | 9/2010 | Paul | |
| 2011/0046920 A1 | 2/2011 | Amis | |
| 2011/0059769 A1* | 3/2011 | Brunolli | G06F 3/04817 455/556.1 |
| 2012/0194976 A1* | 8/2012 | Golko | G06F 1/163 361/679.01 |
| 2012/0196538 A1* | 8/2012 | Mateu Codina | A42B 3/30 455/41.2 |
| 2013/0088352 A1 | 4/2013 | Amis | |
| 2013/0116514 A1 | 5/2013 | Kroner et al. | |
| 2013/0294005 A1 | 11/2013 | Garaycochea | |
| 2014/0057610 A1* | 2/2014 | Olincy | H04W 4/16 455/414.1 |
| 2014/0118140 A1 | 5/2014 | Amis | |
| 2014/0120983 A1* | 5/2014 | Lam | H04M 1/0283 455/557 |
| 2014/0283430 A1 | 9/2014 | Allen et al. | |
| 2015/0065082 A1 | 3/2015 | Sehgal | |
| 2017/0004827 A1* | 1/2017 | Bancalari | G06F 3/16 |
| 2017/0006145 A1* | 1/2017 | Schriefer | H04W 4/20 |
| 2019/0109932 A1* | 4/2019 | Higgins | H04M 1/72541 |

OTHER PUBLICATIONS http://www.pcworld.com/article/3166565/home-tech/logitech-adds-amazon-s-alexa-skills-to-its-zerotouch-android-smartphone-car-mounts.html?idg_eid=b03d069647ea92cd309eb011cb24befb&utm_source=Sailthru&utm_medium=email&utm_campaign=Top%20Stories%20%40PCWorld%202017-02-07&utm_term=pcw_tech_html.

https://www.indiegogo.com/projects/bioringthepersonaltraineronyourfingerfitnessgadget#/1/36Explore, uploaded Apr. 16, 2017.

http://www.bestbuy.com/site/jvc68cddvdbuiltinbluetoothapplecarplayindashreceiverblack/4970400.p?skuld=4970400, uploaded Apr. 16, 2017.

http://mymotiv.com, uploaded Apr. 16, 2017.

http://nfcring.com, uploaded Apr. 6, 2017.

https://ringly.com, uploaded Apr. 6, 2017.

https://sirenring.com/collections/all, uploaded Apr. 6, 2017.

https://www.wareable.com/smartjewellery/bestsmartrings1340, uploaded Apr. 6, 2017.

https://www.indiegogo.com/projects/smartyring3#, uploaded Apr. 6, 2017.

http://www.moodmetric.com, uploaded Apr. 6, 2017.

http://thehightechsociety.com/bluetoothorbstatus, uploaded Apr. 6, 2017.

http://thehightechsociety.com/smartring, uploaded Apr. 6, 2017.

* cited by examiner

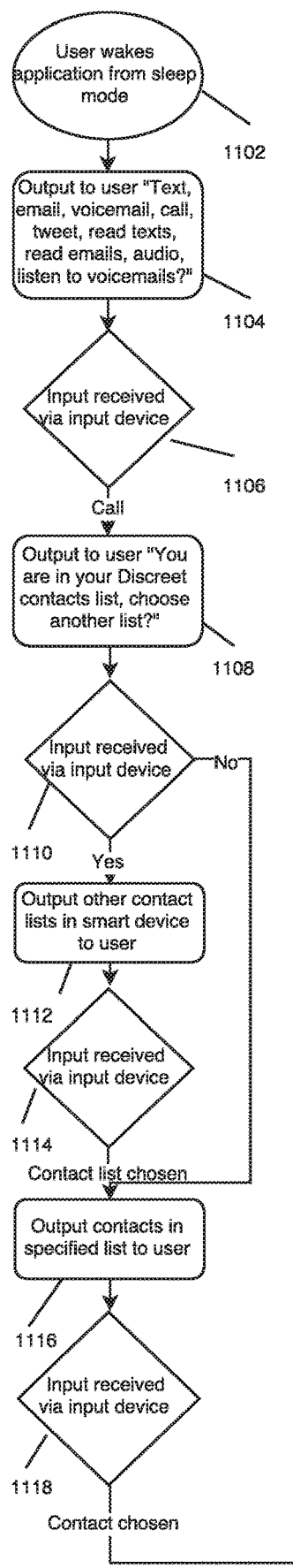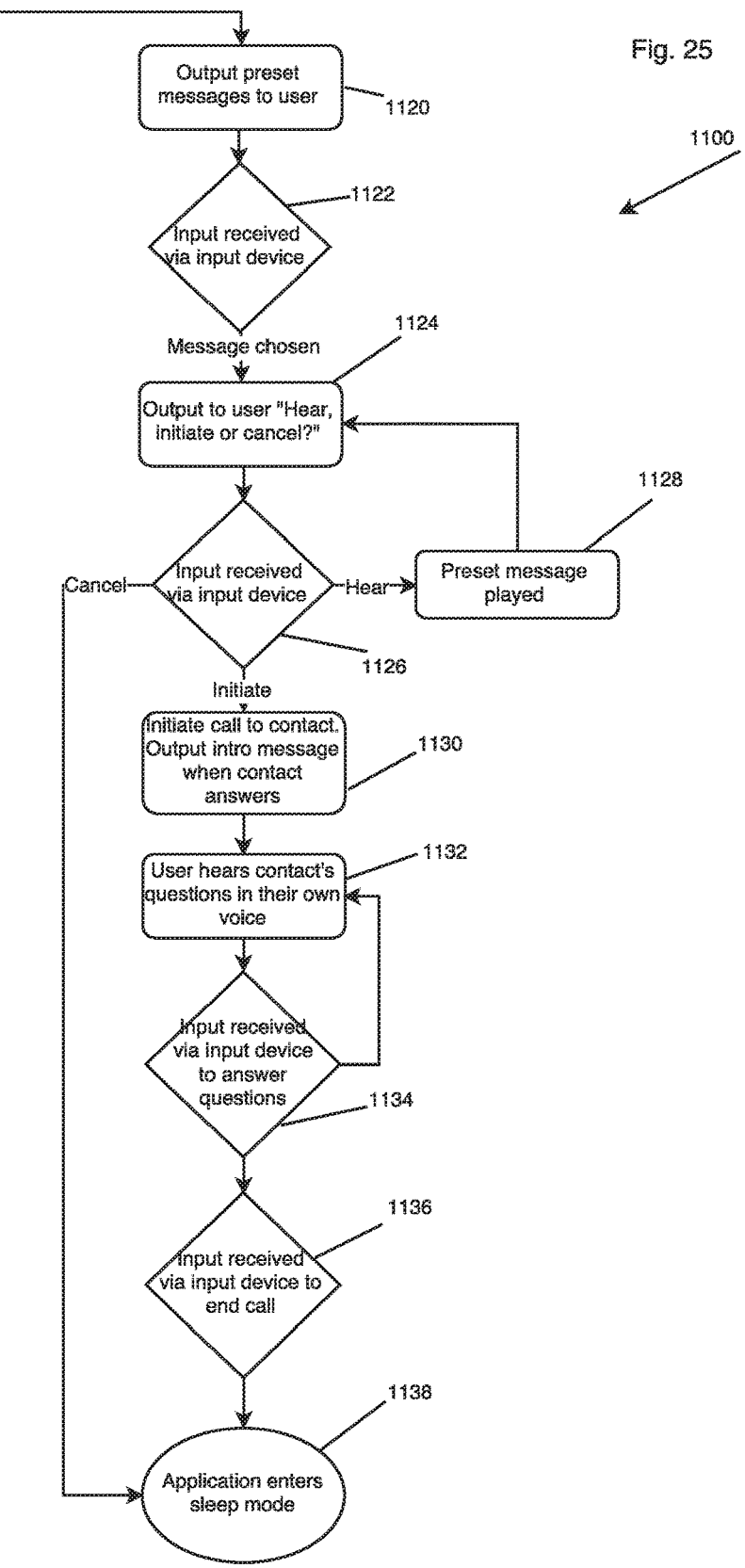
Fig. 25

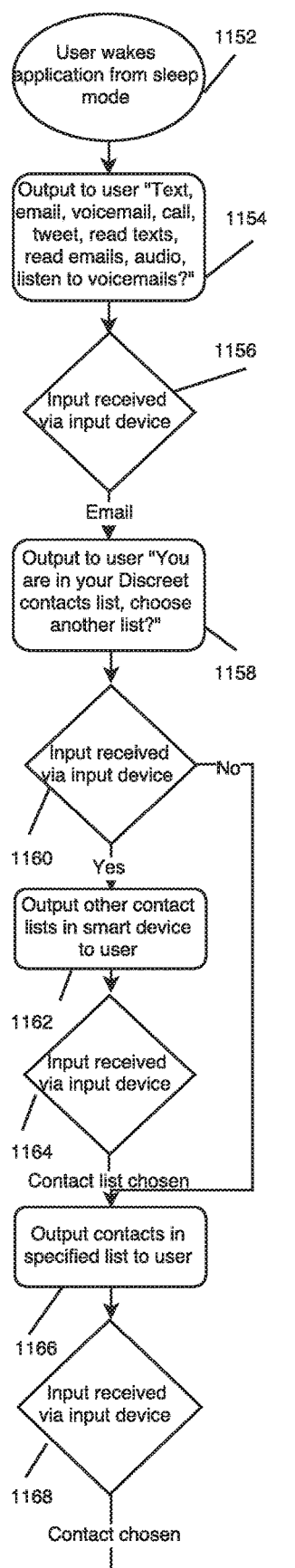
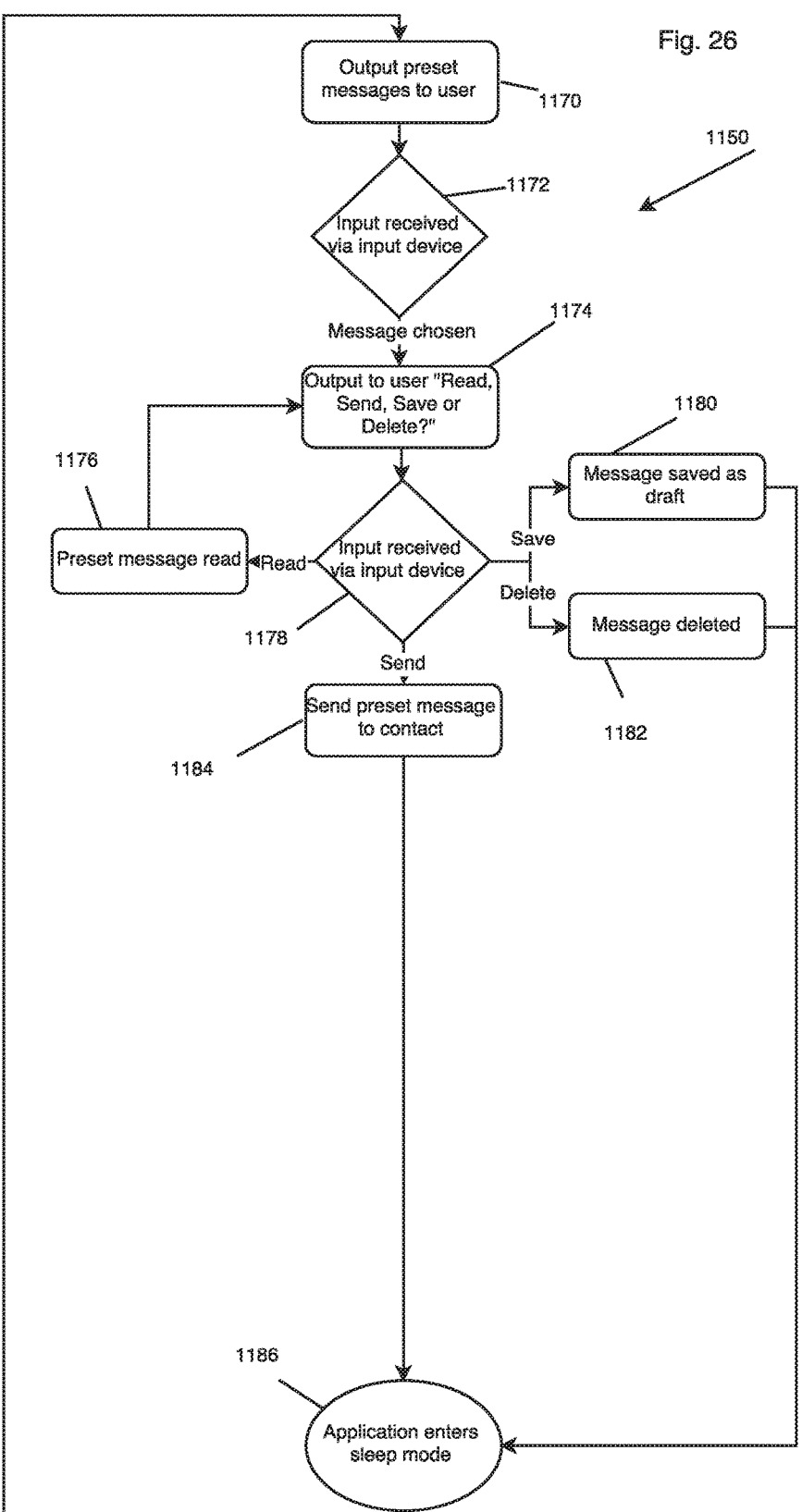
Fig. 26

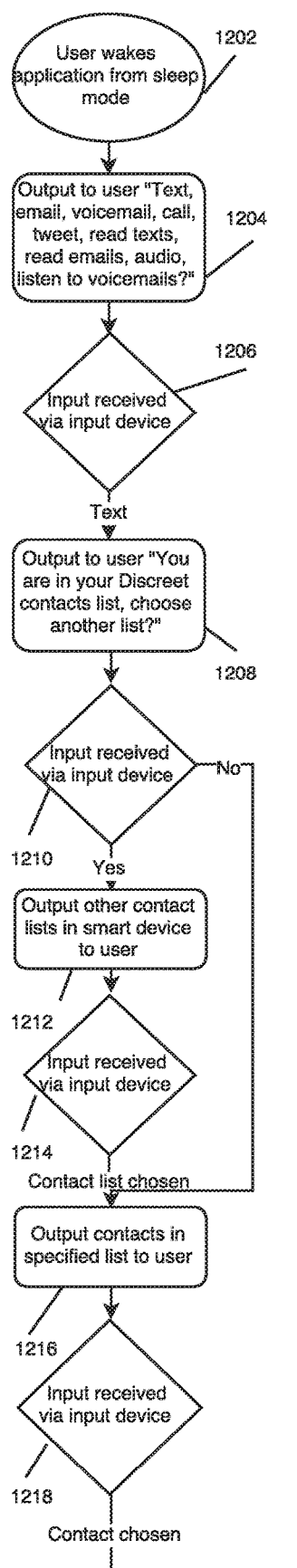
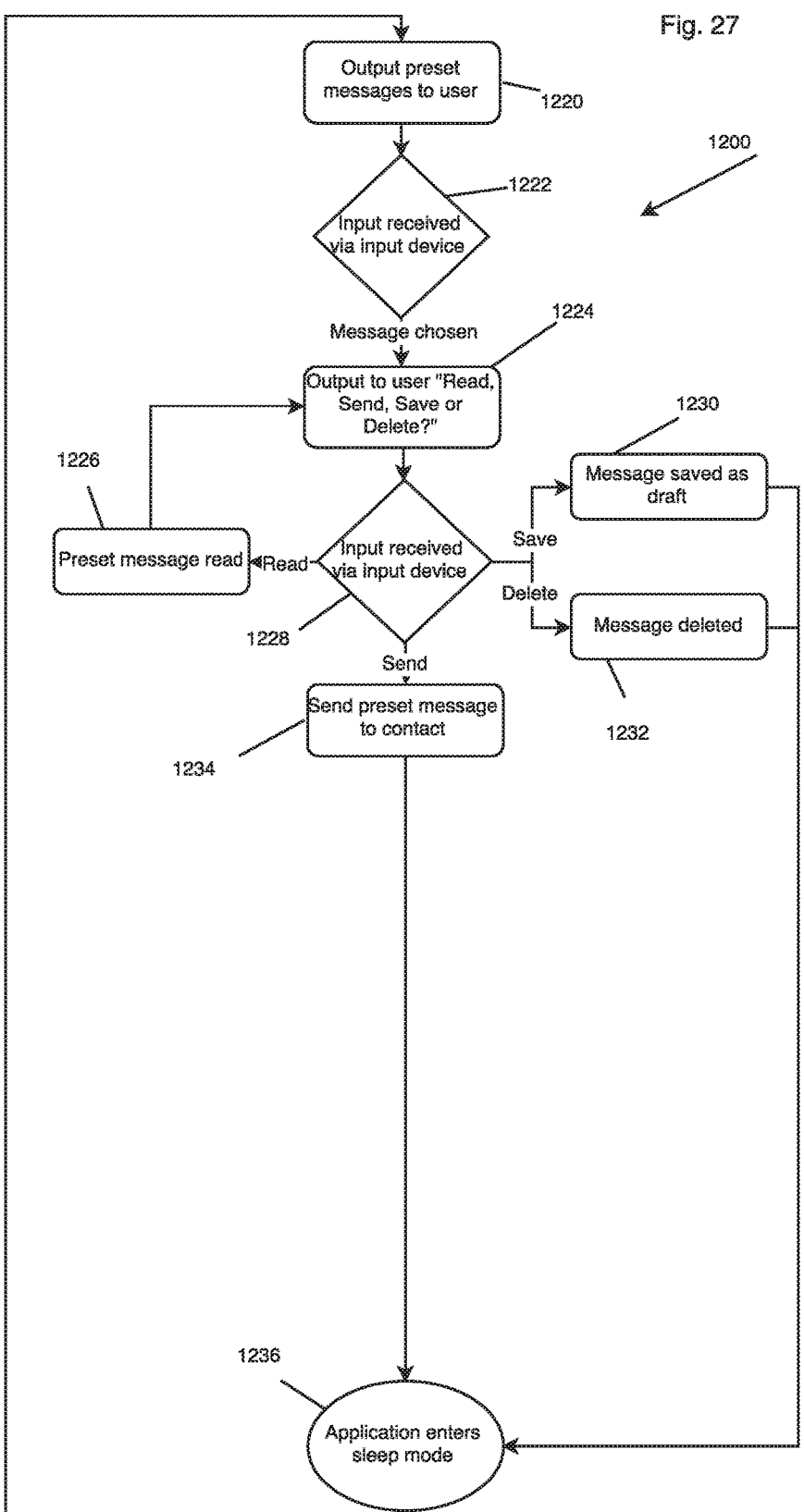
Fig. 27

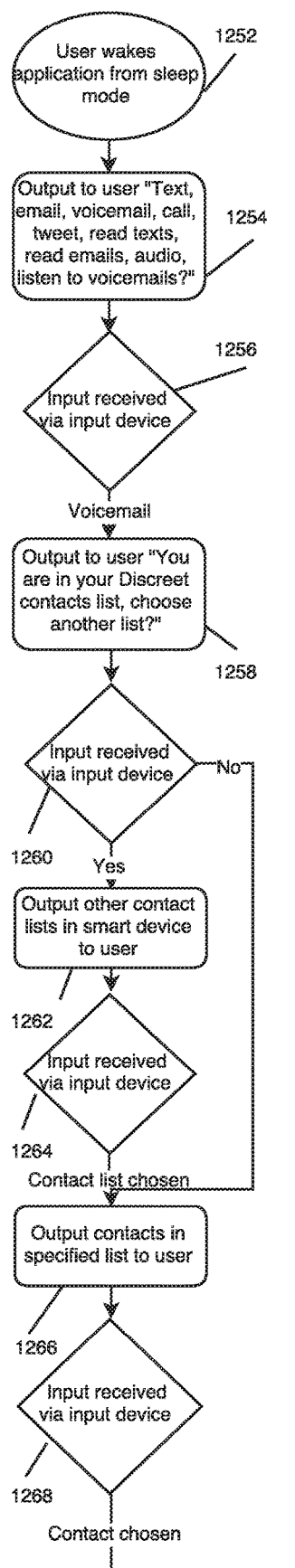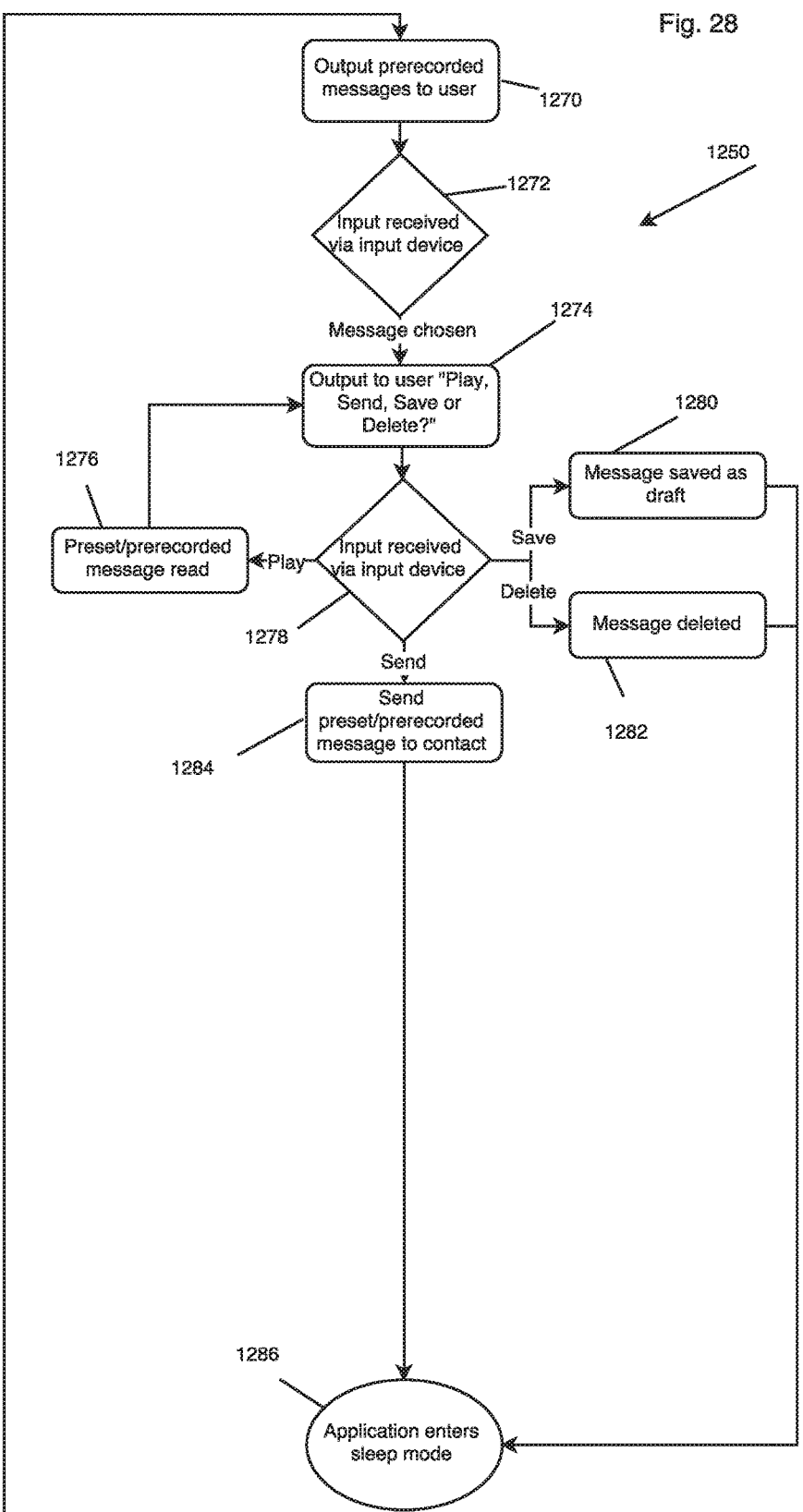
Fig. 28

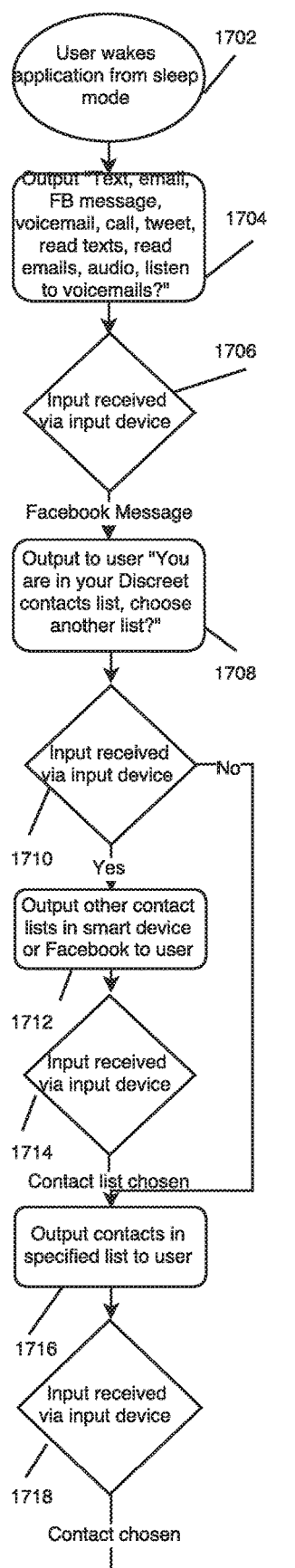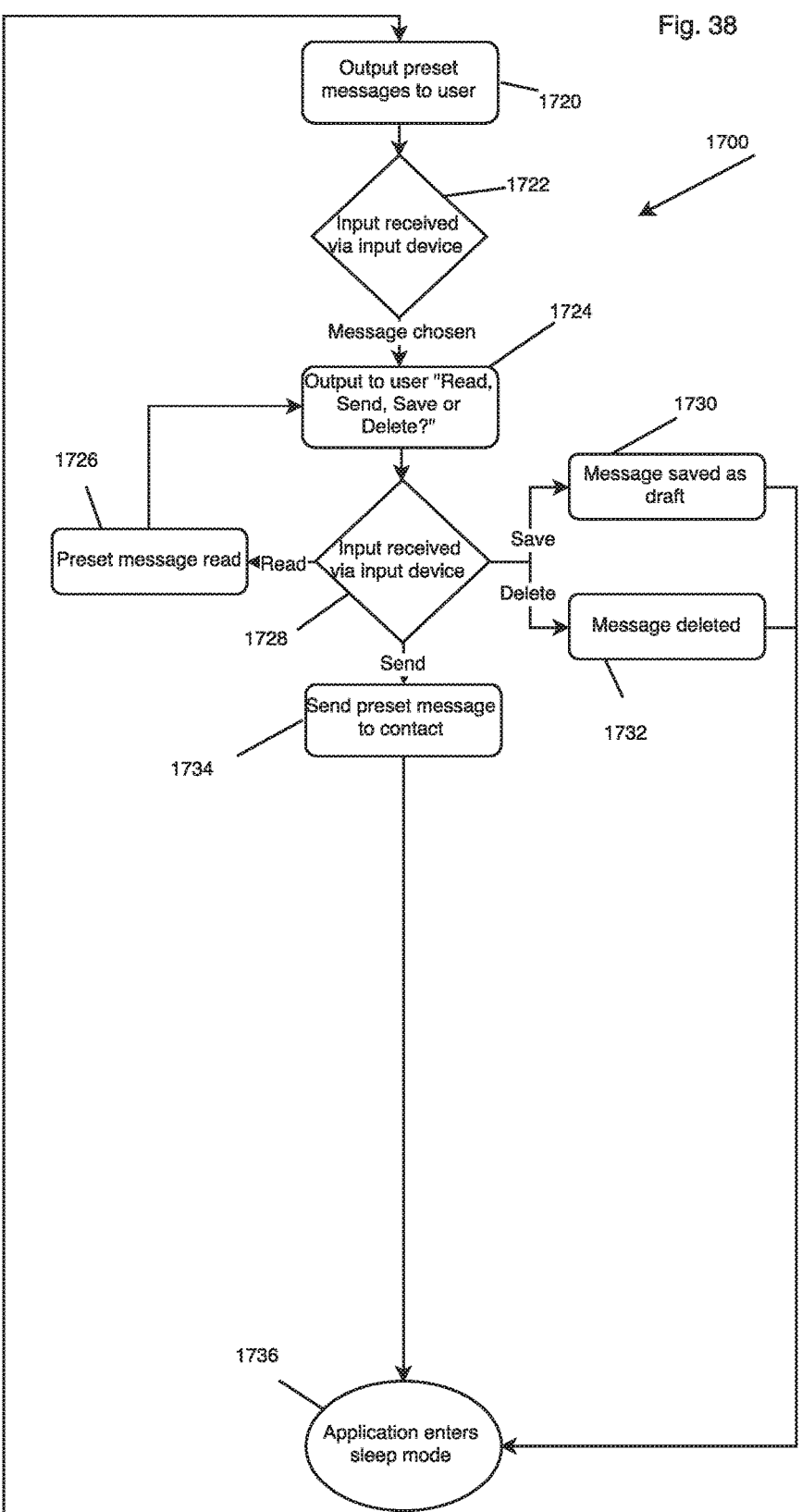
Fig. 38

Response 1
Response 2
Response 3
I got your message, will get back to you soon.
Response 4
Running late
Response 5
On my way
Response 6
...
Response 7
...
Headset
Connected 
Ring
Not connected 
FIG. 39

COMMUNICATION SYSTEM FOR COVERT AND HANDS-FREE COMMUNICATION

CROSS-REFERENCE TO RELATED APPLICATIONS

This application is a continuation-in-part application of U.S. Non-Provisional application Ser. No. 15/215,021 filed on Jul. 20, 2016, which claims priority to Provisional Application No. 62/194,481, filed on Jul. 20, 2015, all of which are incorporated by reference herein in their entireties.

BACKGROUND

Studies have shown that driving while texting on a cell phone can be more dangerous than driving while intoxicated. Additional studies have linked higher traffic accident rates to talking on cell phones while driving. However, many people use cell phones for business and do not want to keep clients or customers waiting while the user is in a meeting, with the customer wondering why they did not respond promptly. Other people may need to be able to receive and promptly respond to incoming calls or messages in instances of emergency, or other priority situations. This communication needs to be accomplished in some fashion without endangering oneself or others. Additionally, with many different states passing more stringent laws preventing texting while driving, or making contact with a cell phone while driving, there has arisen a need for a simple, fast, safe way for the user of a cell phone who is driving to know who is calling or texting, and, with a single input whether it be a push of a button, or a nod of a head, receive a call or message, respond to a call or message and/or initiate a call or message without diverting visual attention to a phone, in-dash system or other display, and, in some instances, while maintaining hands-free communication; covertly or not covertly.

Moreover, in some instances covert communications via electronic devices are difficult to achieve with known electronic devices and systems. Covert communications may be necessary and/or desirable under a variety of circumstances. The ability to initiate or respond to multi-bandwidth communications (calls, texts, emails, Facebook postings, Tweets, Instagram and other communication bandwidths) with others covertly and safely via an electronic device provides benefits not here before provided.

SUMMARY

In one non-limiting embodiment, an electronic device may communicate with an intra-oral device by way of the application. The system may be used to receive and transmit information, in some embodiments, or to only passively receive information or only transmit information in a covert method, in non-limiting embodiments. The electronic device application will allow a user to select groups of persons on a "known" receiver list, for example, a preselected group of contacts, which may be selected based on a user's contact list(s), in some non-limiting embodiments. The application may differentiate between messages received by those on the selected contact list of the electronic device and messages received by those not on the selected contact list of the user. The user may customize various lists of contacts, and the lists of contacts may be differentiated between by the application, in other embodiments. The application may be provided such that only messages received from those on the user's contact list will be provided to the user in one example. In other examples, multiple lists may be configured by the user, such as a family list, a public list, and a do not answer list. With each particular list, the application can be preset to identify the list that has been preselected by the user, in some instances based on the mode of the application, and identify whether a call should be answered or a message delivered based on the list selected and the preselected specifications associated with the list selected. The application can convey messages over headphones, an earbud or bone conduction device, in non-limiting embodiments, to the wearer of the headphones, earbud or bone conduction device and the wearer may either accept or deny the communication by way of the intraoral device, a jewelry device, or other such device (or multiple devices), described herein as an "apparatus" or "input device" for example.

In another non-limiting embodiment, a communication system including a communication device to receive and emit verbal communications that is in communication with an input device is provided herein. The input device comprising at least one responsive member to accept an incoming call made to the communication device and to initiate a pre-recorded message instructing that responses during the incoming call will be answered by preset responses, the preset responses are selected by activation of the at least one responsive member.

In another embodiment, a communication system comprising a communication device to receive and emit verbal and textual communications, the communication device arranged to select whether to receive at least one of verbal and textual communications from an identified sender, an input device in communication with the communication device including at least one responsive member, the input device accepts an incoming verbal and/or textual communication made to the communication device and initiates a pre-recorded message instructing that responses during the verbal and/or textual communication will be answered by preset responses, the preset responses are selected by activation of the at least one responsive member; and an output device to output the verbal and/or textual communication from the communication device is provided.

In yet a further embodiment, a tangible, non-transitory computer readable medium having program instructions executed by the processor is provided herein. An incoming communication received by an electronic device upon which the tangible non-transitory computer readable medium is operating, said non-transitory computer readable medium determining a mode preselected by a user, wherein the modes of the medium comprise at least a private mode and a public mode, determining a type of communication(s) preselected for receipt by the user; wherein when the preselected mode comprises public mode, and the incoming communication is a type of communication preselected by the user, the incoming communication is provided to the user; and wherein when the pre-selected mode comprises private mode, the program instructions include determining whether the sender is on one or more pre-selected contact lists selected for receiving the incoming communication; when the sender is on one or more pre-selected contact lists, and when the incoming communication is a type of communication preselected for receipt by the user, the incoming communication is provided to the user; wherein when the sender is not on the one or more pre-selected contact lists, and/or the incoming communication is not a type of communication preselected by the user, the communication is not provided to the user.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 25 includes a flow diagram illustrating an embodiment wherein a call is initiated by a user in discreet/private mode.

FIG. 26 includes a flow diagram illustrating an embodiment wherein an email is initiated in discreet/private mode.

FIG. 27 is a flow diagram illustrating an embodiment wherein a text is initiated in discreet/private mode by a user.

FIG. 28 includes a flow diagram illustrating an embodiment, wherein the user initiates a voicemail in discreet/private mode.

FIG. 38 is a flow diagram illustrating an embodiment wherein a Facebook® Message is initiated in discreet/private mode by a user.

FIG. 39 provides an example of a display screen wherein customization of user inputs may occur.

DETAILED DESCRIPTION

Figure 1:
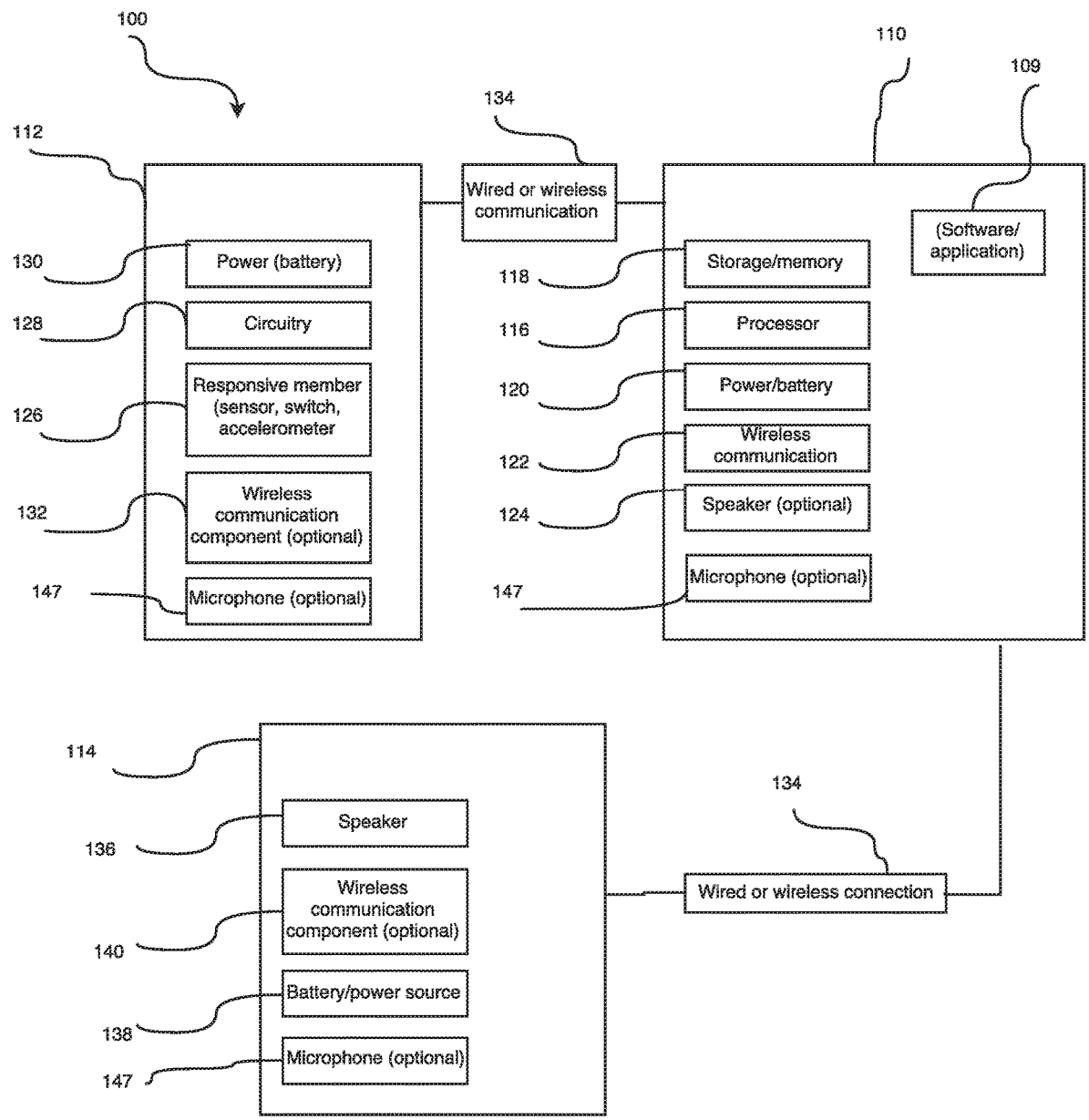
FIG. 1 is a schematic of an embodiment of a communication system.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

Definitions

It is to be noted that the terms "first," "second," and the like as used herein do not denote any order, quantity, or importance, but rather are used to distinguish one element from another, unless specifically stated otherwise herein. The terms "a" and "an" do not denote a limitation of quantity, but rather denote the presence of at least one of the referenced item. The terminology used herein is for the purpose of describing particular embodiments only and is not intended to be limiting. Furthermore, to the extent that the terms "including," "includes," "having," "has," "with," or variants thereof are used in either the detailed description and/or the claims, such terms are intended to be inclusive in a manner similar to the term "comprising."

The term "input device" or "apparatus" as used herein, refers to a device, in a non-limiting embodiment, that is or may be in communication with, connected to, or part of the electronic device, or a compromised version of the electronic device itself, and comprises components that enable the input device, or input devices, to communicate, internally or by wired or wireless connection, with the electronic device. A compromised version of the electronic device may include, in one embodiment, the electronic device in which the functionality of the native responsive members have been reassigned by way of the tangible non-transitory computer readable medium instructions. One or more input devices may be associated with the electronic device described herein and may be used to provide signals and/or transfer information to the electronic device by way of the application or non-transitory computer readable medium described in more detail herein, or by way of hardware on the electronic device. The input device includes but is not limited to a device which provides communication with the electronic device via the electronic device application. Multiple interoperable input devices and output devices may be simultaneously connected to or in communication with the electronic device. In some non-limiting embodiments, the input device, as described herein may include one or more responsive members, reactive to user input. Alternatively, or in addition, the input device may include, in non-limiting embodiments, a microphone, an accelerometer, a gyroscope, pressure sensor, resistive load cell, range sensor, IR sensor, luminance sensor, sound monitor or other sensor for sensing and/or detecting movement, proximity, or orientation, or a combination thereof, to provide a communication to an electronic device via an application by a user. In one non-limiting embodiment, the input device may be a component of the electronic device. For example, the one or more responsive members associated with or native to the electronic device may be used as the input device, in one non-limiting embodiment. As will be described in greater detail herein, the input device may include the volume buttons on a cellular phone, wherein the volume buttons serve as the responsive members to provide inputs for the system. In one non-limiting embodiment, the input device may comprise a microphone.

The term "output device" as used herein refers to one or more devices for providing output to a user. The output may be audibly, visually or haptically provided, the output may alternatively be provided by way of scent or taste. One or more output devices may be associated with the electronic device and/or the input device via wired or wireless communication, or may be a component of the electronic device or the input device. Information and/or data may be received by the output device. The output device may include one or more speakers for providing an audible output to a user. In some non-limiting embodiments, the output device may include one or more responsive members reactive to user input as described in more detail herein. The output device may include, in a non-limiting embodiment, one or more sensors of the type included herein. The output device may include, a microphone, an accelerometer, a gyroscope, pressure sensor, resistive load cell, range sensor, IR sensor, luminance sensor, sound monitor or other sensor for sensing and/or detecting movement, proximity, or orientation, or a combination thereof, to provide a communication to an electronic device via an application by a user. The output device may receive information from the electronic device via an application stored thereon, and may execute operations based on instructions from the application and/or the electronic device. The output device may further include a vibratory component, provided to induce a haptic output in a non-limiting embodiment. In a further non-limiting embodiment, the output device may be a component of the electronic device. In one non-limiting example, the output device may include a speaker on a cellular phone. In at least one non-limiting embodiment, the input device and output device may be one device. In a further non-limiting embodiment, the input device and output device are components of one another. In still a further non-limiting embodiment, the input and output devices are components of the electronic device.

In other non-limiting embodiments, the input device may include a touch stone configured to receive a user input. In still other non-limiting embodiments as will be described in greater detail herein, the user input may be received by manipulation of one or more elements of the electronic device. Therefore, in some non-limiting embodiments, the electronic device may serve as the input device. For example, an up or down volume button on an electronic device may be used to provide an input (a customized pre-set or pre-recorded response to the sender's query). In an additional non-limiting embodiment, in SR (Speech Response) mode, an individual may speak or whisper a response into an input device or the electronic device and the application (or system) will send a written version of the user's response as a new message or in response to a received written communication. In still other non-limiting embodiments, when the electronic device is associated with a motor vehicle (i.e. connected via wired or wireless connection, for example), various motor vehicle controls may provide input to the electronic device as is known to those of skill in the art. For example, the track+/−(or other) buttons typically found in the dash or on the wheel of a motor vehicle may be used to provide an input to the electronic device via the application. In one non-limiting embodiment, the input device may comprise a power source, circuitry, one or more responsive members reactive to user input, and, optionally, a wireless communication component and/or a microphone. Some non-limiting examples of input devices include: an item of jewelry such as, for example; a ring, a pendant, a bracelet, a watch, a lapel pin; other input devices may include a pen, an intra-oral device, an accessory piece such as a belt buckle or a headband, a pair of glasses, a headset or headphones, a steering wheel cover or other vehicular apparatus, or an external touchpad or screen, for example.

The touch stone, as mentioned above, includes a remote signaling device connected to the electronic device, most likely via Bluetooth (or other such bandwidth medium). It may have one or more of the various input methods described above (switch, multi—way switch, capacitive switch, resistive switch, potentiometer, etc.). Each switch motion can be mapped to commands within the application to be able to send various customizable pre-set messages or control various functions of the application. The touch stone, or other input device such as a pen, may also include a microphone allowing the user to locate said microphone closer to one's mouth allowing a whispered response via speech-to-text functionality.

The term "responsive member" as used herein includes a member that is reactive to a user input. A responsive member includes, but is not limited to, a button, a toggle, a switch (hard switch, or multi-way switch, for example), a sensor, digital or virtual buttons, or some combination thereof. Sensors may include, for example, proximity sensors, orientation sensors, capacitive sensors, resistive sensors, contact sensors, perpendicularity sensors, accelerometers or gyroscopes, or any other sensor known in the art to which the invention pertains to provide the same or similar function as those included herein. Responsive member triggers can be combined such that triggering a responsive member multiple times in a specified time period may generate an entirely different command than triggering the responsive member only once, enabling multiple customized responses per responsive member.

The term "incoming communications" as used herein includes communications that may be received by an electronic device. Examples of incoming communications include, but are not limited to: SMS (short message service) messaging ("text messaging"), MMS (multimedia messaging service) which includes sending or receiving messages that include multimedia content (or certain group messages) over a cellular network, telephone calls, Skype calls, voicemails, emails, Facebook notifications, including Facebook posts, Facebook messages, Instagram posts and messages, Tweets, WeChat messages and other related messaging or social media website communications known to those of skill in the art. The term "message" as used herein may include, but is not limited to, a SMS message, an MMS message, an email, a social media message or alert, an electronic device notification message, or a notification message from another application on the electronic device.

The term "outgoing communications" as used herein includes, but is not limited to any communications that may be sent from an electronic device. Examples of outgoing communications include, but are not limited to: SMS (short message service) messaging ("text messaging"), MMS (multimedia messaging service) which includes sending or receiving messages that include multimedia content (or certain group messages) over a cellular network, telephone calls, voicemails, emails, Facebook notifications, including Facebook posts, Facebook messages, Instagram posts and messages, Tweets, and other related messaging or social media website communications known to those of skill in the art.

The term "text message" as used herein includes, but is not limited to, text messages, MMS messages, iMessages, and other similar types of messages known to those skilled in the art to which the embodiments of the invention pertain.

The term "communicatively connected" as used herein includes a wired or a wireless connection. Wireless communication may include but is not limited to; Radio Frequency Identification (RFID) communications, Bluetooth® communications, ZigBee® communications, cellular communications, Wi-Fi communications, among other types of wireless communications know to those skilled in the art. Various types of cellular communications include, for example, 3G, 4G or LTE cellular networks may be used herein. Another type of cellular communication includes, for example, Sigfox. Sigfox provides for transmitting with very little power, and consequently Sigfox allows devices to run for long periods of time on a very small battery, for example.

The term "application", "electronic device application", or "tangible, non-transitory computer readable medium" as used interchangeably herein refers to the software application which may be on an electronic device for performing various functions of the system. An aspect of the embodiments includes a tangible, non-transitory computer readable medium (also referred to as an application) having program instructions executed by at least one processor to perform a method comprising: The application may provide, in some embodiments, an interface between an electronic device and a user and/or a third party. The application may interface with other applications on a device, in some non-limiting embodiments. Non-limiting examples of messaging systems that may be used in conjunction with the application include but are not limited to, for example; Skype, Twitter, Facebook, WhatsApp, Instagram, Slack/Yammer, and WeChat. In a particular embodiment, the application may interface with other communication applications. The application may process any (or selected) text or voice communication received to or sent from the electronic device. The application may provide communications, both to and from the device, in any language. The application may use a speech to text and/or text to speech engine, for example, in some embodiments.

The language provided on a display of the electronic device may be provided in any language. The particular language for the display and the incoming and/or outgoing communications via the application can be selected by a user. In non-limiting embodiments, the application described herein may function as a middleware, or as an application programming interface (API), which is a middleware between two systems, an interface between an application performing the function (i.e., message processing via SMS on a cellular phone) and a user. The application replaces the need for a display on the electronic device, for example, in one embodiment. Communications typically displayed on the electronic device display are read/audibly provided to a user, in one non-limiting embodiment. This eliminates the need for a user to view the display on an electronic device in order to receive an incoming communication, or to initiate, view or review an outgoing communication, in a non-limiting embodiment.

The application or tangible, non-transitory computer readable medium(s) may have computer readable program code embodied thereon. Computer code for carrying out operations for aspects of the present disclosure can be written in any combination of one or more programming languages. The code may execute entirely on the electronic device, partly on the user's electronic device, as a stand-alone software package, partly on the user's electronic device and partly on a remote computing device, such as a server, or entirely on the remote computing device. In the latter scenario, the remote computing device may be connected to the user's electronic device through any type of network, including a local area network (LAN) or a wide area network (WAN), or the connection may be made to an external computing device (for example, through the Internet using an Internet Service Provider) or cellular network. The code may execute entirely or partially on the cloud, in some non-limiting embodiments.

The computing device for carrying out operations for aspects of the present disclosure can be, but is not limited to, a server, a desktop computer, a laptop computer, a tablet computer, a smartphone or another handheld digital device.

The terms "electronic device" and "communication device" may be used interchangeably herein, and may include, but are not limited to, a smart device, and more specifically, a smart phone, a smart watch, a computer, smart contact lenses, smart eye glasses, or any smart optical device, a tablet, a "mother" or any other cellular or wide area communication device that can run the tangible, non-transitory computer readable medium having program instructions executed by a processor. The term "native electronic device responsive members" may include buttons, toggles, responsive members or the like that are a component of the electronic device. These native electronic device responsive members may be configured to interact with the application as described herein and to function as the input device responsive members, in addition to, or in lieu of an input device. In one non-limiting example, the volume up, volume down, power on, home buttons of the iPhone may be used as the responsive members reactive to user input of the input device as described herein. Other native electronic device responsive members may be repurposed in this manner, such that when the application is in use, these native response members may be used to control the features of the application and the system embodiments described herein. This may be possible by way of the computer code. The native electronic device responsive members of other electronic devices may also be used in this manner via the application. The input device may be a native electronic device responsive member.

The terms "responsive member" may include, but is not limited to a switch, a sensor (including, for example, an electromyography sensor), a button, a toggle, a digital button, or any other component reactive to a user input as known to those skilled in the art.

The term "mother" as used herein, may include, but is not limited to a device which may be used to receive and send signals, a device which may be used to communicate as a component of the system embodiments described herein. In some non-limiting embodiments, described herein, the mother device may take the place of the electronic device. In other, non-limiting embodiments, the mother may be used in addition to the electronic device. In non-limiting embodiments, the mother may feature components of the system, such as one or more responsive members reactive to user input, and may be in communication with the electronic device, or be used in place of the electronic device, in non-limiting examples. The mother may be communicatively connected to the components of the system, such as, for example, the apparatus, the electronic device, the output device, the input device, so on and so forth, by wired or wireless communication means.

The phrase "type of communication" as used herein, describes the format of the communication being received or sent from the electronic device. Non-limiting examples of types of communications include: SMS (short messaging service) messaging ("text messaging"), MMS (multimedia messaging service) which includes sending or receiving messages that include multimedia content (and some group messages) over a cellular network, telephone calls, Skype calls or messages, voicemails, emails, Facebook notifications, including Facebook posts, Facebook messages, Instagram posts and messages, Tweets, and other related messaging or social media website communications known to those of skill in the art.

In some non-limiting embodiments, a user may receive an incoming communication via one type of communication from a sender, for example, text, call, or email, and may respond to the sender of the communication by a different type of communication, for example, another of text, call or email. These types of communications are included by way of example, and are not intended to be limiting.

It should be specified that the term "module" used in the present application may correspond equally well to a software component or to a hardware component or to a combination of hardware and software components, including, but not limited to firmware, a software component itself comprising one or more computer programs or subprograms or more generally any program element suitable for performing a function or a set of functions as described for the modules in question. In the same way, a hardware component may correspond to any element of a hardware assembly suitable for performing a function or a set of functions for the module in question (integrated circuit, smart card, memory card, etc.).

The term "wearable device" as used herein may include any device that is wearable, including, but not limited to a ring, a bracelet, a watch, glasses, an article of clothing, or other wearable device known to those skilled in the art.

The inventors have discovered herein, a system for communication using an electronic device comprising an electronic device application and an input device for providing user input, in a non-limiting embodiment. In some embodiments, the system described herein provides hands and vison-free communication using an electronic device, and receipt and delivery of information. In other embodiments, the system described herein allows a user to discreetly initiate or respond to communication with another party (caller/sender) via calls, texts, email, Facebook®, Twitter or other messaging services without touching, handling, or looking at their phone. In certain embodiments, the application may provide audible output to another party (a caller/sender of a message, for example), but the user may not speak. In certain other embodiments, the user may receive a communication via one method and respond via another. Using the electronic device application, incoming communications and information can be delivered to a user by way of an output device.

The output device, in an embodiment, may include a speaker on the electronic device, for example. In another embodiment, the output device may include a wired or wireless output device, communicatively connected to the electronic device. In one example, the output device may include an earpiece, a headset, glasses, an inner or outer ear device, a bone conduction device, bone conduction speaker, or a bone conduction device coupled to a transducer placed near an ear of a user, or any other wearable device, in some non-limiting embodiments, or any other device known to those skilled in the art to provide audible information to a user. In another non-limiting embodiment, the output device may include a hearing aid device. Information received by the electronic device may be provided to a user via the output device. Output device as related to this application in non-limiting embodiments includes a device of the system that receives a communication from the electronic device application, and delivers an output to the user. In most embodiments described herein, delivery of the output to the user is by audio-delivery (via speaker or otherwise).

For communication via the system, a user may communicate by voice control (speech response, SR, mode as described in more detail herein), or by manipulation of responsive members, for example, and consequently, a non-verbal, inaudible response. This allows for discreet or covert communication when in the presence of others.

No other multi-bandwidth communications system incorporates hands-free, non-audible, non-visual, non-detectable two way communications that allow for customizable preset and/or pre-recorded responses that may be customized at an individual contact, contact group or global level. The application also allows for individual speech-to-text responses in the appropriate mode (Speech Response, or SR, mode) without touching or handling one's phone and without using "Smart assistants" (Siri®, Google® Now, among others).

In some embodiments, text to speech technology may be used by the electronic device application and/or by the electronic device in order to relay incoming communications that are received in the form of SMS or MMS messages, emails, social media posts, notifications, or messages, or information via other electronic device applications, such as an alarm clock application, or a calendar application, for example. Text to speech may be provided via text-to-speech software or libraries on the electronic device, or by accessing text-to-speech databases, such as for example, Amazon® text-to-speech such as Amazon Lex®, Amazon Polly®, for example, and, IBM Watson®.

In an aspect of the embodiments, human artificial intelligence may be provided, wherein the tangible, non-transitory computer readable medium may be provided to simulate human reasoning, thought and behavior. It may store, retrieve, analyze, assimilate, predict the future, and/or modify in a manner and fashion similar to the processing abilities available to humans.

The system may further include an input device configured to provide a signal to the electronic device, in one embodiment. The input device may be communicatively connected to the electronic device via wired or wireless communication. The input device may include one or more responsive members, in a non-limiting embodiment, said members being reactive to user input. The responsive members may include, but are not limited to, a button, a toggle, a switch, a multi-way switch, a digital display, a capacitive sensor, a resistive sensor, a pressure sensor, a potentiometer, a range sensor, an infrared sensor, a luminance sensor, a light sensor, a contact sensor, a gyroscope, an accelerometer, or any other type of sensor described herein or known to those skilled in the art, including microphones, throat microphones, and bone conduction input microphones. In some non-limiting examples, the input device may include an item of jewelry such as a ring, an earring, a watch, a bracelet, a pendant, a touch-sensitive component, sound sensor, jaw and head, arm, finger movement sensor or other. In other non-limiting embodiments, the input device may include an accelerometer, a gyroscope, or one or more sensors, for detecting movement. In another non-limiting embodiment, the output device may also be used as the input device, wherein the output device may include one or more speakers to output a message, and may also include either a responsive member reactive to user input, or a sensor, gyroscope, or accelerometer, or a combination thereof, as described herein, such that movement of the output device may initiate an action of the electronic device via the application, or may enable a response via the application to a message received by the electronic device and communicated to a user through the application. In other non-limiting examples, the input device or combined output/input device may include a microphone, allowing spoken or whispered commands or communication to be captured by the application.

The input device may include one or more responsive members, for example. Each responsive member may be dedicated to a particular response or responses. For example, a first responsive member may provide a "YES", or other affirmative (perhaps, but not limited to an Emoji®, Bitmoji®, and others) response via the electronic device application and electronic device. A second responsive member may provide a "NO", or other dissentive (perhaps, but not limited to an Emoji®, Bitmoji®, and others) response via the electronic device application and electronic device, and a third responsive member may provide a "MAYBE", or other YES/NO alternative (perhaps, but not limited to an Emoji®, Bitmoji®, and others) response via the electronic device application and the electronic device. Additional responsive members or actions may provide additional customizable responses as described above. By activating a response member multiple times in succession, provided responses may be modified from the above, allowing more than one response per responsive member, for example. These responses may be useful in responding to a message or call received via the electronic device by way of the application or to trigger an action in response to an incoming call or message such as sending a call to voicemail or "liking" a social media post. Affirmative responses may include a YES textual response, a thumbs up, a happy face, a check mark or other emoticon, in non-limiting embodiments, whereas a dissentive response may include a "NO" textual response, a thumbs down, a sad face, an X or other emoticon, in non-limiting examples, and a maybe response may include a "MAYBE" textual response, an "I'm busy will get back later" textual response, a question mark, or some other questionable emoticon, in non-limiting embodiments, these responses may be modified or customized, as aforementioned, per contact, per contact group, or globally for example.

Various embodiments of the system described herein may include the ability for the application to read emoticons and customized emoticons (such as Bitmoji's®) utilized in text-based communication, for example: ☺ ="Smiley", ☹ ="Frowny", 👍="Thumbs up", ✓="Check mark", in non-limiting examples.

In one non-limiting example, upon receiving a telephone call via an electronic device, the application may provide information from the caller to the user by way of the output device (optional) or by way of the electronic device speaker. The user may be able to provide a response to the caller by way of an input device via the responsive member(s), or simply by a movement of the input device, wherein the input device includes an accelerometer or other sensor for detecting user movement. The responses by the user may be provided by text to speech engine(s) utilizing customizable pre-programmed responses, in other non-limiting embodiments. In other non-limiting embodiments, the responses would be provided via SR (speech response) mode by providing auditory output receivable by the device and converted via speech to text, when not in private mode in some instances, or by responsive member as described herein in private/discreet mode.

Mapping of the software application may be customizable. The customization for the application can occur in the settings of the application as shown in FIG. 39. For each response action, there is an area where the desired response can be placed. Action 1 (Vol+)—"Yes" or emoji thumbs-up or "Yep" or "Sure", in non-limiting embodiments. Some non-limiting examples of the mapping may include swipe up="Yes" or a Thumbs-up, swipe down="No" or a Thumbs-down, swipe left="Let's discuss", Swipe right="Maybe" or "I got your message and will get back with you shortly.", Tap="call u back". Upon receipt by the application of the user input provided via the input device, the above messages may be provided to a receiver via text or via text-to-speech by the application, depending on the communication or messaging method being utilized. For example, a caller ("sender") may call the user, the application may, in one of multiple modes, patch the caller directly through to the user. In another non-limiting embodiment, the application may ask the user whether the user would like to receive the call (as will be described in greater detail herein). The sender may then be connected to the user and able to communicate directly to the user via the system. Alternatively, the user may respond by manipulating one or more responsive members as described herein to respond to the receiver and the system would utilize text to speech to read the pre-programmed responses. In other examples, the sender would contact the user via text or email and the user would respond utilizing the pre-programmed text responses or via speaking to a speech to text engine.

In embodiments described herein, the system may be used to communicate with others seamlessly, from location to location (portal-to-portal). In one non-limiting example, while in ones' office the user may be communicating via the system with another person, and as the user transitions to another location (i.e., portal to portal), the communication via the system may continue seamlessly. For example, once the user leaves the office, and enters his/her car, the communications continue via the system without the need for establishing a new connection in the car (once the car has already been paired to the system via the electronic device). This seamless, portal-to-portal communication greatly enhances a user's experience, and facilitates communication in a simplistic, yet beneficial manner.

In another non-limiting embodiment, a communication system including a communication device to receive and emit verbal communications that is in communication with an input device is provided herein. The input device comprising at least one responsive member to accept an incoming call made to the communication device and to initiate a pre-recorded message instructing that responses during the incoming call will be answered by preset responses, the preset responses are selected by activation of the at least one responsive member.

In another embodiment, a communication system comprising a communication device to receive and emit verbal and textual communications, the communication device arranged to select whether to receive at least one of verbal and textual communications from an identified sender, an input device in communication with the communication device including at least one responsive member, the input device accepts an incoming verbal and/or textual communication made to the communication device and initiates a pre-recorded message instructing that responses during the verbal and/or textual communication will be answered by preset responses, the preset responses are selected by activation of the at least one responsive member; and an output device to output the verbal and/or textual communication from the communication device is provided.

In yet a further embodiment, a tangible, non-transitory computer readable medium having program instructions executed by the processor is provided herein. An incoming communication received by an electronic device upon which the tangible non-transitory computer readable medium is operating, said non-transitory computer readable medium determining a mode preselected by a user, wherein the modes of the medium comprise at least a private mode and a public mode, determining a type of communication(s) preselected for receipt by the user; wherein when the pre-selected mode comprises public mode, and the incoming communication is a type of communication preselected by the user, the incoming communication is provided to the user; and wherein when the pre-selected mode comprises private mode, the program instructions include determining whether the sender is on one or more pre-selected contact lists selected for receiving the incoming communication; when the sender is on one or more pre-selected contact lists, and when the incoming communication is a type of communication preselected for receipt by the user, the incoming communication is provided to the user; wherein when the sender is not on the one or more pre-selected contact lists, and/or the incoming communication is not a type of communication preselected by the user, the communication is not provided to the user.

In one non-limiting embodiment, an electronic device may communicate with an intra-oral device by way of the application. The system may be used to receive and transmit information, in some embodiments, or to only passively receive information or only transmit information in a covert method, in non-limiting embodiments. The electronic device application will allow a user to select groups of persons on a "known" receiver list, for example, a preselected group of contacts, which may be selected based on a user's contact list(s), in some non-limiting embodiments. The application may differentiate between messages received by those on the selected contact list of the electronic device and messages received by those not on the selected contact list of the user. The user may customize various lists of contacts, and the lists of contacts may be differentiated between by the application, in other embodiments. The application may be provided such that only messages received from those on the user's contact list will be provided to the user in one example. In other examples, multiple lists may be configured by the user, such as a family list, a public list, and a do not answer list. With each particular list, the application can be preset to identify the list that has been preselected by the user, in some instances based on the mode of the application, and identify whether a call should be answered or a message delivered based on the list selected and the preselected specifications associated with the list selected. The application can convey messages over headphones, an earbud or bone conduction device, in non-limiting embodiments, to the wearer of the headphones, earbud or bone conduction device and the wearer may either accept or deny the communication by way of the intraoral device, a jewelry device, or other such device (or multiple devices), described herein as an "apparatus" or "input device" for example.

In another non-limiting embodiment, a communication system including a communication device to receive and emit verbal communications that is in communication with an input device is provided herein. The input device comprising at least one responsive member to accept an incoming call made to the communication device and to initiate a pre-recorded message instructing that responses during the incoming call will be answered by preset responses, the preset responses are selected by activation of the at least one responsive member.

Activating the Application

The tangible non-transitory computer readable medium, the "application," may be activated by actuating one or more responsive members or a combination of responsive members. The application may be activated by moving or touching a device comprising an accelerometer, sensor or gyroscope in an input device as described herein, including, but not limited to a ring, a pen, a headset, a pair of glasses, smart glasses, a watch, a contact lens, or other similar device. Activating the application includes preparing the application to perform a function. For example, the application may be in sleep mode, and activating the application includes waking it to a mode in which it is actively listening for and/or receiving inputs from a user or a sender. When in sleep mode, the application may be monitoring via real-time audio monitoring, for a pre-identified phrase spoken by a user to activate the application, or other means of activation to include, but not limited by means of touch or movement of input device. The phrase may include, in non-limiting examples, "Hi Tele", or "Telepathy", or "Tele." The activation of the application may occur when the electronic device is in a locked or inactive mode. During active or sleep mode, the application monitors the battery life (or the amount of power in the power source) of the electronic device, and may discontinue real-time audio monitoring at a default preconfigured battery life remaining level. In a non-limiting example, the application can be configured to monitor the battery life of the electronic device, and once the remaining power level reaches certain limits, 10%, or other low battery life levels, the application will shut down completely, or enter a sleep mode.

The functionality of the system embodiments described herein is further available while the electronic device is in a "locked" mode. In a non-limiting example, a call or another type of outgoing communication may be initiated by way of the input device, without any user contact/interface with the electronic device, and while the electronic device is in a locked mode, in some non-limiting examples. An outgoing communication may be initiated (i.e., outgoing text message, outgoing email) by activating a responsive member, in a non-limiting example, without first unlocking the electronic device.

In some embodiments, the application will use one or both of two methods for monitoring battery life and for activating the application: 1) activation via responsive member when the electronic device is running on battery, and when not connected to external power, and 2) real-time audio monitoring for activation by spoken phrase, and/or by responsive member, when the electronic device is connected to external power.

Power

Power may be supplied to the electronic device and/or input device(s) by methods known in the art. For example, by external power, which may be supplied to an electronic device and/or input device(s), in one non-limiting embodiment by way of an inductive, wireless charging system. This power can be supplied via contact with charging plates, or via placement on a charging pad, for example. In one non-limiting embodiment, a charging plate can be used to charge an electronic device, and keep the application active so that it is listening by real-time audio monitoring for a verbal command, providing complete handsfree functionality when needed, for example, while operating a motor vehicle or in a one's office. In another non-limiting embodiment, a wired or Bluetooth (or other bandwidth) input device such as a ring, touchstone, pen or other aforementioned input device can wake the electronic device out of sleep or low-power mode. The application described herein, the non-transitory computer readable medium, may be on and always listening for a command from a user, or awaiting an input when the electronic device on which the application is running is charging, or associated with a power source, for example, such as a wired attachment to an electrical outlet to charge the onboard battery of the electronic device, in a non-limiting example, so as not to drain the battery while in a "listening" mode. In another embodiment, when the electronic device is not charging, i.e., the electronic device is operating on battery power, for example, the application may be activated, (turned on) to receive a command or an input. In one non-limiting example, the application may be turned on by swiping an associated ring input device or contacting one or more responsive members reactive to user input. In a third embodiment, the application may be on and always listening when the electronic device is not charging. Such settings may be adjustable within the advanced settings of the application.

Modes of Use

The system and/or the non-transitory computer readable medium, or "application" may include various modes of use. The modes include at least a private mode and a public mode. A user may select the mode of use in the settings of the application. Private mode may be useful in situations where discreet communication is required. In some embodiments herein, the words "discreet" and "private" may be used interchangeably. For example, in a meeting, or in a movie, a user may want to receive communications from and deliver communications to other parties discreetly. Public mode may be useful when a user is alone in a car, on a run, working with both hands, in an office, wherein the communications are not required to be discreet or private, but might still be delivered via a headset, bone conduction device or other personal listening device.

In public mode, generally, calls, messages, posts, tweets, and other incoming communications from anyone will be accepted, although this can be restricted to only stored contacts or groups of contacts to eliminate SPAM or newsletters. The user still has an option to select to receive only certain types of communications, the types of communication categories include: calls, emails, text messages, Facebook® notifications (Facebook® posts), Facebook® messages, and more as will be described herein. In a non-limiting example, a user may select to receive only calls for the day, and no texts, emails, Facebook® or Instagram® posts or messages, or Tweets® in public mode. In private mode, incoming communications from one or more preselected lists of contacts will be accepted. In private mode, the user will also have the option to select to receive only certain types of communications as in public mode; however, in private mode, the user has the option to filter information or incoming communications by contact list and/or type of communication, as well as by individual contact if that level of granularity is desired. In a non-limiting example, in private mode, the user may preselect three contact lists, for example, the first contact list may include family contacts only, the second contact list may include close friend contacts, and the third contact list may include the remainder of the contacts of the user that are stored in the electronic device, or connected cloud or other storage. The user may elect to receive incoming communications from contact lists one and two, and further, only choose to receive emails and text messages from contact list two, but to receive any type of communication from contact list one.

Private Mode

In private mode, all incoming communications received by the electronic device, wherein the sender of an incoming communication is on a pre-selected list of the user, will be provided to the user via a connected output device so long as the message is of the type of communication pre-selected by the user for receipt by the user. The output device may include, for example, a headset or earpiece for discreet communication. The output device, however, may include a speaker of a car or other wirelessly connected device containing a speaker or other mechanism to produce sound. In other embodiments, the output may be provided by way of the electronic device speaker (i.e., a smart phone speaker, in a non-limiting embodiment). In private mode, incoming communications from a sender will be received by the electronic device, and the incoming communication will be provided to the user via the application on the electronic device following receipt by the electronic device. In private mode, the application will, by default, prompt the user prior to receiving or answering a call, or prior to reading or relaying an incoming communication received from another ("sender") to the user. In private mode, upon receipt of an incoming communication by the electronic device, the user may accept or decline the incoming communication by way of the input device via the application. Upon acceptance of the incoming communication, the user may provide a reply or feedback to the communication by way of an input device.

During use in private mode an incoming communication may be paused by a user, or by the system via an input by an input device, or the communication may be otherwise delayed or avoided, if received from a particular sender/caller.

Private mode includes multiple sub-modes. A first sub-mode includes an announce mode, wherein upon receipt of a communication, the application will announce to a user via an output device that a communication has been received. The communication may include a call or a message, for example. The application will request from the user whether the user would like to receive the communication. Upon input from the user via the input device, that the user would like to receive the communication, the communication is provided to the user via the application. For example, if the communication is a call received from another ("sender"), the application intercepts the call and provides an audible communication regarding the call to the user. Once the user provides an input via an input device to receive the communication, the call will be connected to the user. If the communication is a message, for example, a text message received from another ("sender"), the application intercepts the message and provides an audible communication regarding the message to the user. Once the user provides an input via an input device to receive the communication, the text message will be read to the user via a connected speaker, headset or other such device as described herein using text to speech technology. The user may respond to the text message via the input device via responsive members or other methods as contemplated herein.

A second sub-mode in private mode includes read mode. Upon receipt of a communication via an electronic device, the application announces and delivers the communication to the user. The communication may include any of the communications described herein, for example, a call, an SMS or MMS message, an email, an electronic device or other application notification, a social media notification, among others. In read mode, the electronic device application automatically delivers the communication upon receipt after announcing the call or message, in one non-limiting embodiment. In other non-limiting embodiments, the electronic device application may not announce the communication prior to delivery of the communication. The electronic device application may use text to speech technology to audibly provide a communication received by SMS, MMS, email, or other text or visual based communication methods to a user.

A third sub-mode of the private mode includes a quiet mode, wherein a user is not alerted to any incoming communications unless they meet a particular priority criteria. Priority criteria include a pre-designated criterion identified by a user that identifies the communication as a priority communication. For example, a user may designate one or more third parties as priority senders, such that any communications received from those third parties are provided to the user, even while in quiet mode. Alternatively, or in addition, any messages or incoming communications including a pre-defined "emergency" word or phrase may be provided to the user in quiet mode. Messages from particular pre-identified electronic device applications may be identified as priority messages, these messages or communications may be provided to a user in quiet mode. Furthermore, communications containing a particular pre-defined catch phrase, for example, as will be described in more detail below, may be provided to a user in quiet mode.

In private mode, contact lists are used to determine the way in which an incoming communication is handled. These contact lists may include, for example, one or more private lists which may include a subset of the contacts of a user, which are stored on the electronic device of the user. An "all contacts" list which may include all the contacts stored on the users' electronic device, and a public list, which may include any sender of an incoming communication to the user, whether or not that sender is on a contact list. In other non-limiting embodiments, the contacts/memory of the system and/or of the device may be stored on a removable storage medium, in the cloud, on one or more remote servers, or by other means known to those of skill in the art. Through the application, and/or though the electronic device's built in contacts application, the user may customize these lists, by adding or removing contacts on the lists. Furthermore, the customization may enable the user to create additional lists (i.e., work contacts, family contacts, school contacts, business contacts, etc.) and specifically designate how these contact lists will be handled by the application.

In private mode, initiating an outgoing communication includes the use of an input device. Manipulation of the input device may occur as described herein. Once the input device is used to initiate a command to the application, the application recites to a user a list of default customizable private mode options, such as, in a non-limiting example, "Text, email, voicemail, call, tweet, read texts, read emails, audio, listen to voicemails?" The application output may pause between each option so as to allow the user to select an option. The list of options recited by the application may be customized by a user, and may include other types of communications or settings, such as, calendar settings for setting meeting dates/times, alarm clock or stopwatch settings, in non-limiting examples.

The input device may be used to select an option recited by the application. The application then presents an opportunity for a user to select one or more contact lists for sending an outgoing communication, for example. In one non-limiting example, if a user chooses to "send a text", the application will read through the preselected contact lists to the user, such as, "discreet, work, friends, all" until the user selects a contact list. The user can utilize the input device to select the contact list. If the contact list selected has greater than a predefined number of contacts in it (for example, 10 contacts), the application will identify this and read the letters of the alphabet to the user such that the user can identify a contact using the contact's name in this manner. The user may use the input device to select the first letter of the last name or first name of the requested contact, in one example. The application may read the contacts with that letter's last name, and user may provide an input via the input device to select the desired contact. If the user selects "no" or another dissentive response using the input device, the application will read the contacts in the original list. Using the input device, the intended contact will be selected.

The application may recite to the user various pre-defined message compositions, for example, "running late" or "on my way" or "in a meeting" or "please set a meeting". These messages may be customizable per all users (globally), per contact list or per contact in the settings of the application. See FIG. 39 for an example of a look-up table. The user may then select the intended message for sending to the selected contact via the input device. In one non-limiting embodiment, the application may ask the user whether the user would like to read, save, send or delete the message, and the user may make the selection by way of the input device. Various versions of input devices may be used, for example, an advanced input device may allow a user to spell out the name of the contact, or contact phone number, in a non-limiting embodiment. Some of the commands available to a user include, but are not limited to: initiating a telephone call, sending a text message, sending a voicemail, sending an email, reading and/or sending a Tweet or other social media message, recording a voice memo, listening to received texts, emails or voicemails among others.

Public Mode

Public mode also includes multiple sub-modes. A first sub-mode includes an announce mode as described in reference to private mode above. A second sub-mode includes a read mode, which is also described in reference to private mode above. In both public and private announce mode, the sender information is announced. The user can choose to accept or decline receipt of the incoming communication. In public and private read modes, the sender of the incoming communication is announced to the user and the communication is read to the user (if the communication is of a type that can be read, such as text message, an email, etc.)

During use in public mode an incoming communication may be paused by a user, or by the system via an input by an input device, or the communication may be otherwise delayed or avoided, if received from a particular sender/caller.

In the various sub-modes in public and private modes, components of the communications received can be preselected to be communicated to the user. For example, instead of reading an entire email to a user, the application may only read the subject line of the email to the user or the user may signify that they want to stop after having heard the subject line. In another example, instead of reading a message to a user, the application may be preset to communicate only the name of the sender of the message to the user or the name of a group of senders. These features may be customizable by a user in the settings of the electronic device or in the settings of the application. These settings, for example may allow customization in numerous aspects of the system, but for example, certain features which may be customizable will be described as they pertain to email communications (though they may be applicable to any communications received or output via the system). Customizable features may include: read entire message/read subject line only, read entire text/read sender or group only. These settings may include defaults. There may also be an option to read the entire email message if it is less than approximately 500 characters, for example, but read only the subject if it is over approximately 500 characters, for example. All of these features may be customized by a user.

In public mode, there may be an option to exclude certain senders of incoming messages. For example, the user may create a list of senders that the application will not announce or accept when the application is set to public mode.

Initiating outgoing communications in public mode can occur by verbally communicating with the application via a microphone on the electronic device, on an input device, or on an output device, in non-limiting embodiments. A key word can be used to signal to the application the type of outgoing communication desired, in one embodiment. The key word may be "text" for example. When the user says "text", the application may respond with "who would you like to text?" The user may provide a contact's name or phone number. For example, if the user says "Fred" and there are multiple "Fred" contacts, the application will respond with "you have more than one Fred in your contacts, which would you like to text?" and will list each Fred. The user may indicate which Fred to text by interfacing with the responsive member on the input device, with a portion of the electronic device reactive to user input or by saying "Yes", in another embodiment. Upon selection of the correct "Fred" the application indicates to the user that it is ready to initiate the text. The user may dictate the text message, and may signal the end of the message with a voice command, such as "end" or other configurable command, or by utilizing an input device. The application will request "would you like me to send, read, save, or delete the text?" in one embodiment, and the user may select one of the options via the input device. If the user selects "read", the application will read the composed text message back to the user via the speaker, and then will follow with "would you like me to send, save or delete the text?" If the user selects send, the text will be sent and the application may enter sleep mode, in one non-limiting embodiment. If the user selects "save" the text will be saved as a draft and the application may enter sleep mode in another non-limiting embodiment. If the user selects "delete" the text is deleted, and the application may enter sleep mode in another non-limiting embodiment. All of this functionality can take place without direct interface (touching) of the electronic device, without visual interface (looking at) the electronic device and while the electronic device is not in the user's hands. It may even be in a purse, pocket, briefcase, etc., and/or in a location inaccessible by the user.

In the various modes of the system, additional commands are available to a user in some embodiments, including but not limited to: requesting the application to "please read the last "#" texts from Bob Smith" (sender), upon which the application will read the last "#" texts from sender; requesting the application to "please read the last "#" texts to Bob Smith" (recipient), upon which the application will read the last "#" texts to recipient. Similar processes will occur with social media notifications, social media messages, voicemails, emails etc. A user may ask the application to look up last number texted to user from Bob Smith, look up last number user texted to Bob Smith, look up the texts that were sent to Bob Smith last Thursday, etc., which the application will read to the user.

Out of Office/Unavailable Settings/Spam Messages

The system embodiments described herein may provide, via the application, a preselected out of office (OOO) message for selected incoming communications (including SMS messages) that meet a global, an individual contact, contact list and/or mode setting. Non-limiting examples of OOO combinations are provided below:

In private mode with private contact list selected—a reply with "In a meeting, get back with you when I am out"

In private mode with all contacts selected—reply with "I'm in a meeting, if this is urgent reply with "911" or "urgent" and I will be notified."

In private mode with business and family contact lists selected—reply with "I'm in a meeting, if your request needs action, reply with "411" or "assistant" and your text will be forwarded to my assistant for action. If you need me immediately, reply with "911" and I will be contacted."

In private mode with all contacts list selected—Read text or email to user. In OOO mode the user can select an action via an input device responsive member to reply with "I'll get Dorothy on this" and the program instructions executed by the processor will forward the text or email to the user's assistant or team for action. An OOO setting can also forward all incoming communications to an assistant, or team, for handling if desired by the user. There may be an exclusion list for certain contacts whose texts the user does not want forwarded, and this may be preselected by the user. OOO responses can work with AI engine functioning on the electronic device, in the cloud or on the back-end of the system.

Communications can be forwarded based on contact list and/or mode settings. For example, in private mode with complete contact list selected, and OOO selected, all incoming text messages may be automatically forwarded to the user's assistant for action. This may occur by forwarding to the user's assistant's electronic device or to an email address, or other. Certain contacts may be excluded from the complete contact list, and messages may be forwarded based on input from the user as aforementioned.

Spam messages and calls may be handled in a particular manner by the system embodiments described herein, for example, the application may check a database and may not announce or read information or incoming communications from senders/third parties on this database. In another embodiment for unknown numbers, the application may provide the same functionality. These messages may be deleted automatically, or may be saved for later use and review by the user.

Catch Phrases and Preselected Responses

When the mode selected is private mode, any incoming communication with a particular catch phrase may be provided to the user, overriding the selected mode, whether or not the sender of the communication is on a preselected list by the user. The catch phrase or phrases may be personalized by the user in the settings for the application. In non-limiting examples, any incoming communication with the word "late" in it will be communicated to the user. i.e. "running late", "I'll be late", or "5 min late," for example. In another example, any text, email, etc. with the word "urgent" or "priority" in it will be communicated to the user, even if the sender is not on a list selected to receive communications.

These features can be tied into the OOO settings mentioned above so as to give senders an option to escalate their message. For example, in an embodiment, in private mode, with private contact list selected and OOO selected, reply with "I'm in a meeting, if your request needs action, please reply with "urgent" or "911" and your text will be read to me" will override the previously designated settings, and the reply will be communicated to the user. In another non-limiting embodiment, in private mode, with private contacts selected, and OOO selected, in "announce" sub-mode, the sender of the incoming communication will be announced to the user, and the user can indicate via input device, to reply with "I'm in a meeting, if your request needs action, please reply with "urgent" and your text will be read to me." If the sender replies as indicated, the incoming communication will be communicated to the user via the application. These scenarios are provided by way of example, and are not intended to be limiting of the embodiments of the invention provided herein.

Interface with Other Applications on Electronic Device

The application embodiments described herein may interface with other electronic device applications. A non-limiting list of other applications are provided herein, for interfacing with the application of the subject embodiments. Notifications and/or alerts from other electronic device applications can be communicated to/from a user of the application via the application embodiments described herein. Such other applications for interfacing with the application of the embodiments described herein, include, for example:

Home screen notifications—Read user home screen notifications based on application settings; "You have a new text from Freddy", "Your Amazon® package has been delivered", "You have a new tweet", "Someone just made a new offer on your boots" (Poshmark®), "A new home just met your criteria!" (Zillow®), "Rain is expected at 2 PM today." (Weather Application), etc.

Voicemail—Play new or saved voicemails; leave voicemail for someone else

Calendar—Read upcoming appointments; use navigation to navigate to one if asked; notify user of reminders, notify users when a scheduled appointment ends, use AI (Artificial Intelligence) to help coordinate a meeting Voice notes—Record a voice note/reminder Clock/Timer—Signal user when a timer goes off, say to end a meeting or when a parking meter is about to run out Music app (Google Music®, Pandora®, Spotify®, etc. on user's phone)—Play a song, channel or playlist; skip ahead; replay a song/track; other standard music functions Camera—Trigger the shutter to take a picture Presentation—Advance a slide, play a video Navigation—Navigate to a pre-determined destination; select from several pre-programmed addresses i.e. home, work; prompt for an address for navigation Finance—Read stock quotes (predetermined or after prompting) from a finance app (Schwab®, Fidelity®, Google®, etc.); notify user of successful trades or major market movers Ring—Announce that someone is at user's door; send prerecorded message to Ring doorbell; listen for response Starbucks® or other restaurant—Order user's regular default item from user's default location Amazon®—Track a package or order; read Amazon app notifications GasBuddy®—Provide directions to the closest, cheapest gas when user is low Fitness trackers—Read user their heart rate, calorie or mileage updates, read user the heart rate or other stats of another approved individual upon request Open Table®—Make reservations at a local restaurant through GPS & prompts Games—Provide directions to goal; i.e. Pokeman Go® "There is a creature to the right"

Smart homes—Read screen notifications or pop-ups and respond, such as "It appears you have been away for 2 hours, would you like me to put your home in energy saving mode?" If the response is "Yes", then the smart home app would actually make the change. The smart home application would identify the relevant information needed to make this detection via GPS and time, and possibly other methods known to those skilled in the art. The application embodiments herein allow a user to be alerted to these notifications without having to read a display on an electronic device, and may provide a response by a user without contact with the electronic device.

Safe Driving Mode

The system may be provided, such that the application can be set to automatically engage safe driving mode when a GPS, or other sensor, detects motion/speed such as in a car, for example. In some non-limiting examples, this mode may be selected, or forcibly engaged, when the speed detected is above a preselected speed, such as for example, 20 mph+ or 25 mph+, or when proximity to a connected audio system or beacon is sensed. In safe driving mode, any incoming communications are automatically routed to a connected output device such as a Bluetooth headset or connected car audio system, and in some embodiments, are not displayed on a motor vehicle display or electronic device display or spoken over a connected car Bluetooth system and may be delivered only to a discreet earpiece or headset. This ensures a true "hands free", discreet experience in a car even when a user forgets to engage the safe driving mode before entering the motor vehicle. In some non-limiting embodiments, this setting may be locked in place and unable to be disabled without an administrative PIN or password. The setting may be secured on an electronic device using an administrative PIN or password, for example. This is an advantageous feature for new drivers, where parents can lock the settings in place on the new driver's electronic device. In other examples, for older drivers, their children may lock the feature in place. In other instances, this feature may be advantageous for providing motor vehicle insurance discounts. This setting may interface with other anti-texting and driving apps such as AT&T's DriveMode®, for example.

In some non-limiting embodiments, the application may include IFTTT (if this then that) connectivity/interaction (https://www.ifttt.com/). This interface between the application may occur through other applications such as, Amazon Alexa®, Google Home®, Hue®, among others.

Upon receipt of a text message via MMS or SMS, for example, or upon receipt of a telephone call, the text information may be read to the user via the application and the information of the phone call may be relayed in the caller's own voice and communicated to the user via the electronic device application. In safe driving mode, the user may elect to receive incoming communications only via an earpiece instead of a car speaker to ensure discretion and private communication of the information being received therethrough. Outgoing communications may be elected to be sent in safe driving mode via speech to text by way of the microphone, in some non-limiting embodiments. The user may hear the textual information provided to the user via the cellular phone speaker, or may be provided through an earbud or bone conduction device worn by the user. The earbud or bone conduction device may be sufficiently small so as to maintain covert communications. The earbud or bone conduction device may be wirelessly connected to the system. The user of the system may be able to provide affirmative/positive or dissentive/negative answers in response to the information being provided to the user from the third party via text or by phone call through the cellular phone application. The affirmative/positive ("yes" or "Thumbs-up"), dissentive/negative ("no" or "Thumbs-down") or "maybe" ("Let's discuss further" or "I received your message and will get back with you") or additional answers may be communicated by the intra oral device, by directional movement across a contact point on the intra oral device (this may be communicated by movement of the users tongue across the device, for example). These inputs by a user may be communicated, by wired or wireless communication to the cellular phone for response to the third party via the cellular phone application. In other embodiments, a piece of jewelry, such as a ring worn by the user, in a non-limiting embodiment, may be used in place of the intra-oral device and may be used to respond to an audible-to-textual (or text-to-speech) message by selecting a responsive member, responsive to user input to answer affirmative/dissentive questions in some examples. Both the cellphone and communicative device, or "mother" device would receive prompts from the ring, intra-oral device, buttons already built into a headphone worn by the user, Tele Stone or buttons on the phone itself or a "mother" device. The type of message can range from texts, phone calls, voicemails, social media notifications, weather and traffic updates, appointment reminders and much more. In other embodiments, the earbud or bone conduction device can be used to play music, television or other streaming content in a covert manner not noticeable to others surrounding the user, and only heard by the user with the use of noise-canceling technology, for example. In some embodiments, the user uses a responsive member, reactive to user input on either the intraoral device or jewelry device to indicate an affirmative/positive or dissentive/negative response.

The responsive member may include a sensor, a button, or any other type of element known to those skilled in the art reactive to user input. The message received may then be provided to the user over the ear bud or bone conduction device and the user may interact with affirmative/positive, dissentive/negative or "maybe" responses, among others, in non-limiting embodiments, and messages are relayed through the electronic device application. Provided below is an example of a use of the system:

A call comes in and the system alerts the user who is contacting them. The user may choose to accept communication or send it to voicemail. Once they accept communication a conversation can be relayed like this:

Call is accepted by the application.
To user: There is a call from, Caller.
The User initiates a response to answer the call through the application.
To Caller: User, is unavailable may I relay yes/no/maybe questions to him on your behalf or would you like his voicemail?
Caller chooses to continue the conversation with yes/no/maybe questions.
To User: Will you be home for dinner at 5 PM?
The User initiates a response as described herein: Yes, or a Thumbs-up sign.

Some of the many benefits of the application include the ability to conduct discreet or covert communications without alerting surrounding persons that communications are being conducted between the user and another party. The system allows a user to have communications with another party without interrupting a meeting, a movie, a dinner, jury duty, or a conference, for example.

In another non-limiting embodiment, the communicative device, or "mother" device, may be used in place of a cell phone and may receive and transmit information receivable in SMS or MMS messages, emails, social media posts, notifications, or messages, or information via other electronic device applications, such as an alarm clock application, a calendar application, among others, for example, or may translate the information received in textual format to audio via text-to-speech which may be audibly provided to the user. The communicative device may include a communication converter, which may include a speech receiving means to receive audio and patch through the audible information to a user, or to receive textual information, and translate this information from text-to-speech to provide the information to a user without requiring the user to view the message. By these means a messaging session may be established. Text-to-speech conversion acts to convert textual information received into audible information provided to a user. A textual information output provides the textual information directly to the user via the cellular phone speaker or via a wired or wireless communication to a headphone, ear bud or bone conduction device located in proximity to the users' ear, temple or other bones of the skull, or other device as described herein. The communicative device may be associated with at least one controller to receive commands from an intelligent gateway for coordinating connections to and from the speech receiving means and the speech to text conversion means.

The system may allow for the communication of only certain types of notifications, for example, only those from a preselected group of contacts in a non-limiting embodiment. The application would covey the messages from this preselected group of contacts to the user, for example, by way of an ear bud or other output device. Numerous types of apparatuses, including earbuds, are known to those skilled in the art to include Bluetooth® enabled technology or other wireless technology to transmit data and information to a user wearing the earbud. Other types of earbuds include a wired-connection.

The possible outputs of the system may vary. For example, the request may be associated with a given application. In this configuration, the possible answer is/are a function of the application.

Prior art methods exist for determining phone speed, these methods may be useful when a user of the system embodiments described herein is driving, for example, and cannot safely operate his cellular device, in one non-limiting embodiment. One such prior art method is included in U.S. Pat. No. 6,456,858, which is incorporated by reference.

The term "microprocessor" or "processor" as used herein, may include a single processing device or a plurality of processing devices. Such a processing device may be a microcontroller, digital signal processor, microcomputer, central processing unit (CPU), field programmable gate array (FPGA), programmable logic device, state machine, logic circuitry, analog circuitry, digital circuitry, and/or any device that manipulates signals (analog and/or digital) based on operational instructions. The microprocessor may have operationally coupled thereto, or integrated therewith, a memory device or a memory module. The memory device or memory module may be a single memory device or a plurality of memory devices. Such a memory device may be a read-only memory, random access memory, volatile memory, non-volatile memory, static memory, dynamic memory, flash memory, and/or any device that stores digital information. An electronic device, as used herein, is a device that comprises at least one processing module, and optionally at least one memory device. The memory module may include pre-loaded information or data (i.e. information or data stored on the device), information or data added to the device, information regarding contact lists and/or customized settings, including a pre-selected mode, for example. The removable memory module may also contain the language information for communicating with a user in various different languages.

The "storage" "memory" or "data storage modules" as described herein may include a storage medium component (s) such as, but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), an optical fiber, a portable compact disc read-only memory (CD-ROM), a DVD (digital video disk), a micro SD card, built in device storage or other electronic storage medium.

Computer program code modules for carrying out the logic or operations of certain embodiments of the present invention may be written in an object oriented, procedural, and/or interpreted programming language including, but not limited to, Java, Smalltalk, Swift, Xamarin, Perl, Python, Ruby, Lisp, PHP, "C", FORTRAN, Assembly, or C++. The program code modules may execute entirely on the electronic device, partly on the electronic device, as a stand-alone software package, partly on the device and partly on a remote computer or device or entirely on the remote computer or device. In the latter scenario, the remote computer or device may be connected to the user's device through a local area network (LAN) or a wide area network (WAN), or the connection may be made to an external computer (for example, through the Internet using an Internet Service Provider).

The circuitry of the electronic device and other components of the system (input device or output device, for example), may include a flexible printed circuit board to electronically couple with the components contained therein. The circuitry may be disposed in any suitable manner relative to the housing of the device, or may be associated with the housing of the device. In some embodiments, for example, the circuitry can be integrated with the electronic device, input device and/or output device. The circuitry can be contained within the housing of these respective devices, and/or it may be partially or fully assembled concurrently with and/or with the same processes of the devices described herein, the circuitry may alternatively or in addition be provided on the outer portion of the housing of the devices.

In yet another embodiment, a non-transitory computer-readable medium embedded in an electronic device is disclosed. The non-transitory computer readable medium stores instructions executable by the processor or processing component of the electronic device to cause the electronic device to output audio via the output device or the electronic device, itself, in response to the instructions of the non-transitory computer readable medium, depending, in part, on whether an incoming communication is received, whether a signal is provided from the input device to the electronic device, whether an outgoing message is initiated or submitted, among other tasks or functions.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, magnetic tape, flash memory and micro SD cards; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, Swift, Xamarin, C++, or other object-oriented programming language and development tools. Additional examples of computer code include, but are not limited to, control signals, encrypted code, and compressed code.

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules via a processor on an electronic device or other computing device. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

Each block of the flowchart illustration and/or block diagrams in the Figures described below and provided herewith, and combinations of blocks in the flowchart illustrations and/or block diagrams can be implemented by software application instructions. These software application instructions may be provided to a processor of a general purpose electronic device, special purpose electronic device, or other programmable data processing apparatus to produce a machine, such that the instructions, which execute via the processor of the electronic device or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer applications according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements which fall within the scope of the claims which should be construed to maintain the proper protection for the disclosure first described.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

Although the present disclosure has been described with reference to one or more examples, workers skilled in the art will recognize that changes may be made in form and detail without departing from the scope of the disclosure and/or the appended claims.

Turning to the Figures, FIG. 1 includes a schematic of a system embodiment 100 in which an apparatus 112 includes one or more responsive members 126 reactive to a user input, and circuitry 128 associated therewith. The apparatus 112 may further include, in a non-limiting embodiment, power 130 and, optionally, a wireless communication component 132 and/or a microphone 147 for providing input. The apparatus 112 may be connected to an electronic device 110 via a wired or a wireless connection 134. The electronic device 110, may include a tangible, non-transitory, computer readable medium 9 stored thereon, and may also include a storage or memory module 118, a processor 116, a power source 120, a wireless communication component 122, and optionally, a speaker 124 for providing an output to a user and/or a microphone 147 for providing input. In the non-limiting embodiment 100 as shown in FIG. 1, the electronic device 110 may be communicatively connected to an output device 114 vi a wired or a wireless connection 134. The output device 114 may include a speaker 136, an optional wireless communication component 140, an optional power source 138 and/or an optional microphone 147 for providing input. Any communications received by the electronic device 110 may be provided to a user via the input device 112 and/or the output device 114 as described in embodiments herein. The apparatus 112 may be used, for example, to initiate communications via the electronic device 110 and the tangible non-transitory computer readable medium 9, or to respond to such communications which are received by the electronic device 110. An optional microphone on apparatuses 110, 112, or 114 may be utilized for various inputs as described in embodiments herein.

Figure 2:
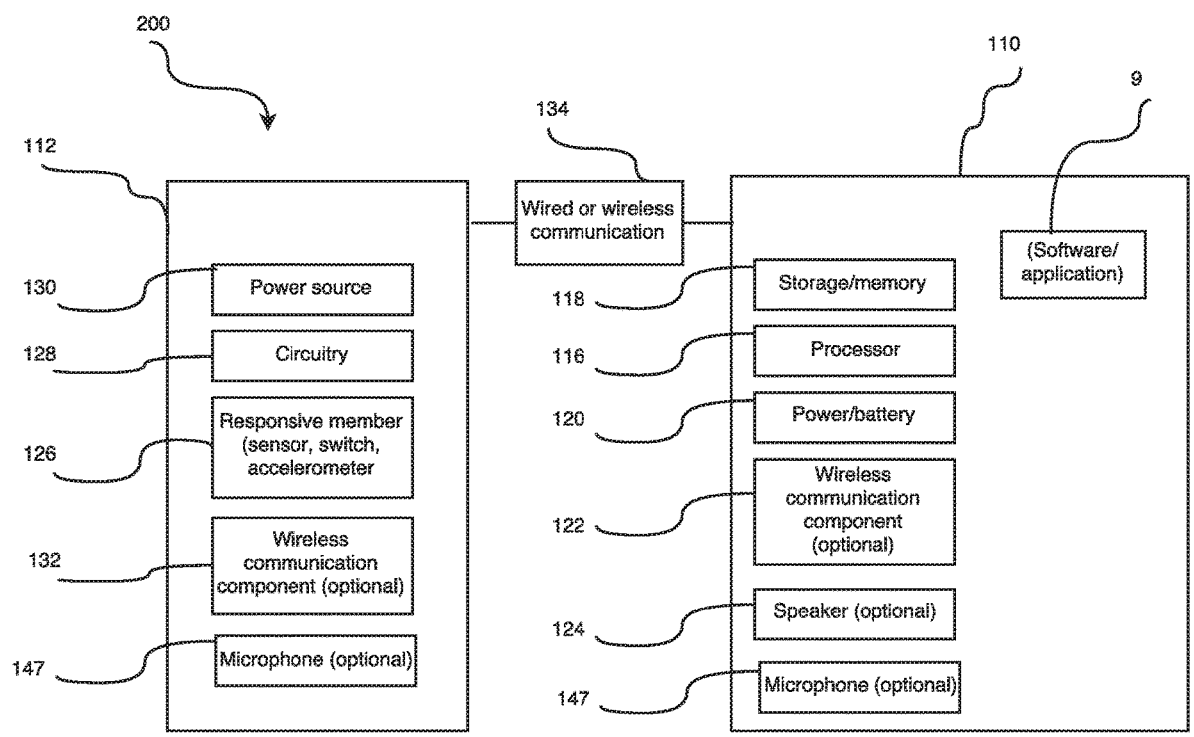
FIG. 2 is a schematic of a further embodiment of a communication system.

In the schematic shown in FIG. 2, a communications system embodiment 200 is provided including an apparatus 112 and an electronic device 110, communicatively connected to one another via a wired or a wireless communication 134. The apparatus includes, in one non-limiting embodiment, a power source 130, circuitry 128, a responsive member 126, and optionally, a wireless communication component 132 and/or a microphone 147 for input. The electronic device may include software 9, a storage/memory component 118, a processor 116, power or a battery 120, wireless communication component 122 (optional), a speaker 124 (optional) and/or a microphone 147 for input (optional). In any of the embodiments shown herein, the storage/memory may be provided in the cloud and may be wirelessly obtained therefrom, in one example. In other non-limiting embodiments, the system may include storage/memory components which may be otherwise provided off-board, and wherein the information and/or data stored therein may be communicated to or shared with the system by any methods known in the art.

Figure 3:
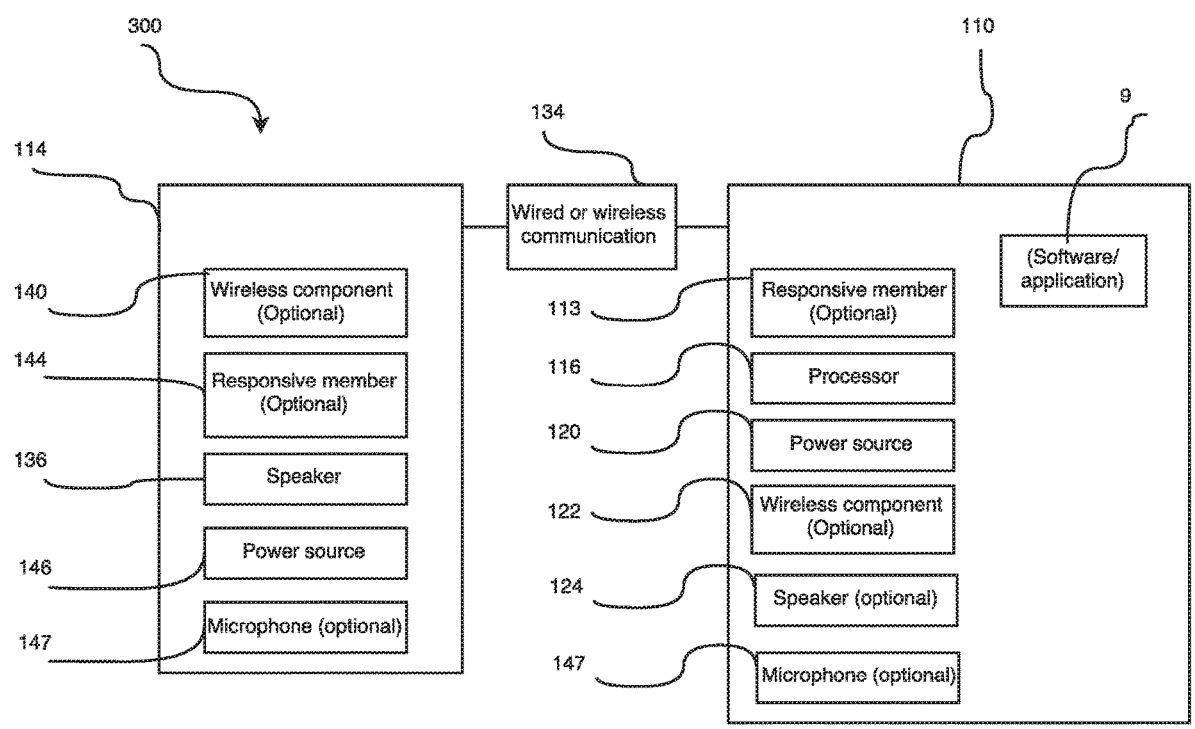
FIG. 3 is a schematic of yet a further embodiment of a communication system.

In the schematic shown in FIG. 3, a communications system embodiment 300 is provided including an electronic device 110 and an output device 114, which are communicatively connected to one another by a wired or a wireless communication 134. The electronic device 110 includes software 9, an optional responsive member 113, an optional speaker 124, and a power source 120. The electronic device may include a processor 116, an optional wireless component 122 and an optional microphone 147. In this particular system embodiment 300, communications received by the electronic device 110 may be communicated to a user via the output device 114, which may be in the form of an earpiece, a bone conduction mechanism, a headset, or other, via the speaker 136 on the output device 114. The user may respond to the communication, or may initiate a communication with the electronic device 110 via the responsive member 144 on the output device or the responsive member 113 on the electronic device 110, or by merely speaking into the output device 114 or the electronic device 110. A microphone 147 may additionally be provided on the output device and/or the electronic device 110 for receiving audible communications from a user, and the output device 114 may optionally include a wireless component 140 for wireless communications 134 with the electronic device 110, or another device, in non-limiting embodiments.

Figure 4:
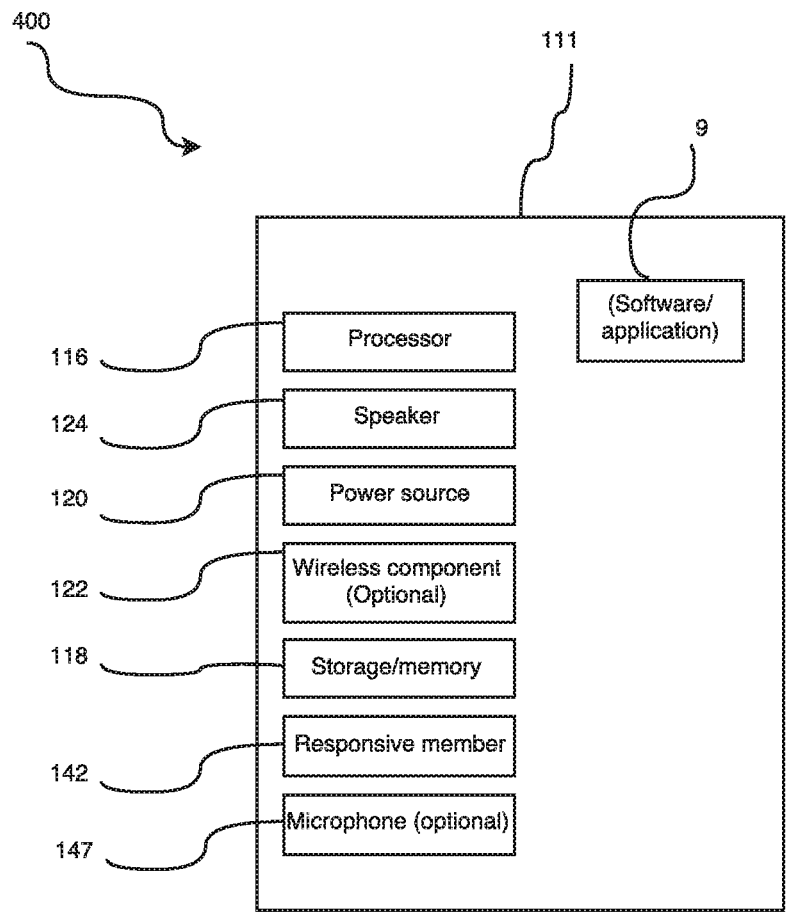
FIG. 4 is a schematic of yet a further embodiment of a communication system.

Yet another embodiment of a communications system 400 is provided in FIG. 4, wherein an electronic device 111 includes software 9, and a processor 116, a speaker 124, a power source 120, an optional wireless component 122, and storage/memory 118, as well as a responsive member 142 and/or a microphone 147, such that the system may receive user input via audible means therethrough.

In the non-limiting system embodiments 100, 200, 300, and 400, provided herein, the system is adapted to receive an incoming communication from a sender by the electronic device 110, 111, determine, by way of the processor, a mode preselected by a user, wherein the mode includes a private mode and/or a public mode, other additional modes discussed herein are possible. A determination may be made as to the type of communication(s) preselected by a user for receipt by the system. The term "receipt" as used herein, indicates the incoming communication will be received, i.e., the call will be communicated to the user, or the message will be communicated to the user, in non-limiting examples. "Non-receipt" includes forwarding of the call to voicemail, for example, or storing the message in a queue, for later retrieval, for example, as described in greater detail herein. When the pre-selected mode comprises public mode, and the incoming communication is a type of communication preselected by the user, the incoming communication is provided to the user; and wherein when the pre-selected mode comprises private mode, the program instructions include determining whether the sender is on one or more pre-selected contact lists selected for receiving the incoming communication; when the sender is on one or more pre-selected contact lists, and when the incoming communication is a type of communication preselected for receipt by the user, the incoming communication is provided to the user; wherein when the sender is not on the one or more pre-selected contact lists, and/or the incoming communication is not a type of communication preselected by the user, the communication is not provided to the user.

Following receipt of a communication, a user is provided an opportunity to respond. The response options are customizable by a user on a global (all contacts) level, by contact (sender), by contact group, and/or by type of communication, for example. Further description involving customization is provided herein. A user may respond by speaking into the electronic device, the apparatus, the input device or the output device, in non-limiting embodiments, this communication may be captured by a microphone and may be processed by the electronic device. Responses may also/alternatively be communicated by a user via a responsive member of the system, which is reactive to user input. By activation of the responsive member a user may respond to a communication received, or signal to the system to send the sender of the communication to voicemail, or send their message to be stored in the queue for later retrieval and/or response. As aforementioned, the responses are customizable by a user, and may include an affirmative, dissentive, or "maybe" response, among others. The responses may be customized such that the affirmative response replies "YES" to a user, or so that it replies with a thumbs up emoticon, or a smiley face emoticon, in non-limiting examples. In a further example, the affirmative response may be customized per contact or per contact list/group to include a text response including, for example "Yes that sounds wonderful, thank you." The same is possible with the dissentive or "maybe" response. Additional response options may be provided, as additional responsive members, or combinations of responsive members, or multiple activations of responsive members, may be provided to initiate a response or to initiate a communication (i.e., dial a call, draft an email, draft a text message, etc.).

The communications received may be selected based on either, or both of: contact (or contact list) and type of message. Therefore, if a user chooses to accept only emails from senders on a "work" contact list, and accept calls, electronic mail, and text messages from senders on a "personal" contact list, only these types of communications will be "received", i.e., delivered, to a user.

The processor makes the comparison as to whether the sender of the communication is on the list, and whether the type of communication is the type indicated as receivable from that caller by the user's software settings (i.e., preselected mode).

The embodiments shown in FIGS. 1-4 provide non-limiting examples of the communication system. The location of the various components of the system may vary, as shown in the non-limiting examples in FIGS. 1-4. The components described in the various system embodiments herein are not limited to the arrangements for the system embodiments shown in FIGS. 1-4.

Figure 5:
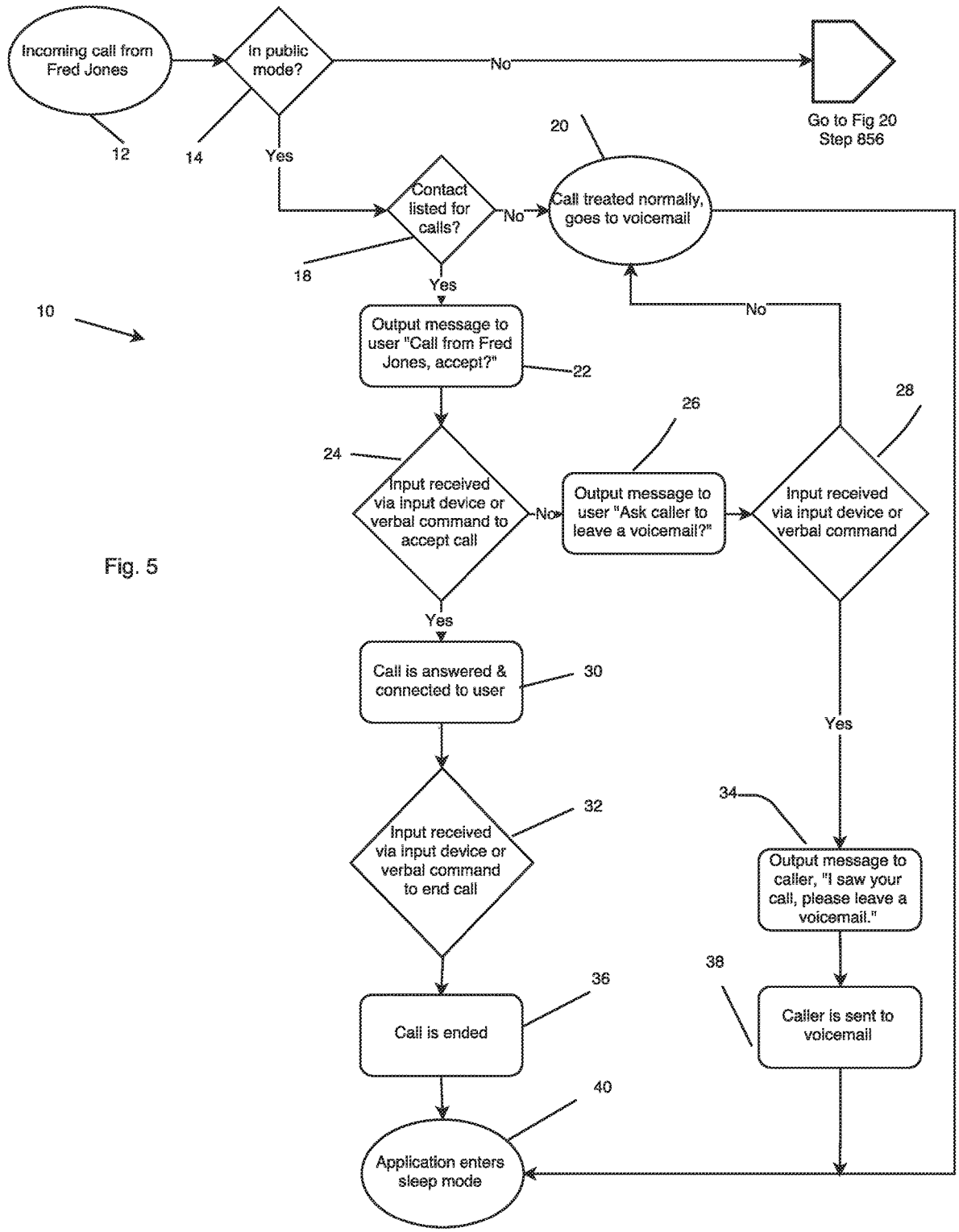
FIG. 5 includes a flow diagram of an embodiment of a system wherein an incoming call is received in public mode.

FIG. 5 includes a flow diagram of a system wherein an incoming call is received in public mode 10. An incoming call from Fred Jones is received 12 by the electronic device, a determination is made by the processor whether the preselected mode is public mode 14, if the preselected mode is not public mode, the system is in private mode, and the logic proceeds to FIG. 20, step 856, "private mode, incoming call." If the logic determines that the system is in public mode 14, it determines whether the contact (the caller, Fred Jones, for example) is listed for calls 18. This means, whether the type of communication indicated by a user to be received includes phone calls, and in a more specific, non-limiting embodiment, whether the user has preselected to receive phone calls from Fred Jones in particular, or from a contact list to which Fred Jones belongs. If the contact is not listed for calls, the call is treated normally and goes directly to voicemail 20, after which the application may enter sleep mode 40 in a non-limiting embodiment, to conserve power. If the contact is listed for calls, the system outputs a message to a user, such as, "call from Fred Jones, accept?" 22. If an affirmative/positive input is received via an input device or verbal command from the user to accept the call 24 (i.e., a positive response is received), the call is answered and connected to the user 30. If such an input is not received or a negative/dissentive input is received by the user, a message is output to the user, "ask caller to leave a voicemail?" 26. The system monitors for an input received from the user via input device or verbal command 28. If no input is received or the input is dissentive (i.e., "no"), the call is treated normally, and goes to voicemail 20, at which point the application may enter sleep mode 40. If at step 28 the input received is positive, the application outputs message to caller "I saw your call, please leave a voicemail" 34 and the call is sent to voicemail 38. If at step 24 the input is received, the call is answered and connected to the user 30. The system may monitor for another input via input device or verbal command to end the call 32, if such input is received, the call is ended 36, and the application enters sleep mode 40.

Figure 6:
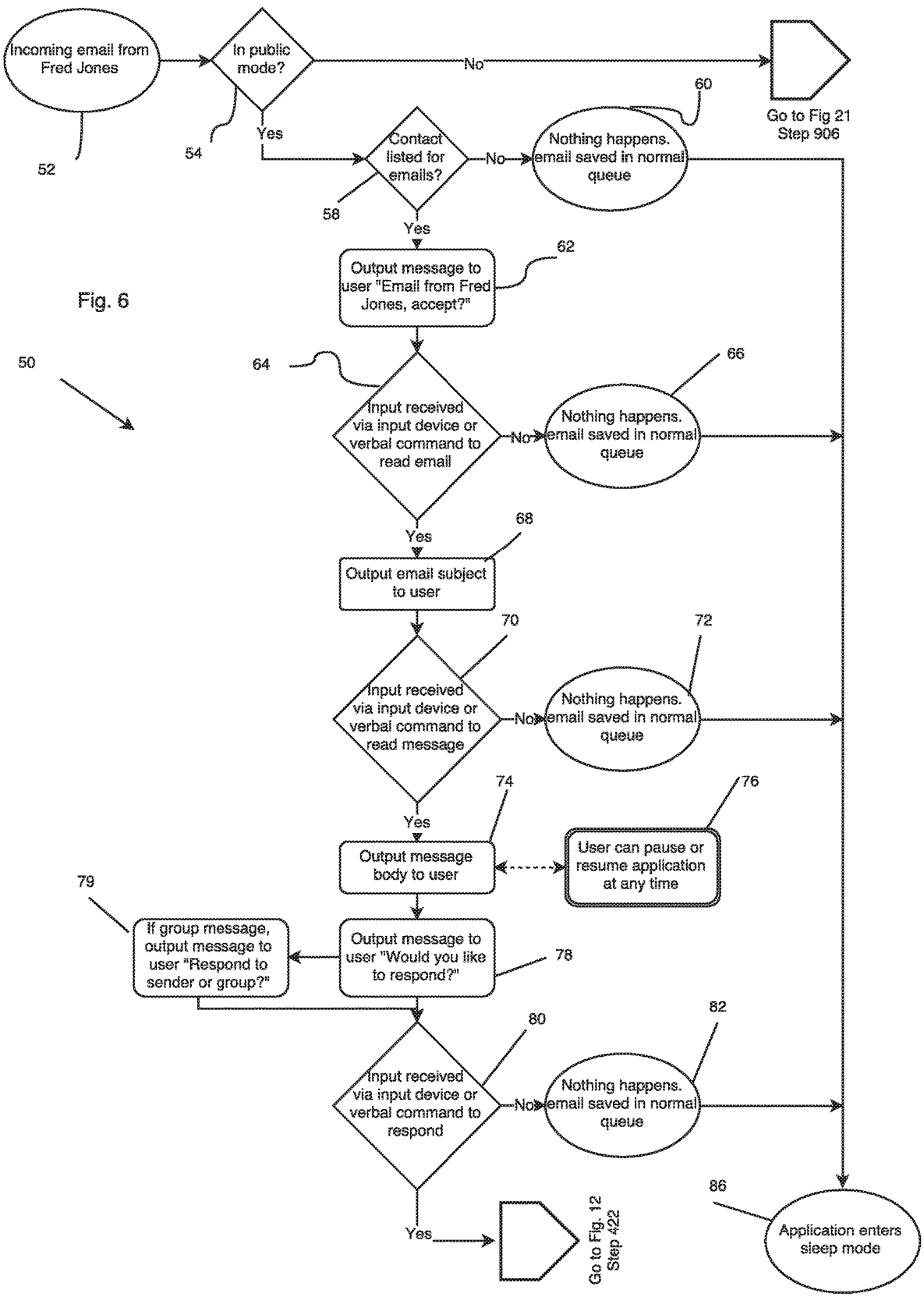
FIG. 6 is a flow diagram of a system embodiment in which an email is received in public mode.
Figure 12:
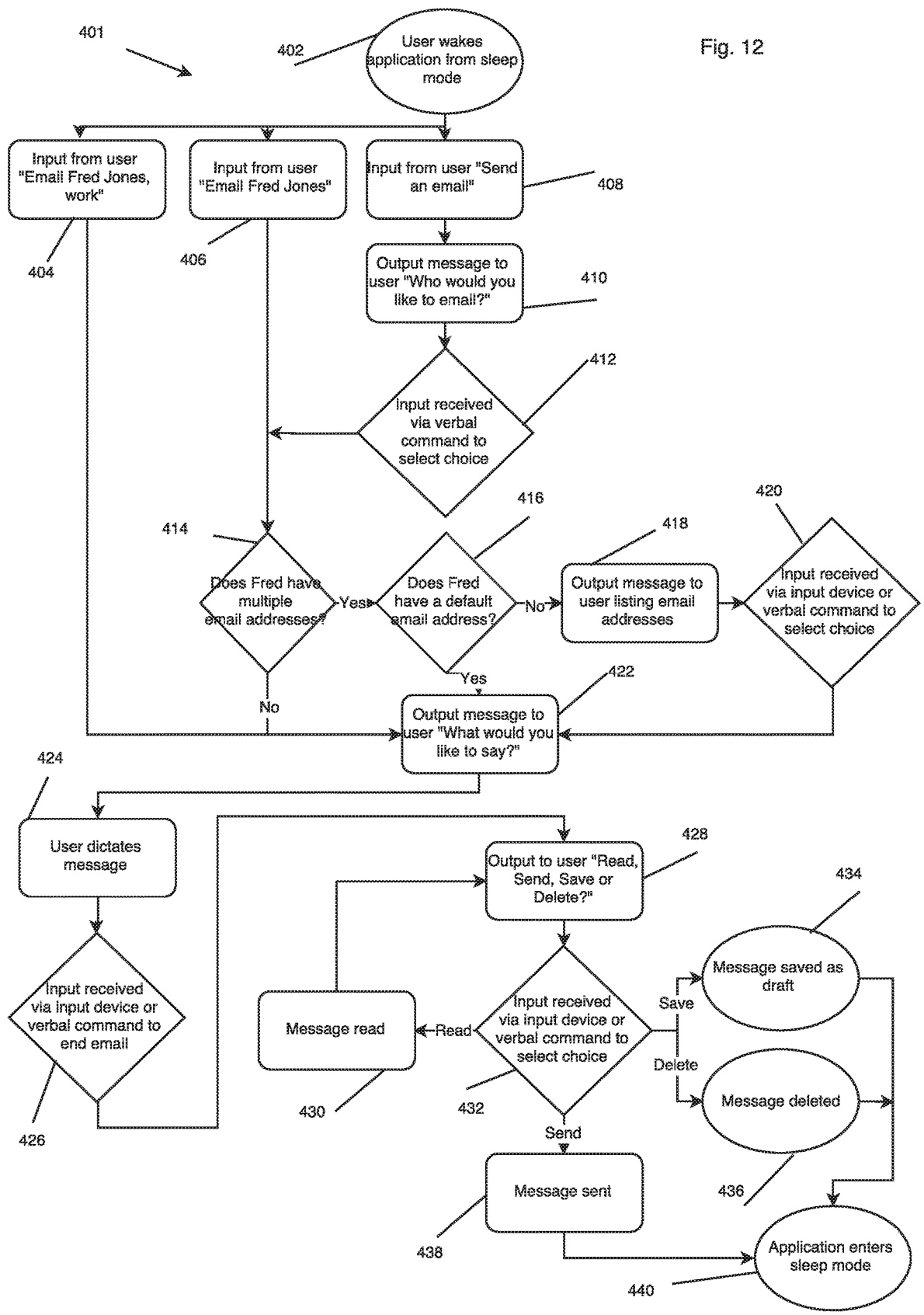
In FIG. 12 a flow diagram of an embodiment in which a text is initiated by a user in public mode is shown.

FIG. 6 is a flow diagram of a system embodiment in which an email is received in public mode 50. An incoming email from Fred Jones 52 is received by an electronic device of the system. The logic determines whether the system is in public mode 54, if not in public mode, the system is in private mode, and the logic proceeds to FIG. 21, step 906. If the system is in public mode, the system determines whether the contact (sender of the email) is listed for emails 58 as per the selected/customized settings by the user. If the contact is not listed for emails, nothing occurs, and the email is saved in the normal queue 60, and the application/software may enter sleep mode 86. However, if the contact is listed for emails, a message is output to the user, such as, for example "Email from Fred Jones, accept?" 62. If a positive input is not received, or a negative input is received by the system via an input device (responsive member) or by verbal command to read email 64, nothing occurs, and the email is saved in the normal queue 66 (where user can read the email at a later point in time), and the application enters sleep mode 86. If a positive input is received at step 64, the subject of the email may be output to the user 68. Following the output 68, if a positive input is not received by the user, email is saved in normal queue 72 for later retrieval and the application enters sleep mode 86. If following the output 68, a positive input is received 70, the message body of the email is output to the user 74. At this point, the user has the option to pause or resume the output reading of the message to the user (or pause or resume the application) at any time 76. Following step 74, a message will be output to the user "would you like to respond?" 78. If the message is a group message, an additional prompt is provided allowing the user to respond only to the sender or to the group 79. If no input is received by the user or a negative/dissentive input is received via input device or verbal command 80, nothing happens and the email is saved in the normal queue 82, and application enters sleep mode 86. If an input is received at step 80, the logic proceeds to FIG. 12, step 422. Additional description regarding FIG. 12 is provided below.

Figure 7:
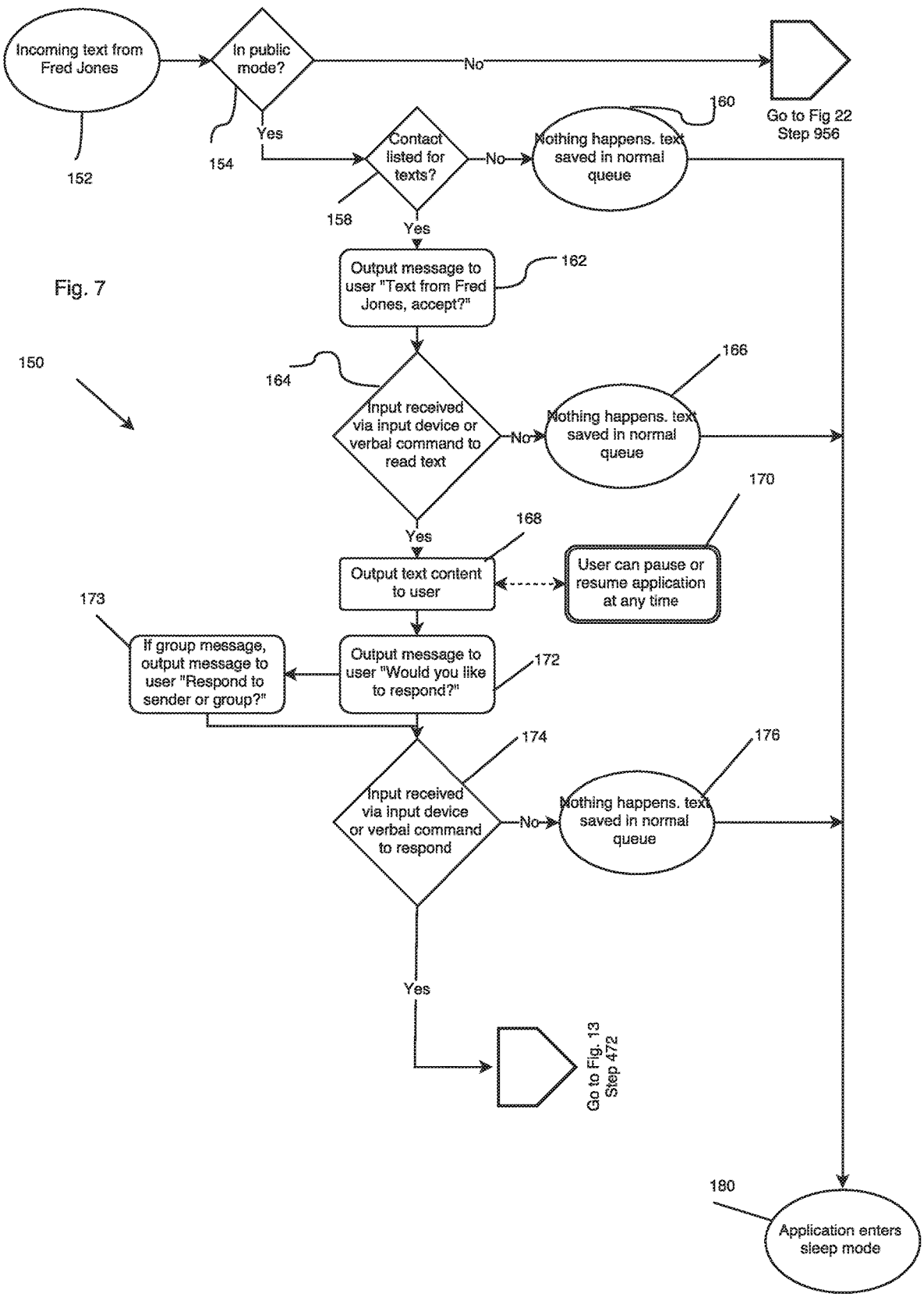
FIG. 7 is a flow diagram providing an embodiment in which an incoming text is received in public mode.

FIG. 7 is a flow diagram providing an embodiment in which an incoming text is received in public mode 150. When an incoming text is received from Fred Jones 152, the logic determines whether it is in public mode 154. If not in public mode, the logic goes to FIG. 22, step 956. If in public mode, logic determines if the contact (sender of the text, Fred Jones, for example) is listed for texts 158. If he is not listed for texts, nothing occurs, text is saved in the normal queue 160, and the application enters sleep mode 180. If the contact, Fred Jones, for example is listed for texts, a message is output to the user "text from Fred Jones, accept?" 162. If no input is received at step 164 or a negative/dissentive input is received, the text is saved in normal queue 166, and the application enters sleep mode 180. If an input is received via input device (responsive member) or by verbal command via input device or electronic device 164, the text content is output to the user via a speaker 168. At this point, the user can pause or resume the application at any time 170. Following output text content to the user 168, a message is output to the user "would you like to respond?" 172. If the message is a group message, an additional prompt is provided allowing the user to respond only to the sender or to the group 173. If an input is not received by the system or a negative/dissentive input is received at step 174, nothing happens, text is saved in the normal queue 176 and the application enters sleep mode 180. If an input is received by the system at step 174, the logic goes to step 472, FIG. 13. See FIG. 13 for more information.

Figure 8:
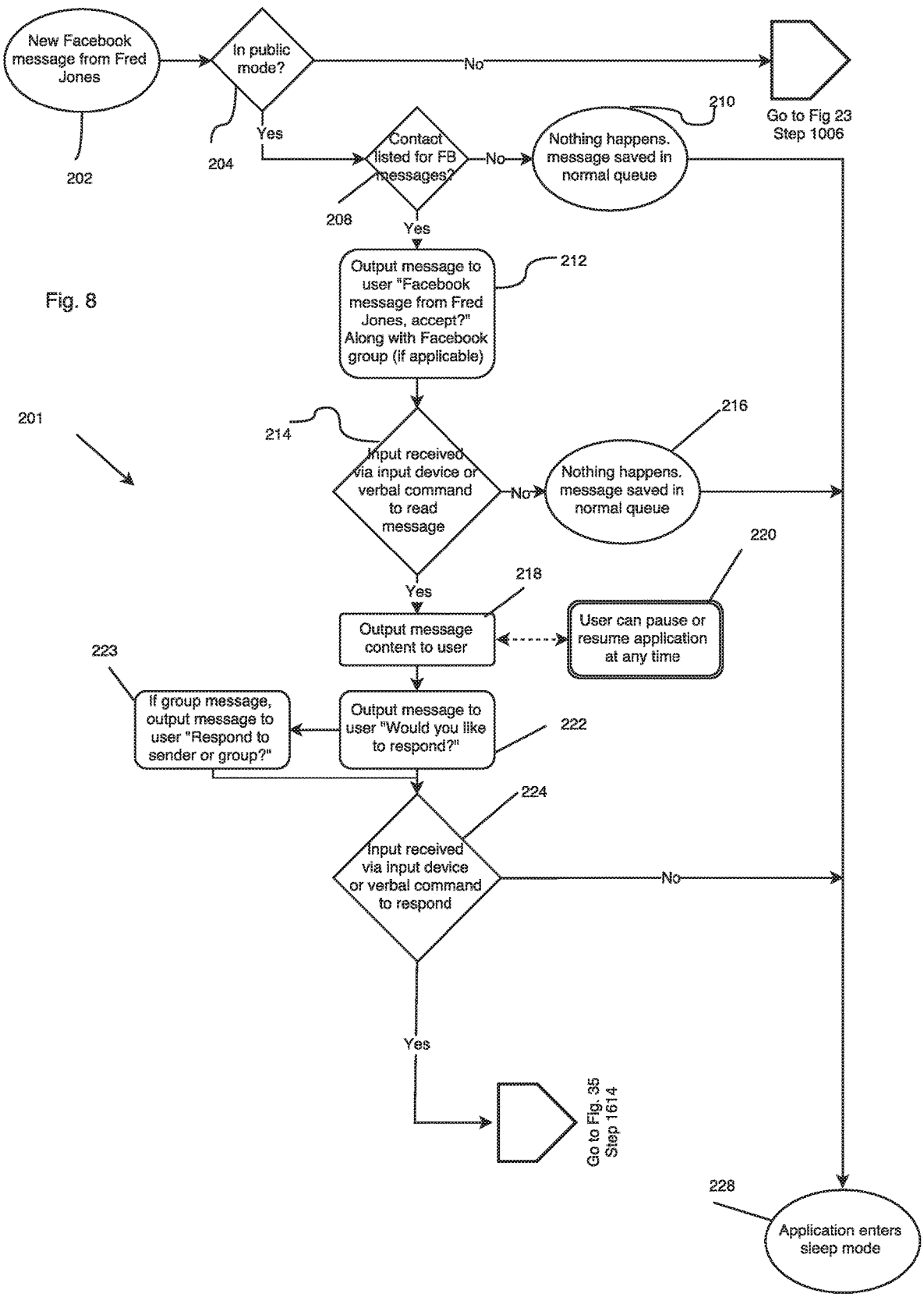
FIG. 8 is a flow diagram of an embodiment in which a Facebook® message is received in public mode.

FIG. 8 is a flow diagram of an embodiment in which a Facebook® message is received in public mode 201. If an incoming Facebook® message is received from Fred Jones 202, the logic determines if it is in public mode 204, if not in public mode, the logic goes to FIG. 23, step 1006. If the logic determines that the system is in public mode at step 204, it determines whether the contact (sender of the Facebook® message) is listed for Facebook® messages 208. If the contact is not listed for this type of message, nothing occurs and the message is saved in the normal Facebook® message queue 210, the application may enter sleep mode 228. If the contact is listed for Facebook® messages, the system outputs a message to a user "Facebook® message from Fred Jones, accept?" This output may possibly include Facebook® group if applicable 212. If no input is received by the system at step 214, or a negative/dissentive input is received, nothing happens and the message is saved in the normal queue 216, and the application enters sleep mode 228. If an input is received by the system via input device or verbal command to read message 214, the content of the message is output to the user 218. At this point, the user can pause or resume the message or the application at any time 220. Following the output of the Facebook® message content, a message is output from the system "would you like to respond?" 222. If the message is a group message, an additional prompt is provided allowing the user, to respond only to the sender or to the group 223. If an input is not received from a user 224, or the input is negative/dissentive the application enters sleep mode 228. If an input is received via input device or verbal command to respond 224, the logic goes to FIG. 35 Step 1614.

Figure 9:
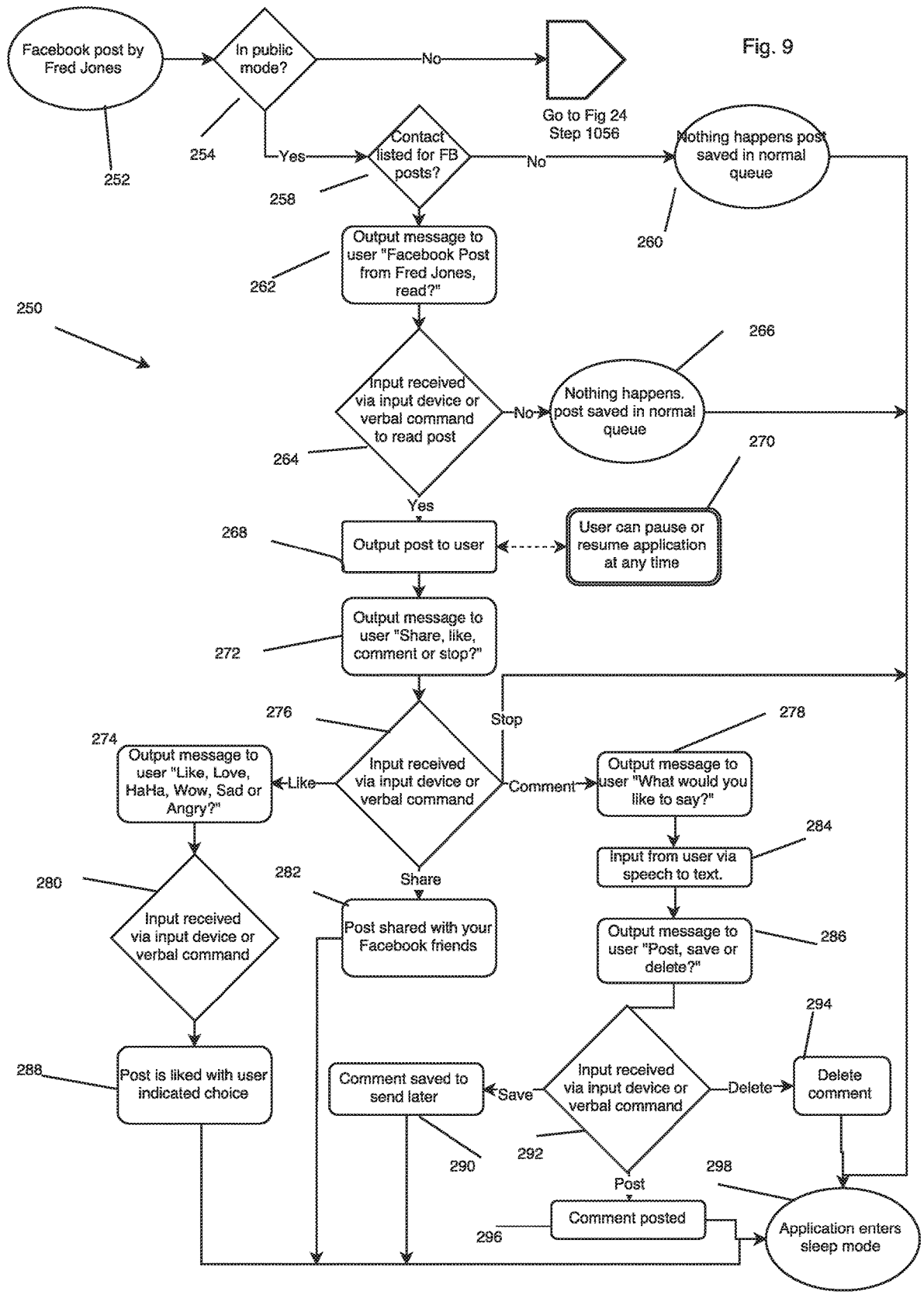
FIG. 9 includes a flow diagram of an embodiment for receiving Facebook® posts in public mode.

FIG. 9 includes a flow diagram of an embodiment for receiving Facebook® posts in public mode 250. Upon receipt of a Facebook® post by Fred jones 252, the logic determines whether the system is in public mode 254. If not in public mode, the logic goes to FIG. 24, step 1056 (please proceed to FIG. 24 for explanation of subsequent steps). If the system is in public mode, the next step is whether the contact (i.e., Fred Jones) is listed for Facebook® posts 258. If he is not, nothing happens and the post is saved in the normal queue 260, and the application may enter sleep mode 298. If the contact is listed for Facebook® posts, a message is output to the user "Facebook® post from Fred Jones, read?" 262. If no input is received 264 or a negative/dissentive input is received, nothing happens and post is saved in the normal queue 266, and the application may enter sleep mode 298. If an input is received via input device or verbal command to read post 264, the post content is output to the user 268. At any point, the user can pause or resume the application 270. After the post is output to the user 268, a message is output to the user including "share, like, comment, or stop?" 272. If an input is received by the system via input device (responsive member or by verbal command), it may include a "like", a "share", a "comment" or a "stop" input. The subsequent step is dependent on the input received. If the input includes "stop", the application enters sleep mode 298. If the input includes "like", a message is output to the user "like, love, haha, wow, sad, or angry?" in one embodiment 274 (these outputs may be customized by the user in the settings for the software). After each possible selection, the output pauses to allow a user to select the intended input. If an input is received via input device or verbal command 280, the post is liked with user indicated choice 288, and the application enters sleep mode 298, in a non-limiting embodiment. If the input received includes "share", the post is shared with the user's Facebook® friends according to privacy settings pre-set by the user in Facebook® settings 282. The application may then enter sleep mode 298. If the input received includes "comment" a system message is output to the user "what would you like to say?" 278. An input may be received from the user and translated via speech to text 284, a system message may be output to a user "post, save, or delete?" 286, at which point the system may receive an input via the input device or by verbal command, if "save" is indicated, the comment is saved to send later 290 and the application enters sleep mode 298. If the input received 292 is "post", the comment is posted 296 and the application may enter sleep mode 298, and if the input received is "delete" 294, the comment is deleted, and the application enters sleep mode 298.

Figure 10:
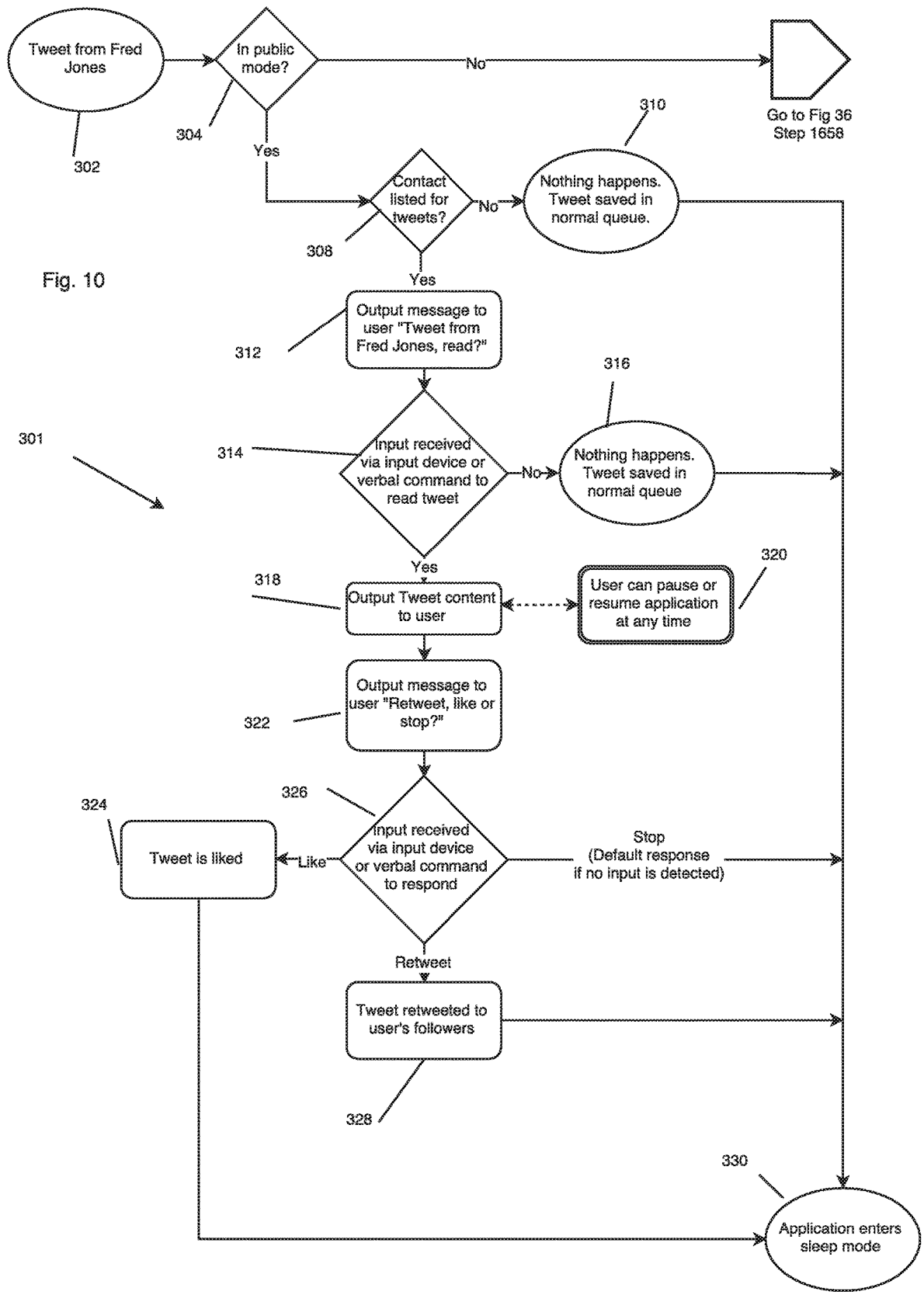
FIG. 10 is a flow diagram of an embodiment for receiving Tweets in public mode is shown.

In yet another embodiment, in the flow diagram provided in FIG. 10, an incoming tweet received in public mode is shown 301. Upon receiving a tweet from Fred Jones 302, the logic determines whether the system is in public mode 304, if not in public mode, the logic continues to FIG. 36 Step 1658 as shown. If the logic determines that public mode 304 has been selected, the logic determines whether the contact/sender of the tweet (i.e., Fred Jones) is listed for tweets 308, if he is not, nothing happens and the tweet is saved in the normal queue 310 and the application may enter sleep mode 330. If the contact is listed for tweets 308, a message is output to the user "Tweet from Fred Jones, read?" 312. If an input is not received by the system from the user via input device or verbal command to read the tweet 314, or a negative/dissentive input is received, nothing happens, the tweet is saved in the normal queue 316, and the application enters sleep mode 330. If an input is received at step 314, the tweet content is output to the user 318. At this point, the user has the option to pause or resume the output reading of the message to the user (or pause or resume the application) at any time 320. Following the output of the content of the tweet, a system message is output to the user, such as "retweet, like or stop?" 322. (In one embodiment, these choices are customizable by the user to account for changes in the messaging provider.) Based on an input received by the user via input device or verbal command 326, if a user provides an input to "Like", the tweet is liked 324 and the application enters sleep mode 330. If the input received is to "retweet", the tweet is retweeted to the user's followers 328, and the application may enter sleep mode 330. If the input is received indicating "stop", the application enters sleep mode 330 (however, the "stop" response is the default response if no input is detected by the system at step 326.

Figure 11:
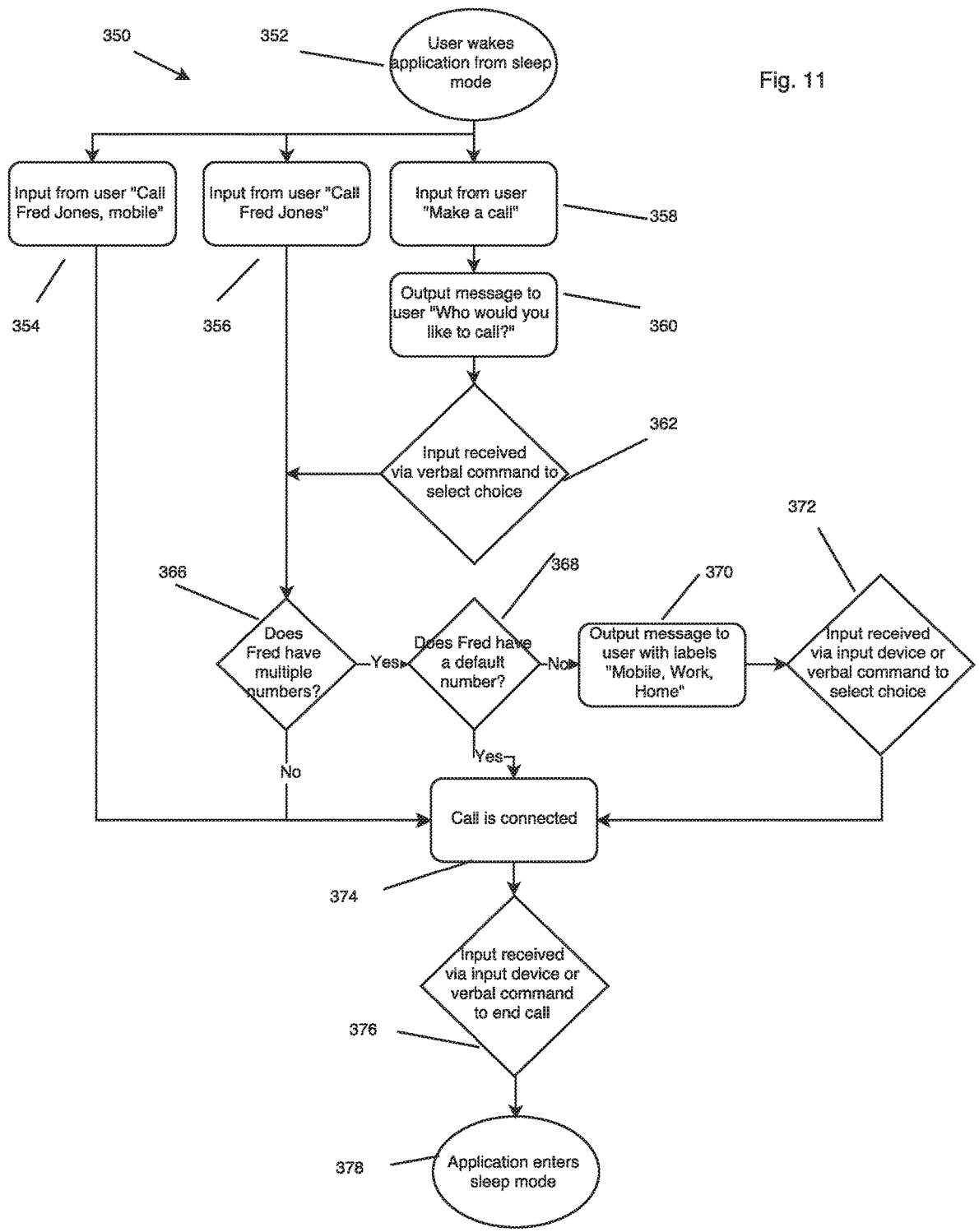
FIG. 11 provides a flow diagram of an embodiment in which the system is in public mode and a call is initiated by a user.

FIG. 11 provides a flow diagram of an embodiment in which the system is in public mode and a call is initiated by a user 350. The software may be constantly monitoring for a user input, for example, it may be activated upon receiving a voice command, such as "Tele" or by use of a signaling device to wake up the application from sleep mode 352. Following wake-up, the user may indicate "call Fred Jones, mobile" 354 by input, wherein the call is connected 374, and input may be thereafter received by the system via input device or verbal command to end the call 376, where after, the application may enter sleep mode 378. If an input is received from a user such as "call Fred Jones" 356, the logic may determine whether Fred has multiple numbers 366, and if Fred has multiple numbers, whether he has a default number 368, if he does not, a message is output to the user with labels such as "mobile, work, home" 370 and an input may be received from the user via input device or verbal command to select choice 372, where upon the call may be connected 374. If Fred does not have multiple numbers, the call is connected to his number 374. If Fred has a default phone number 368, the call may be connected 374 via the default number. If following waking the application, an input is received from a user such as "make a call" 358, the system may output a message to the user, such as "who would you like to call" 360, whereupon the system may receive an input via verbal command 362, which may then continue at step 366.

In FIG. 12 a flow diagram of an embodiment in which a text is initiated by a user in public mode 401. The system may be awoken by using a key word, such as "Tele," or a particular contact with a responsive member, or a combination of responsive members, for example, or a combination of contacts to wake up the system from sleep mode 402. Upon input from a user "email Fred Jones work" 404 by verbal command, a system message may be output to a user "what would you like to say?" 422, whereupon the user may dictate the message 424, following input received by the system from the user 426, a system message may be output to the user "read, send, save or delete?" 428, if the input received 432 includes "read", the message is read to the user 430, and the user is redirected to step 428 whereby the system outputs "Read, Send, Save or Delete?" if the input received includes "send" the message is sent 438, and the application may enter sleep mode 440. If the input received 432 includes "save", the message is saved as a draft 434 and the application may enter sleep mode 440, and if the input received indicates "delete", the message is deleted 436, and application may enter sleep mode 440. If following step 402, the input received from the user is "email Fred Jones" 406, The system may determine whether Fred has multiple email addresses 414 stored in user's contact list, or in user's email contacts. If the logic determines that he does not have multiple email addresses, the logic continues with step 422 as above. Upon input by user "send an email" 408, a message is output to the user "Who would you like to email?" 410, and upon further input via verbal command to select a choice 412, the system determines whether the selected email recipient has multiple email addresses 414, if not, the logic continues to step 422 as aforementioned. If the selected recipient (i.e., Fred) has multiple email addresses, the logic determines whether he has a default email address 416, if he does not, a system message is output to the user listing email addresses that are stored 418 in memory or in email contact list, based on an input received by the user 420, the logic proceeds to step 422 as above. If Fred does have a default email address at step 416, the logic proceeds directly to step 422, and a system message is output to the user "what would you like to say?" 422.

Figure 13:
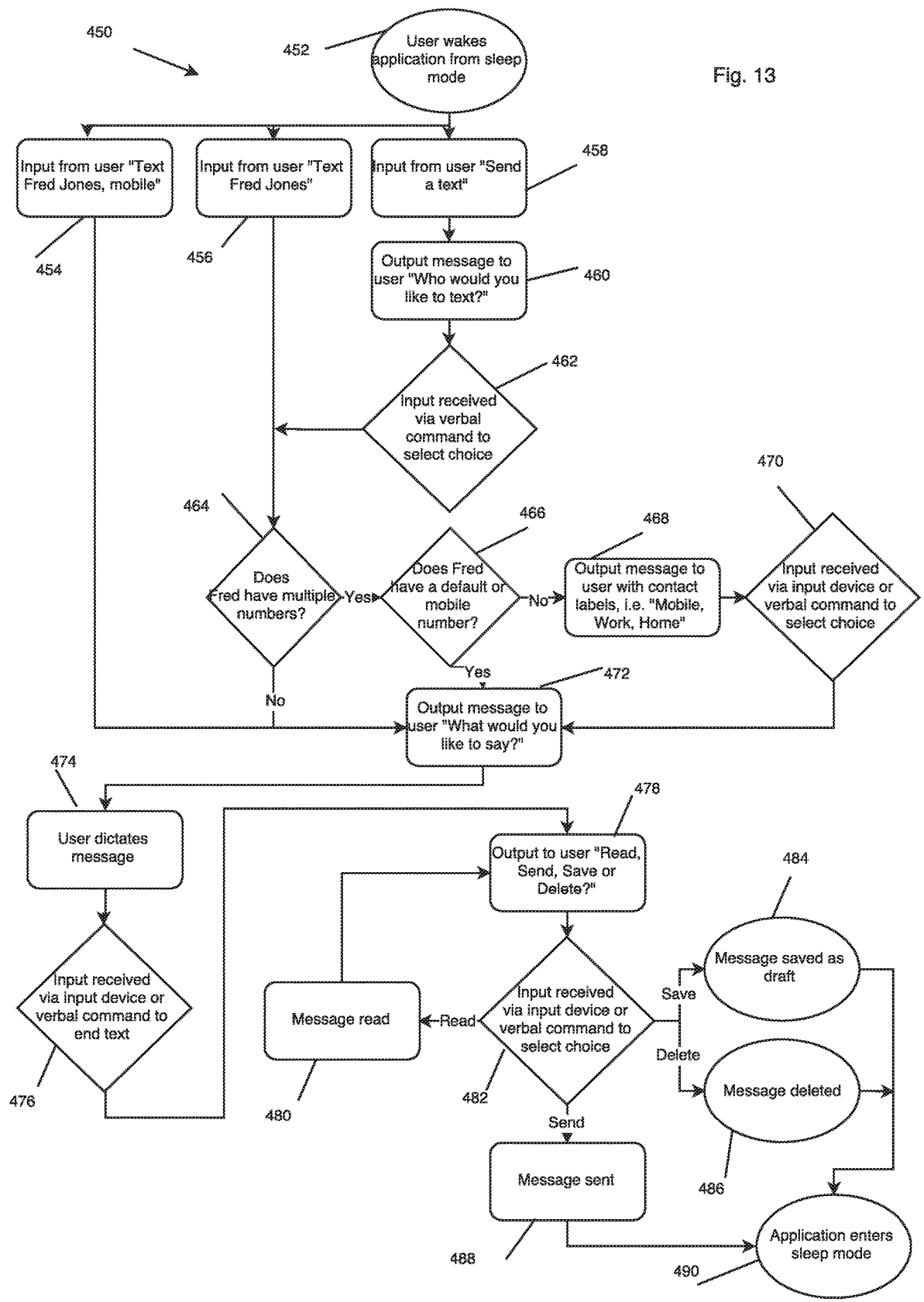
In FIG. 13, a flow diagram is provided demonstrating an embodiment of the system, wherein a text is initiated by a user in public mode.

In FIG. 13, a flow diagram is provided demonstrating an embodiment of the system 450, wherein a text is initiated by a user in public mode. The system or application may be awoken in any number of ways 452 at which point the user may initiate a text by providing an input which may be provided verbally in some non-limiting embodiments, such as to say "Text Fred Jones mobile" 454, wherein the system outputs a message to the user asking "what would you like to say?" 472, user may dictate a message 474 receivable by a microphone of the system, input may be received by input device or verbal command to end text 476, upon which an output may be provided to the user "Read, Send, Save or Delete?" 478. A positive input from the user via input device or verbal command to select the choice 482 occurs, wherein an input to "read" causes the message to be read 480 upon which the system returns to step 478, an input selection of "send" causes the message to be sent 488, whereinafter the application may enter sleep mode 490. If an input is received to "save" the message, the message is saved as a draft 484, whereinafter the application may enter sleep mode 490, and if the input received is to "delete" message, the message is deleted 486, whereinafter the application may enter sleep mode 490. When an input from user includes "text fred jones" 456, system identifies if Fred has multiple numbers 464, if he does not, system will output message to user "what would you like to say 472, and will proceed as previously provided above. If user provides input after waking to "send a text" 458, a message will be output to user "who would you like to text" 460, at which point an input may be received by user via verbal command to select choice 462, whereinafter the system may ask if Fred has multiple numbers 464, if he does not, the system will continue as above. If Fred has multiple numbers as determined by the system, the system will inquire does Fred have a default or mobile number 466, if he does not, an output message to the user with labels from his contact record "mobile, home, work," 468 will occur, following receipt of input from user to select choice 470, a message will be output to the user "what would you like to say" 472, and the system will continue to the next step as provided above.

Figure 14:
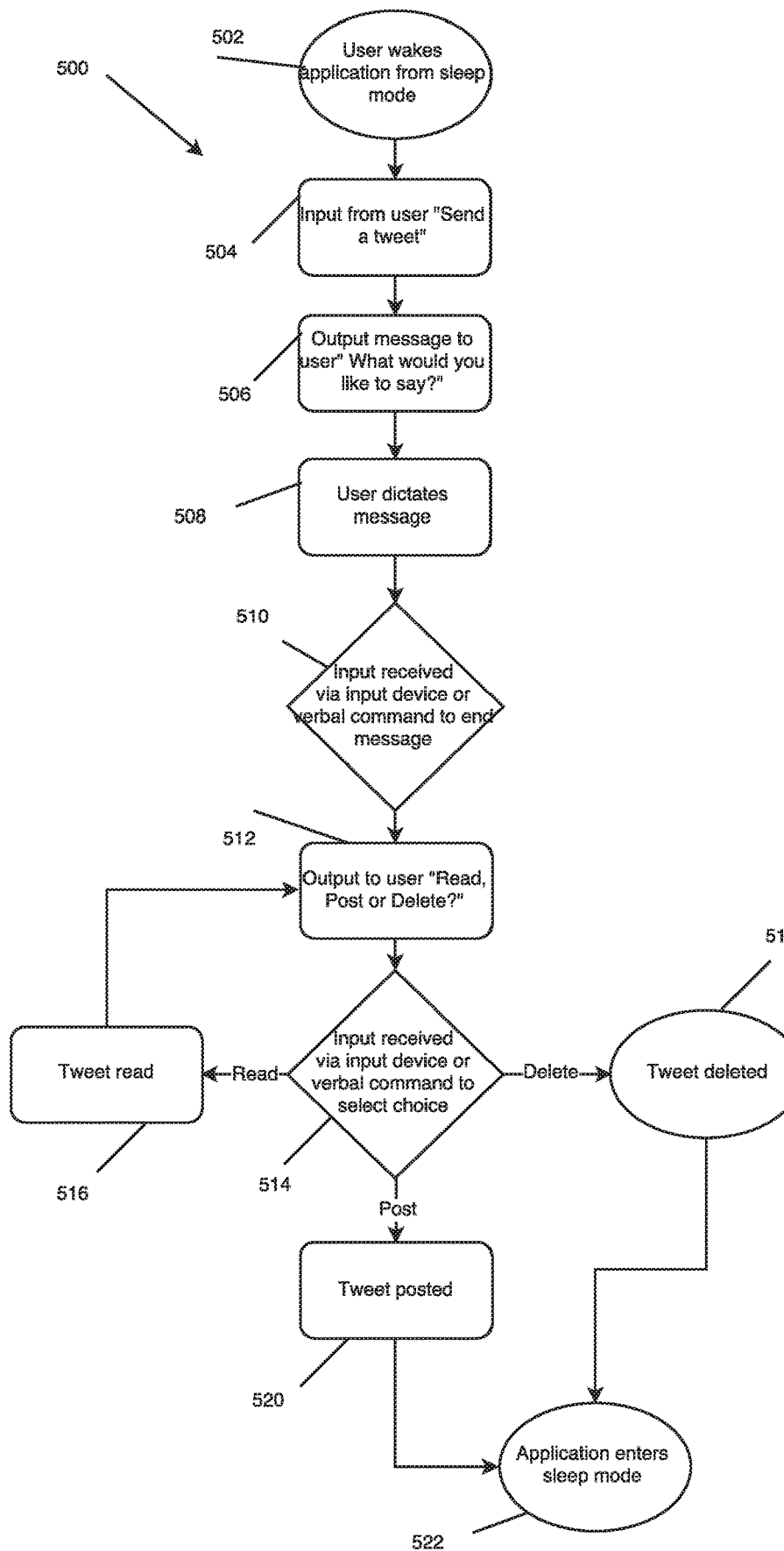
FIG. 14 is a flow diagram of an embodiment in which a tweet is initiated by the user in public mode.

In an embodiment, shown in FIG. 14, a tweet is initiated by the user in public mode 500. The user may wake the application and/or system from sleep mode 502 by any of the methods hereinbefore described. An input from the user may be received to "send a tweet" via verbal input, for example 504. A message is output from the system to the user "what would you like to say?" 506, whereinafter user may dictate the message 508. Upon receipt of input to end message via verbal command or by responsive member, for example, 510, a message is output to the user "read, post, or delete?" 512. An input may be received to select the user's choice 514, if "read" is selected, the Tweet is read to the user 516, upon which the logic is redirected to step 512, if "post" is selected, the Tweet is posted 520, and application and/or system enters sleep mode 522, if "delete" is selected, the tweet is deleted 518, upon which sleep mode is entered 522.

Figure 15:
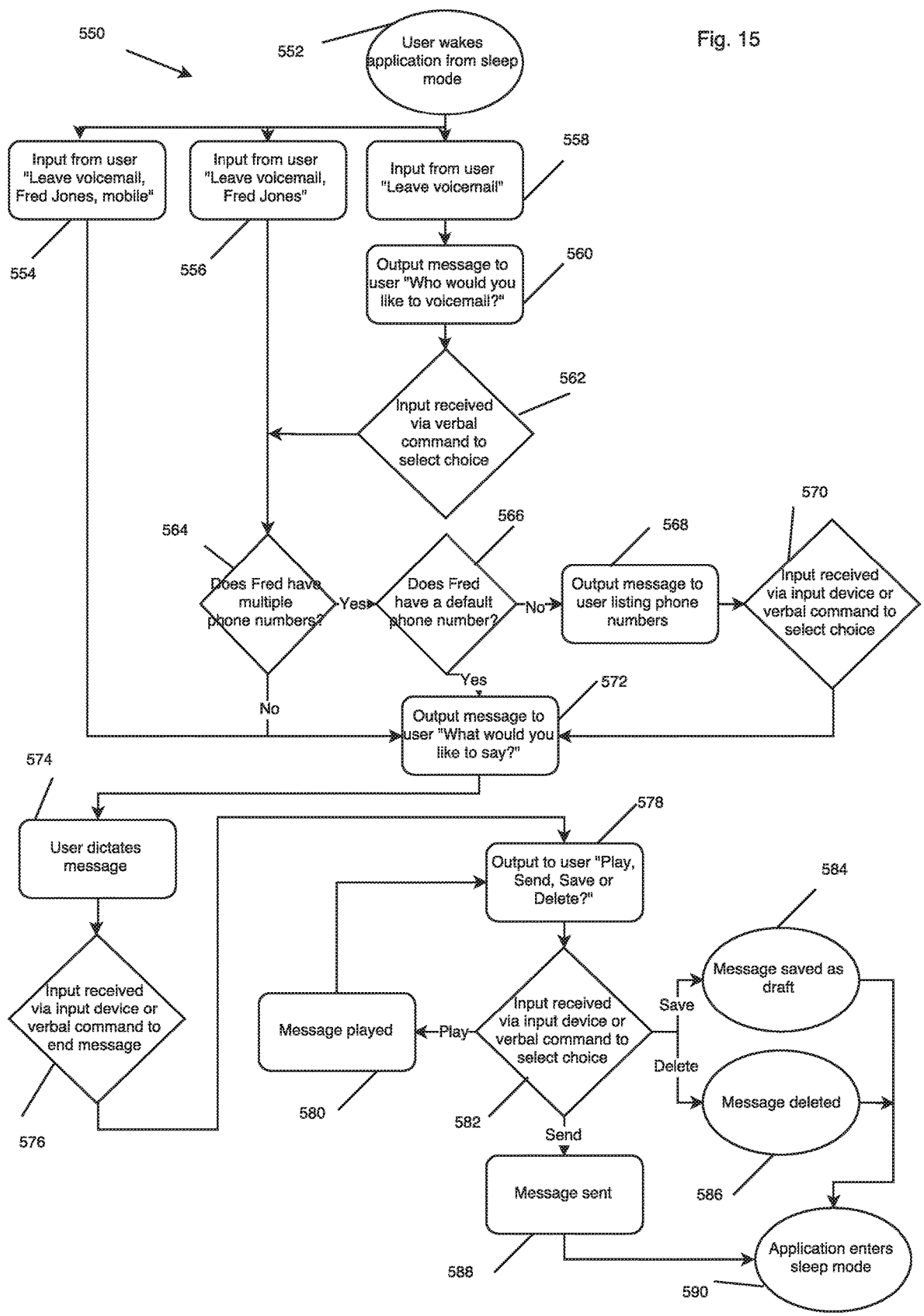
FIG. 15 is a flow diagram of an embodiment wherein a voicemail is initiated by a user in public mode.

FIG. 15 shows an embodiment 550 wherein a voicemail is initiated by a user in public mode. The application and/or system is awakened from sleep mode 552, in one non-limiting embodiment. Though the flow diagrams show "awaken from sleep mode" by user as a first step, in some embodiments the application and/or system may already be in awake mode, in which case this first step is not required. Once awake, an input is received from a user "leave voicemail, fred jones, mobile" 554, upon which a message is output to a user "what would you like to say?" 572, the user may dictate a message 574, and following input received by user to end the message 576, an output may be provided to a user to "play, send, save, or delete?" the message 578, the system will detect whether an input is received from a user to select the choice 582, if "play" is selected the message is played 580, and the logic returns to output to the user "play, send, save or delete?" 578, if an input is received to select choice, the logic continues as shown in FIG. 15. If "send" is selected, the message is sent 588, and application and/or system enters sleep mode 590. If "save" is selected, the message is saved as a draft 584, and application/system enters sleep mode 590, and if "delete is selected, the message is deleted 586, and application/system enters sleep mode 590 in a non-limiting embodiment.

Figure 16:
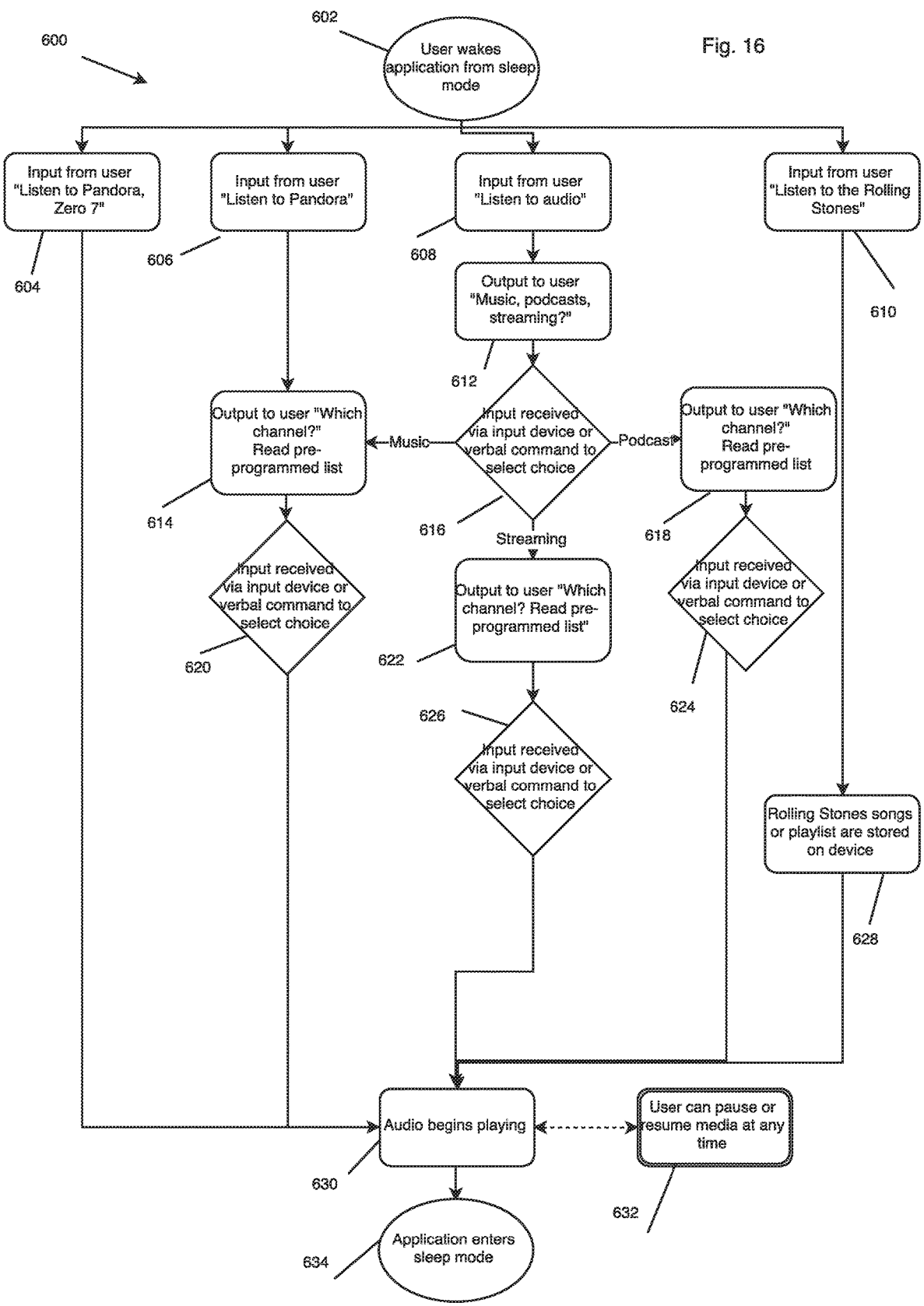
FIG. 16 is a flow diagram of an embodiment of the system wherein a user may select to listen to audio in public mode.

In another embodiment 600 shown in FIG. 16, a user may select to listen to audio in public mode. Upon waking the application/system from sleep mode 602, in a non-limiting embodiment, an input may be received from user "listen to Pandora, Zero 7" 604, for example, the audio begins playing 630 through the speaker, whether on the output device or the electronic device, or in some non-limiting embodiments, a separately connected speaker device, following which application may enter sleep mode 634, in a non-limiting embodiment. When audio is playing, the user can pause or resume media at any time 632, to initiate any of the message types here within or receive prompts from the application upon receipt of incoming calls or messages. Upon an input from user "Listen to Pandora" 606, for example, an output may be provided "which channel?" and a pre-programmed list may be read to the user 614, or the user may speak the desired channel, upon input received from user to select choice 620, the audio may begin playing 630. If an input is received from the user "listen to audio" 608, an output may be provided to the user "music, podcasts, streaming?" 612, based on input received by user 616, if "music" is selected an output is provided to the user "which channel?" and a pre-programmed list may be read 614, or the user may speak the desired channel, and the logic continues as described above. If "streaming" is selected, an output to the user "which channel?" and a pre-programmed list is read 622 to user, or the user may speak the desired channel, wherein upon input received by user 626, the audio begins playing 630, and thereafter the application may enter sleep mode 634. Upon "podcast" selection by user, an output is provided "which channel" and a pre-programmed list is read to user 618, or the user may speak the desired channel, whereinafter based on input received by user to select choice 624, the audio begins playing 630. If input is received from user "listen to the rolling stones" 610, and rolling stones songs or playlist are stored on the device 628, audio begins playing 630, and the application enters sleep mode 634.

Figure 17:
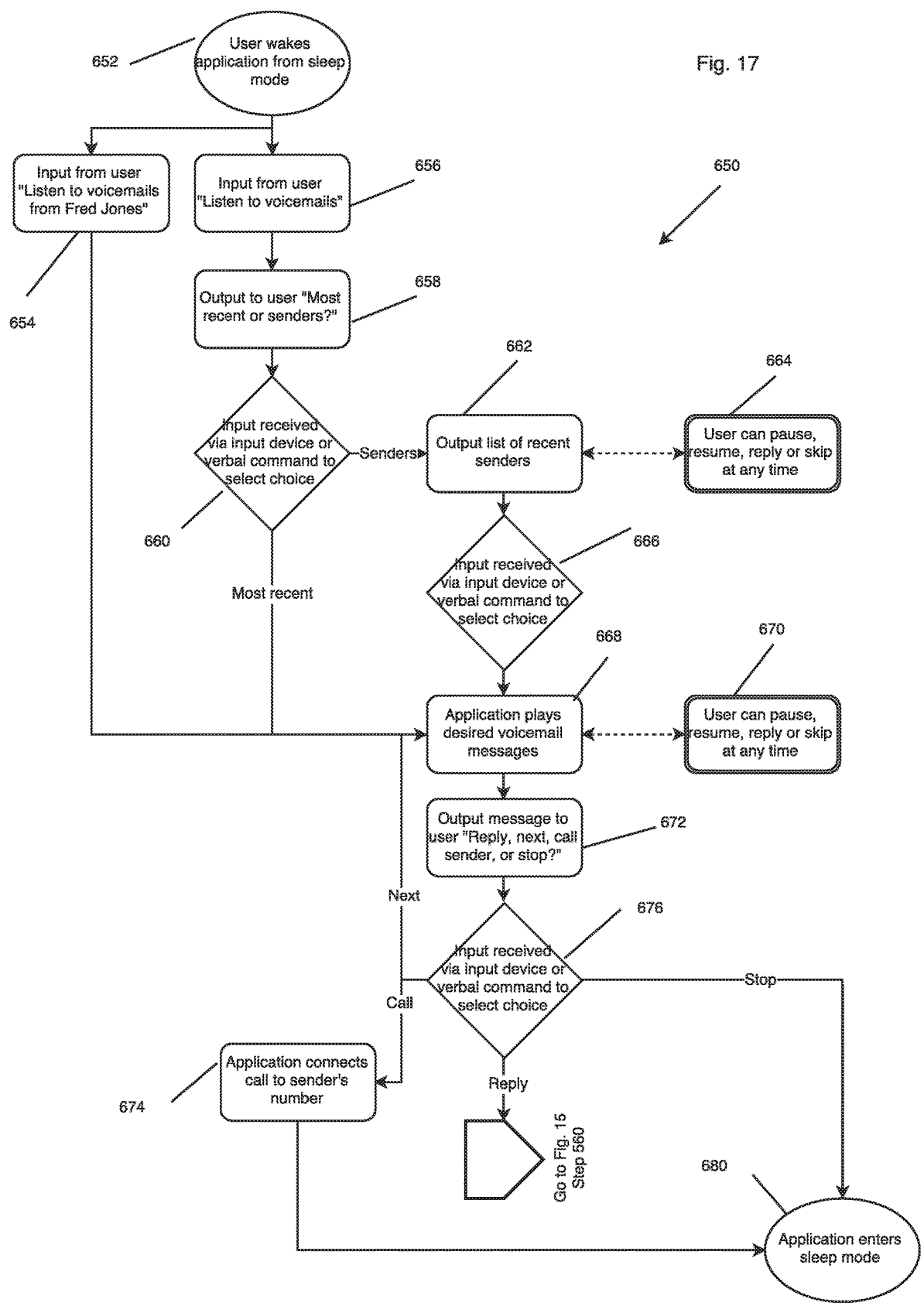
FIG. 17 is a flow diagram of an embodiment in which a user may listen to their voicemails in public mode.

In an embodiment 650 provided in FIG. 17, a user may listen to voicemails in public mode. Upon waking the application from sleep mode 652, and upon input received from user "Listen to voicemails from Fred Jones" 654, application plays desired voicemail messages 668, at which point user can pause, resume, reply, or skip at any time 670. Thereafter an output message to user is played "reply, call sender, next, or stop?" 672, upon receipt of input from user 676 to "call", application connects call to sender's number 674, upon "reply" logic proceeds to FIG. 15, Step 560. Upon "next" the next voicemail in the queue is played. Upon "stop" by user, application enters sleep mode 680. While desired voicemail message is being played 668, the user may pause, resume, reply or skip at any time 670 by input. Upon input from user "listen to voicemails" 656, an output is provided to user "most recent or senders?" 658, upon input received from user 660 to select "most recent", application plays desired voicemail messages 668 and logic proceeds as provided above. Upon selection by user of "senders", an output is provided to user of list of recent senders 662, at which point user can pause, resume, reply, or skip at any time 664, upon receipt of input by user 666 during output list of recent senders 662, application plays desired voicemail messages 668 and logic proceeds as provided above.

Figure 18:
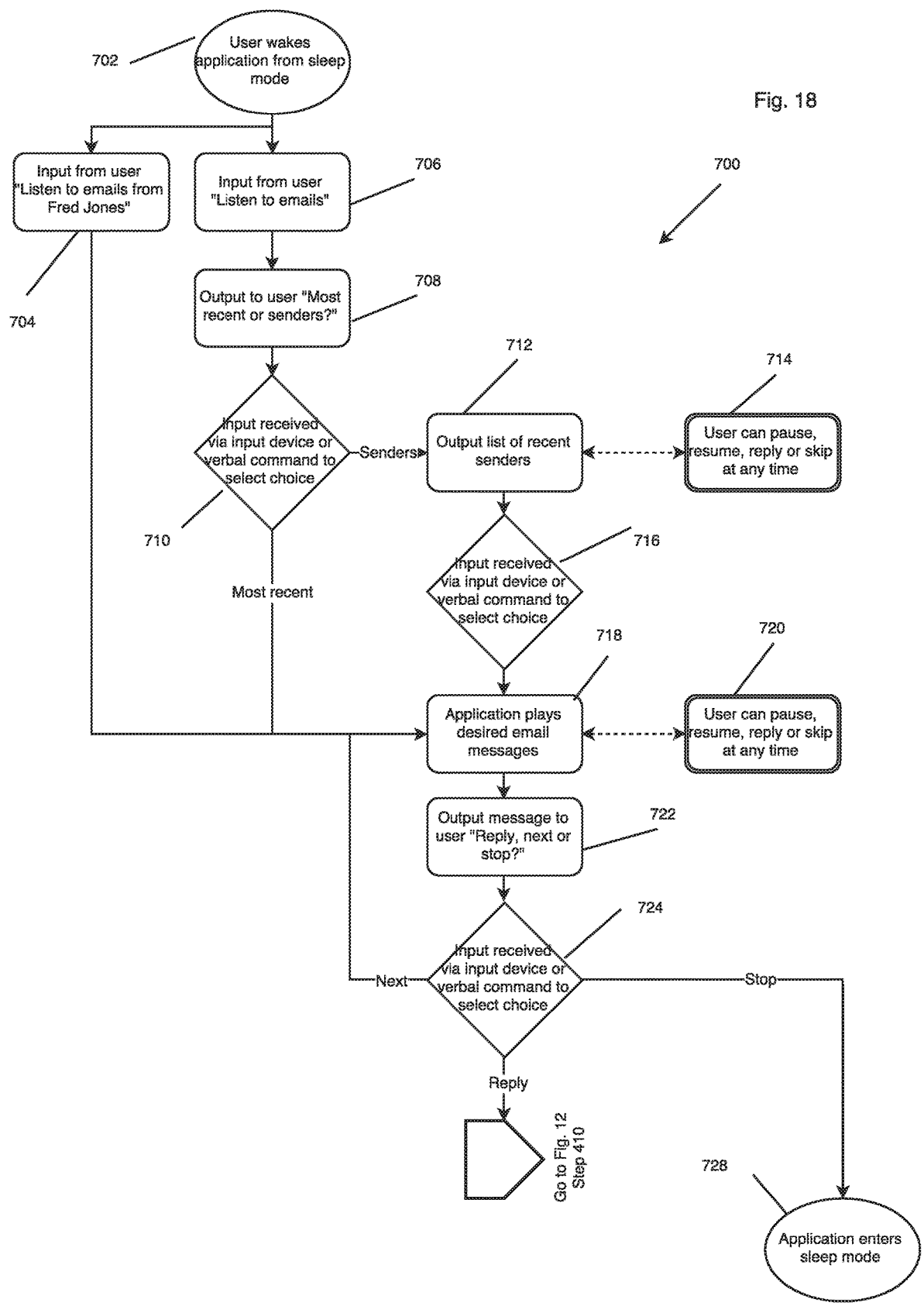
FIG. 18 is a flow diagram of an embodiment in which a user may read email(s) in public mode.

In an embodiment 700 shown in FIG. 18, a user may read their email in public mode. Following waking of application and/or system from sleep mode 702, and upon receipt of input from user "listen to emails from Fred Jones" 704, desired email messages may be output to user 718, followed by output to user "reply, next or stop?" 722, upon input from user to select choice 724, if user selects "next", the next email in the queue is played, if user selects "stop," application enters sleep mode 728, if user selects "reply" the logic continues to FIG. 12, step 410. At any point during output of desired email messages, the user can pause, resume, reply or skip 720 by input from user. Following waking application and/or system from sleep mode 702, and upon receipt of input from user "listen to emails" 706, output is provided to user "most recent or senders?" 708, wherein upon input received from user to select choice 710, if "most recent" is selected, application plays most recent email message 718 and proceeds with logic as provided. If user selects "senders", an output list of recent senders 712 is provided, and upon selection by user via input to select choice 716, application plays desired email message 718 and proceeds with the logic as described. At any point during the output of the list of recent senders 712, the user can pause, resume, reply or skip at any time 714 via verbal or responsive member input.

Figure 19:
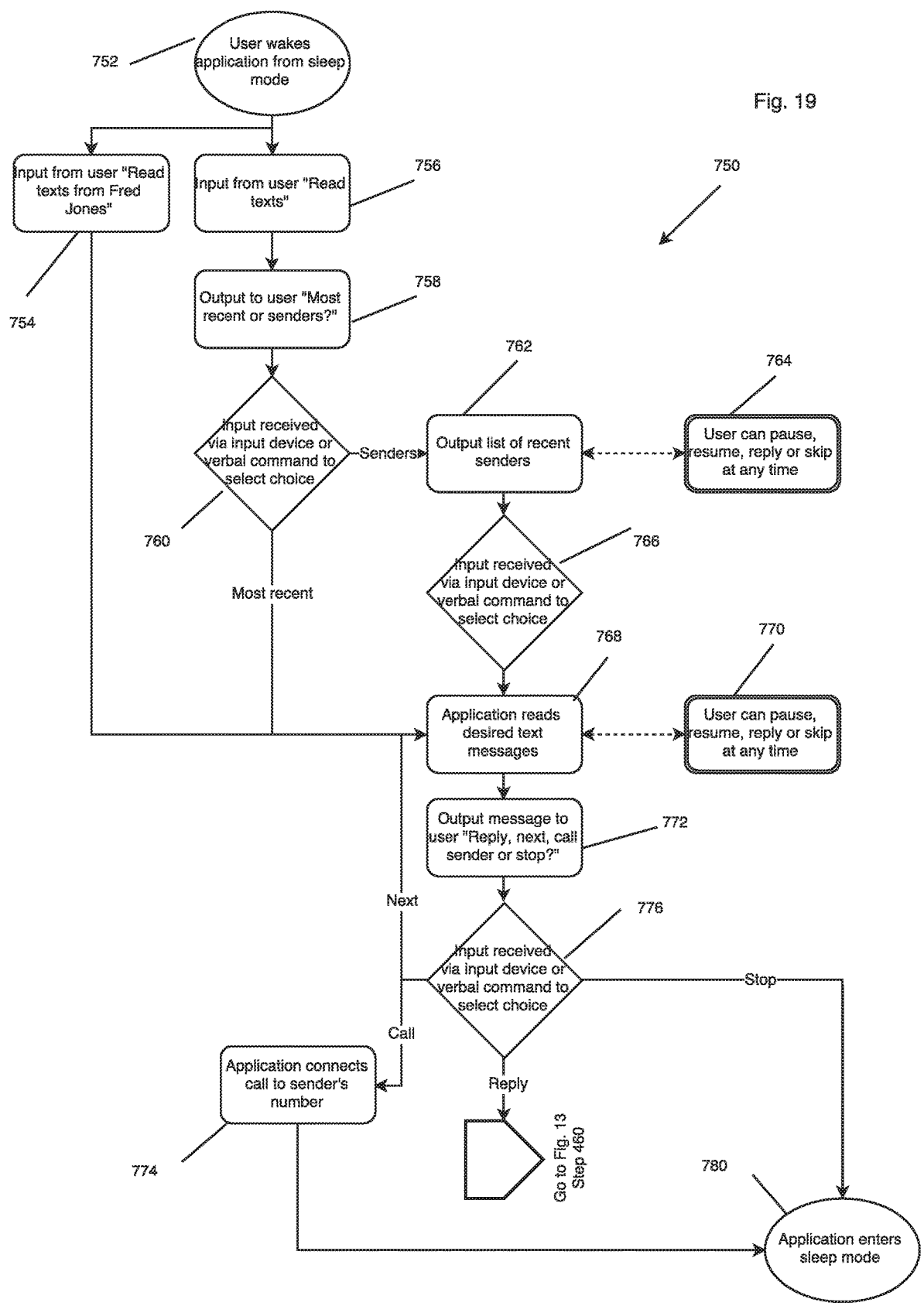
FIG. 19 is an embodiment of a flow diagram in which a user may read texts in public mode.

In an embodiment 750 shown in FIG. 19, a user may read texts in public mode. Upon waking the application/system from sleep mode 752, an input may be received to "read texts from Fred Jones" 754, upon which an output is provided to the user reading desired text messages 768, following which an output to user includes "reply, next, call sender, or stop?" 772, based on input received from the user to select choice 776, if "call sender" is selected, application connects call to sender's number 774, if "reply" is selected, logic continues to FIG. 13, step 460, if "next" is selected the next text in the queue is read, and if "stop" is selected, application enters sleep mode 780. Upon input received from user to "read texts" 756, an output is provided to user "most recent or senders?" 758, upon input received to select choice 760 of 'most recent" application reads most recent text message 768, and logic proceeds as described above. Upon selection of "senders" by user, an output to user of recent senders list is provided 762, wherein user can pause, resume, reply or skip 764 at any time. Following input received from user 766, application reads desired text messages 768 (at which point user can pause, resume, reply or skip at any time 770 during the output of the desired message), and logic proceeds to step 772 as described above.

Figure 20:
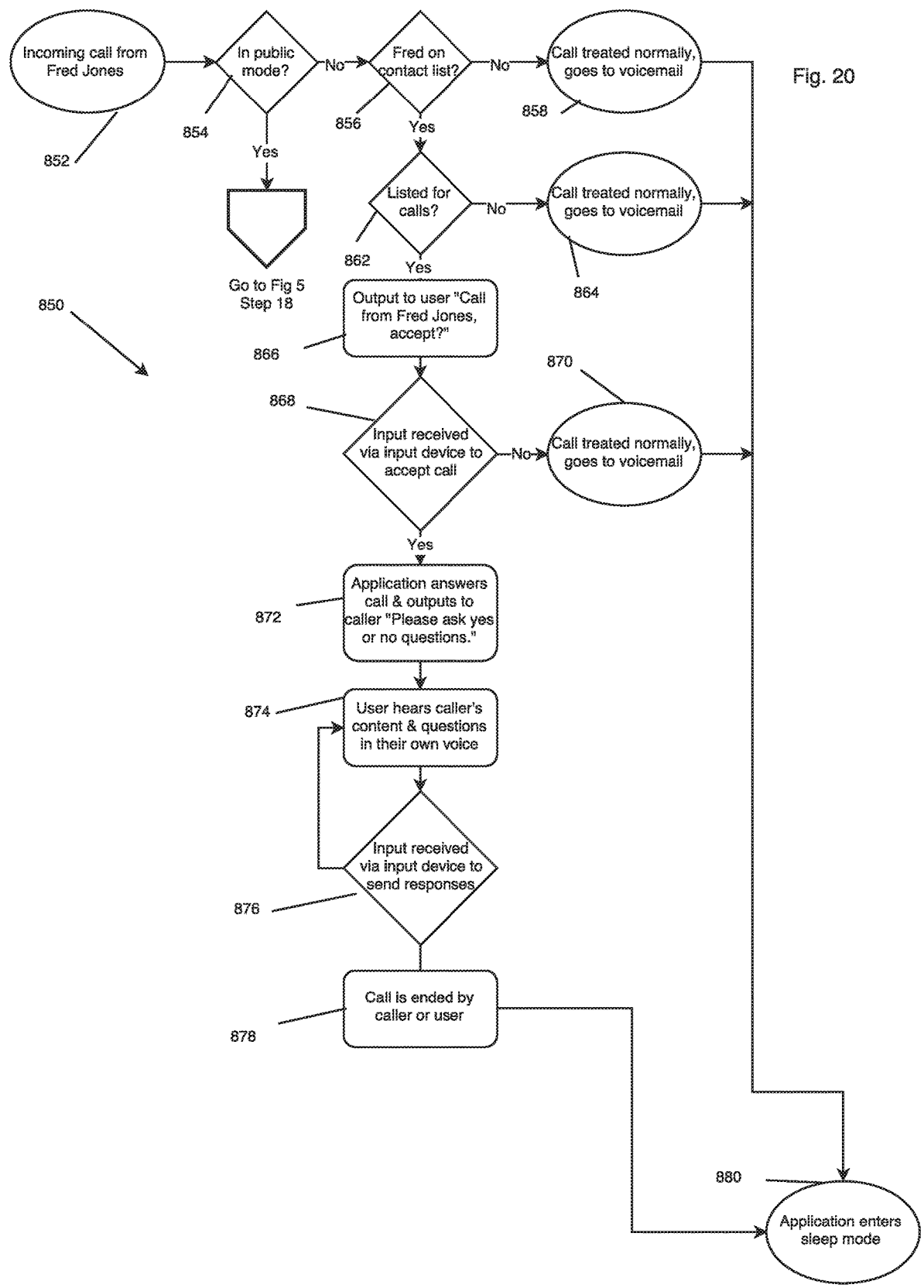
FIG. 20 is an embodiment of the system shown in a flow diagram in which an incoming call may be received in discreet/private mode.

In an embodiment 850 shown in FIG. 20, an incoming call is received in discreet/private mode. Upon receipt of an incoming call from Fred Jones by the electronic device 852, the logic determines whether or not the application is in public mode 854, if it is in public mode, the logic proceeds to FIG. 5, step 18. If not in public mode, it is determined whether Fred is on a contact list 856 selected by user for receipt of incoming call, if Fred is not on contact list, call is treated normally and goes to voicemail 858, at which point the application may enter sleep mode 880.

If Fred is on contact list, the logic determines whether the contact list that includes Fred is listed for calls 862, if the answer is no, the call is treated normally and goes to voicemail 864 at which point the application may enter sleep mode 880. If the list that Fred is on is listed/approved for calls 862, an output is provided to the user "call from Fred Jones, accept?" 866. If a positive input is not received from input device to accept call 868 or a negative/dissentive input is received, the call is treated normally and goes to voicemail 870. If an affirmative/positive input is received to accept the call 868, electronic device answers call and application outputs to caller "Please ask yes or no questions." 872. The user hears the caller's content and questions in caller's voice 874, following input received from user to send responses (i.e., via responsive member(s)) 876, user may hear caller's content and questions in their own voice 874 if back and forth communication ensues. If not, the call may be ended by caller or user 878, at which point the application may enter sleep mode 880.

Figure 21:
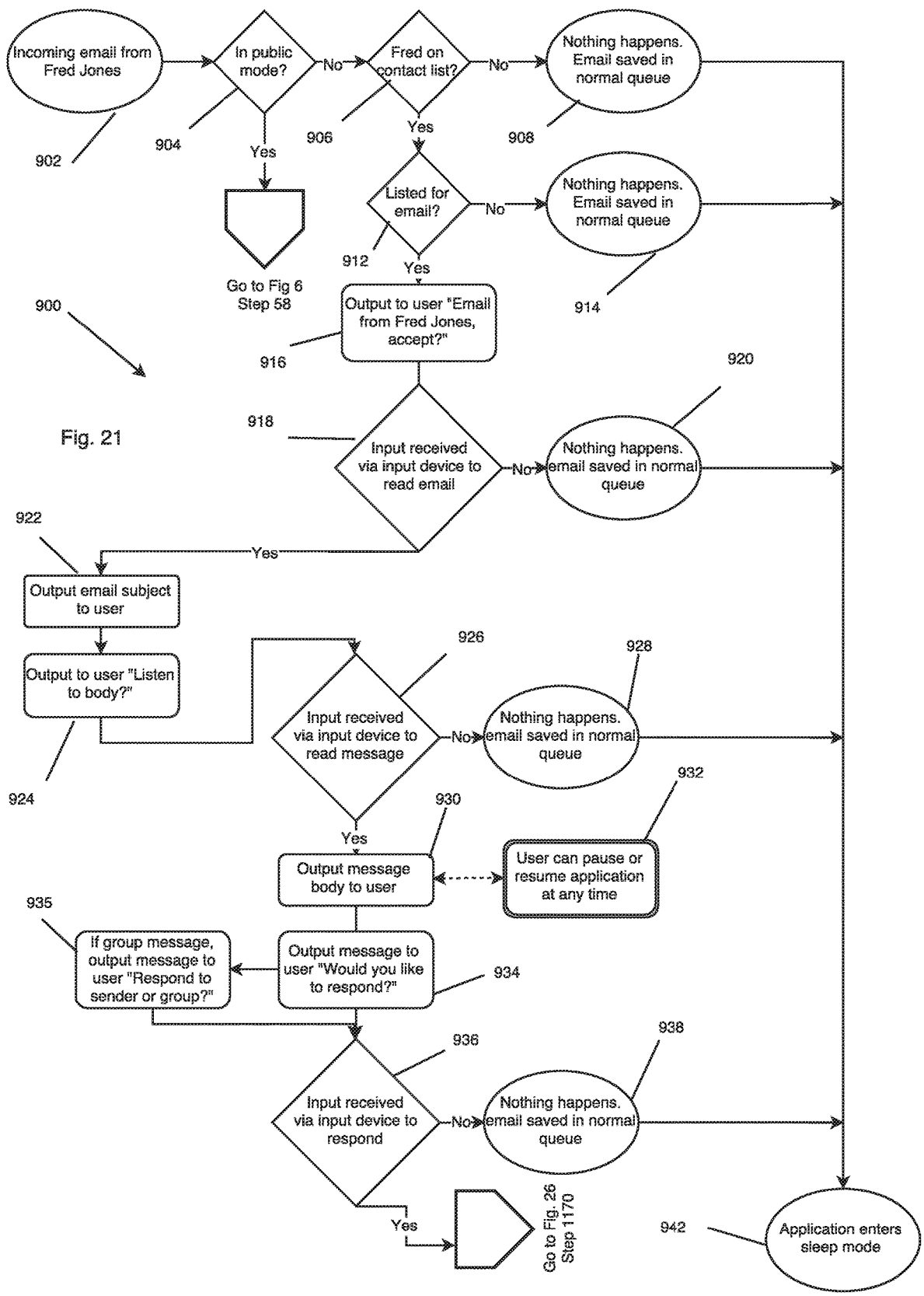
FIG. 21 is a flow diagram demonstrating an embodiment in which the system is in discreet/private mode, and an email is received.

In the embodiment 900 provided in FIG. 21, the system is in discreet mode, and an email is received. Upon incoming email from Fred Jones/sender 902, the application determines whether it is in public mode 904, if it is in public mode, the logic continues to FIG. 6, step 58. If it is not in public mode, the application determines if Fred is on a contact list pre-selected by a user 906, if he is not, nothing happens and the email is saved in normal queue 908, and the application may enter sleep mode 942. If Fred is on the contact list 906 selected by user, the application determines if the list Fred is on is selected for receiving emails 912. If he is not, nothing happens, email is saved in normal queue 914, and application may enter sleep mode 942. If Fred is on a contact list listed of receiving emails 912, an output is provided to user "email from Fred Jones, accept?" 916. If a negative/dissentive input or no input is received via input device to read email 918, nothing happens, email is saved in normal queue 920 and application may enter sleep mode 942. If a positive/affirmative response is received, the email subject is output to the user 922 followed by an output to user "listen to body?" 924. If no input received from user to read message or a negative/dissentive input is received 926, nothing happens and email is saved in normal queue 928, and the system may enter sleep mode 942. If a positive/affirmative input is received 926, the message body is output to the user 930, during which user can pause, resume, reply or skip at any time 932, followed by an output of "would you like to respond?" 934. If the message is a group message, an additional prompt is provided allowing the user to respond only to the sender or to the group 935. If no input or negative/dissentive input is received by user 936, nothing happens, email saved in normal queue 938 and application may enter sleep mode 942. If an input is received 936 by input device to respond, the logic proceeds to FIG. 26, Step 1170.

Figure 22:
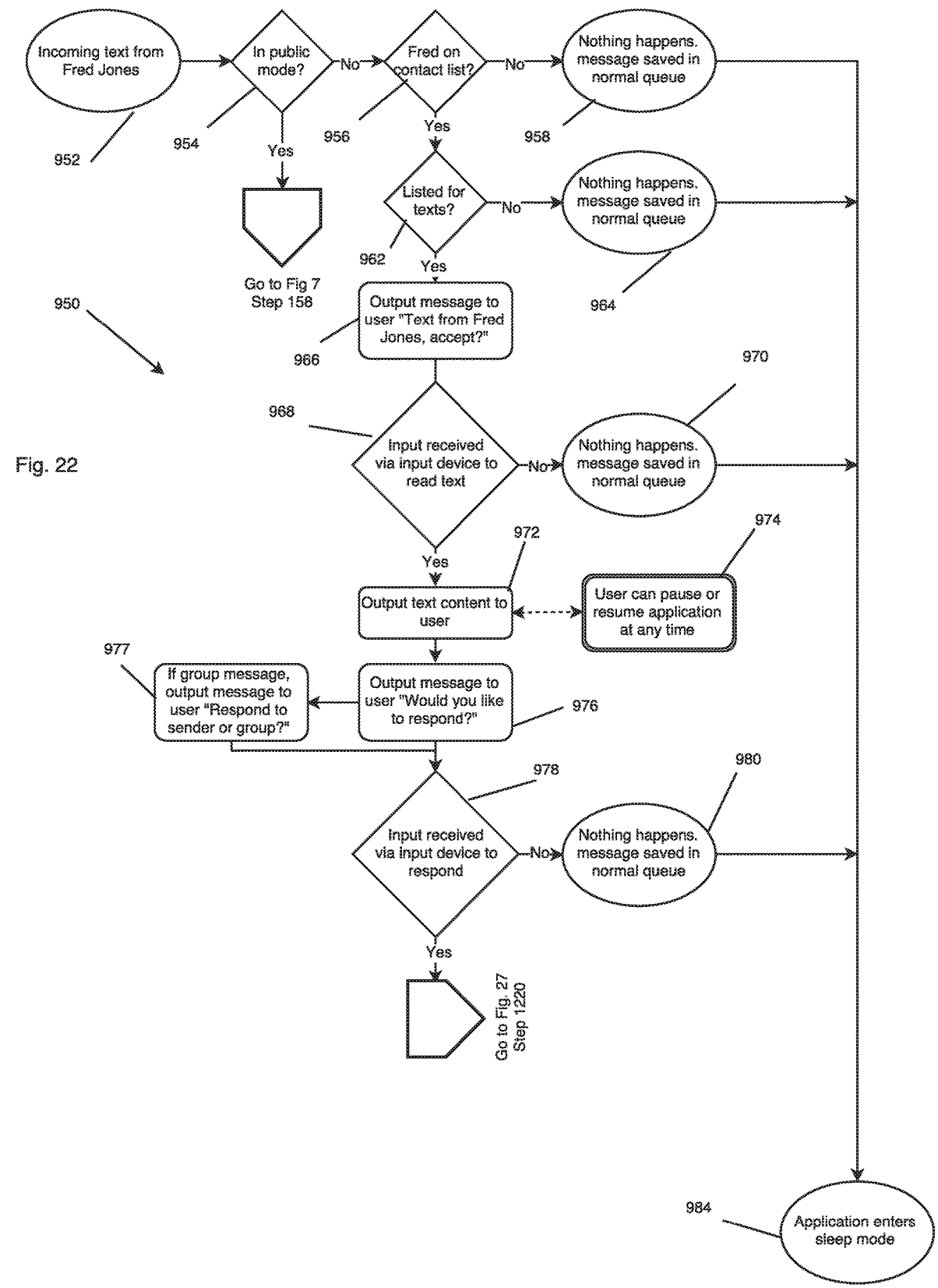
FIG. 22 is a flow diagram illustrating an embodiment wherein an incoming text is received in discreet/private mode.

FIG. 22 is a flow diagram illustrating an embodiment 950 wherein an incoming text is received in discreet/private mode 952, the application (logic) determines if it is in public mode 954, if it is, the logic continues to FIG. 7, Step 158. If not in public mode, it determines whether Fred is on the contact list 956 preselected by a user. If he is not, nothing happens, message is saved in normal queue 958, and application may enter sleep mode 984. If Fred is on the selected contact list 956, the application determines whether the list he is on is listed for texts 962. If he is not, nothing happens, and message is saved in normal queue 964, and application/system enters sleep mode 984. If the list he is on is listed for texts, an output message is provided to user "text from Fred Jones, accept?" 966. If no input is received from user 968 or if a negative/dissentive input is received, nothing happens and message is saved in normal queue 970, application may enter sleep mode 984. If positive/affirmative input is received from user 968, text content is output to the user 972, wherein user can pause or resume application at any time 974. Following output of text content to user 972, a message is output to user "Would you like to respond?" 976. If the message is a group message, an additional prompt is provided allowing the user to respond only to the sender or to the group 977. If negative/dissentive input is received from user, or no input is received from user 978, nothing happens and message is saved in the normal queue 980, and application may enter sleep mode 984. If a positive/affirmative response is received via input 978, the logic continues to FIG. 27, step 1220.

Figure 23:
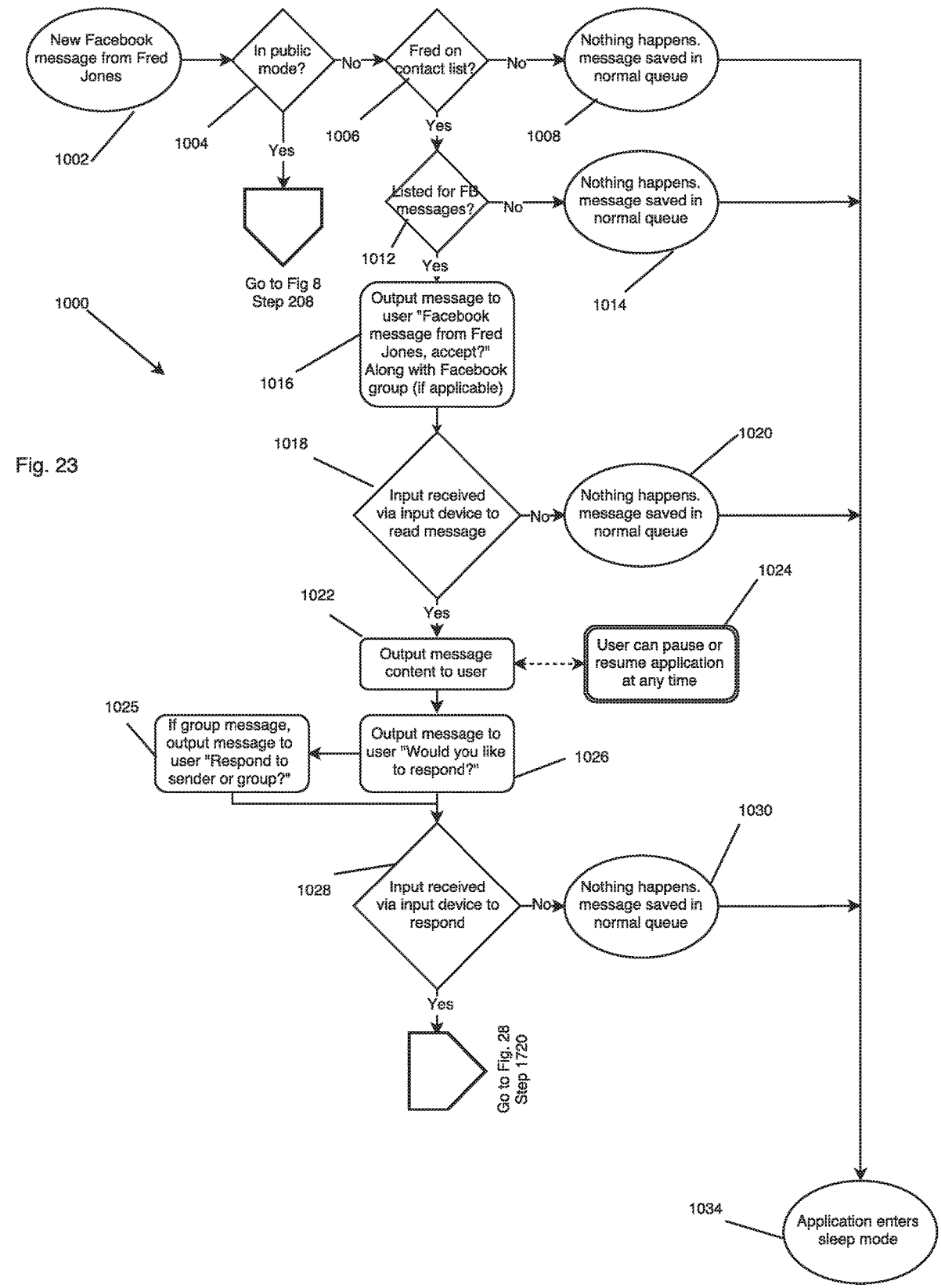
FIG. 23 provides a flow diagram illustrating an embodiment in which an incoming Facebook® message is received in discreet/private mode.

FIG. 23 provides a flow diagram illustrating an embodiment 1000 in which an incoming Facebook message is received in discreet/private mode. Upon receipt of new Facebook message from Fred Jones 1002, logic determines if in public mode 1004, if it is in public mode, the logic continues to FIG. 8, step 208. If not in public mode, the logic determines if Fred is on a contact list preselected by user 1006, if he is not, nothing occurs, message is saved in normal queue 1008, application may enter sleep mode 1034. If Fred is on a pre-selected contact list, 1006, the application determines whether the list he is on is listed for receiving Facebook messages 1012, if no, nothing happens, message saved in normal queue 1014, application may enter sleep mode 1034. If the list is selected for receiving Facebook messages 1012, an output is provided to the user "Facebook message from Fred Jones, accept?" Facebook group information may be provided if applicable 1016. If input is not received or negative/dissentive input is received from user regarding reading the message 1018, nothing happens, and message is saved in normal queue 1020, application may enter sleep mode 1034. If positive/affirmative input is received via input device to read message 1018, the message content is output to the user 1022 at which point the user can pause or resume application and reading of the message at any time 1024. Following output of message content, an output to the user is provided "would you like to respond?" 1026. If the message is a group message, an additional prompt is provided allowing the user to respond only to the sender or to the group 1025. If negative/dissentive input received, or no input received via input device to respond 1028, nothing happens, message is saved in normal queue 1030, application enters sleep mode 1034. If positive/affirmative input received 1028 to respond, logic continues to FIG. 28, step 1720.

Figure 24:
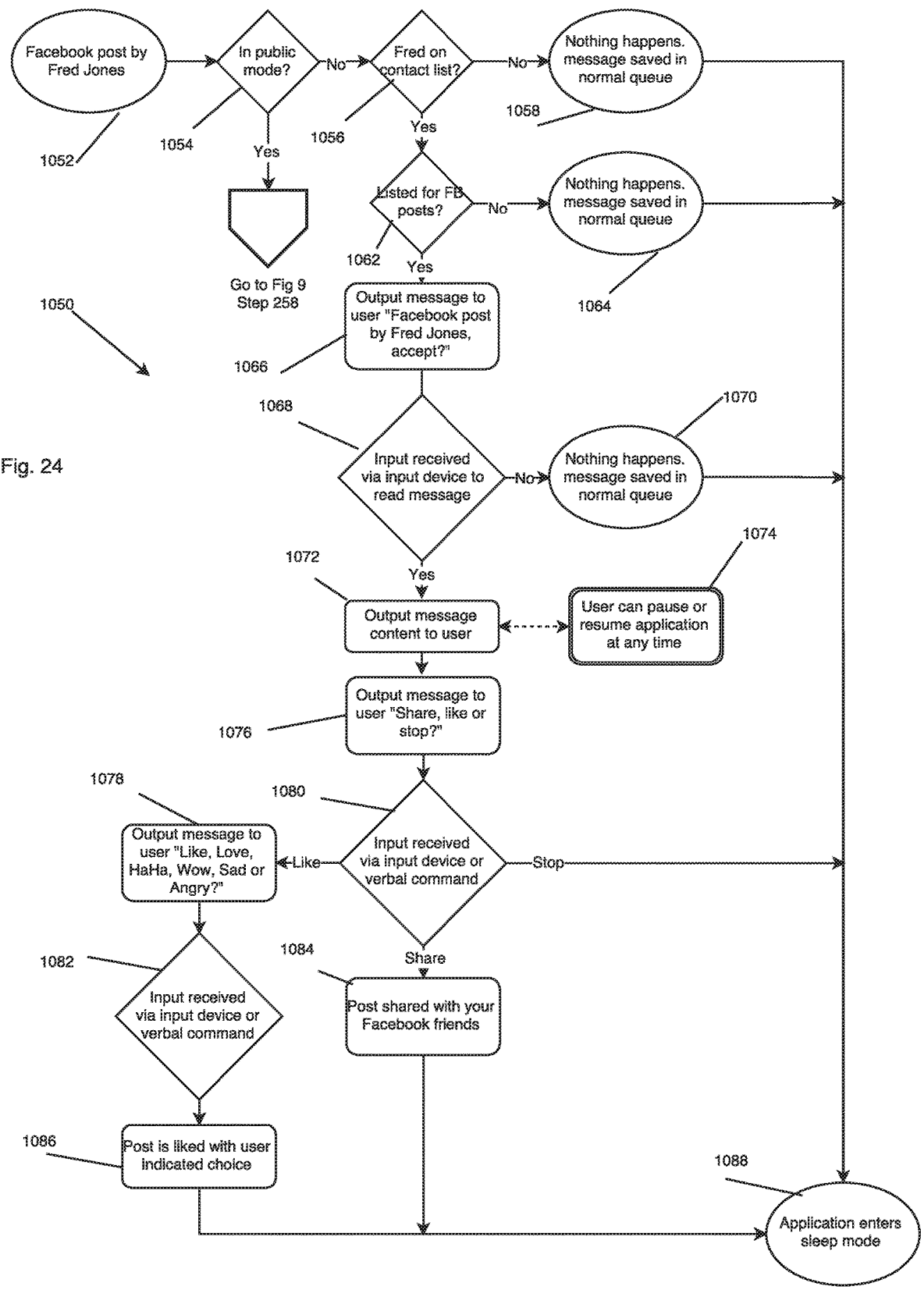
FIG. 24 includes a flow diagram of an embodiment including incoming Facebook® post(s) received in discreet/private mode.

FIG. 24 includes a flow diagram of an embodiment 1050 including incoming Facebook post received in discreet/private mode. When a Facebook post is made by Fred Jones 1052 in private mode, the application determines whether it is in public mode 1054, if it is, the application proceeds to the logic shown in FIG. 9, step 258. If not in public mode, the application determines whether Fred is on a contact list preselected by user 1056, if he is not, nothing happens and message is saved in normal queue 1058, application may enter sleep mode 1088. If Fred is on a preselected contact list, the application determines whether that contact list has been selected for receiving Facebook posts 1062. If not, nothing happens, and message is saved in queue 1064, application enters sleep mode 1088. If yes, output provided to user, "facebook post by Fred Jones, accept?" 1066, wherein following no input from user or a dissentive/negative input 1068, nothing happens, message saved in queue 1070 application enters sleep mode 1088. If positive/affirmative input is received to read message 1068, message content is output to user 1072 (at which point user can pause/resume any time 1074). Thereafter, output to user "share, like or stop?" is provided 1076. (output options are determined by current Facebook sharing options and will change as Facebook options change.) Following input received by user 1080 to "like", an output is provided to user "like, love, haha, wow, sad, or angry?" 1078. (output options are determined by current Facebook sharing options and will change as Facebook options change.) Following input received via input device or verbal command 1082, post is liked with user indicated choice 1086, application enters sleep mode. If input received via input device 1080 indicates "share", post is shared with user's Facebook friends 1084, and application enters sleep mode 1088. If input received 1080 indicates "stop", application enters sleep mode 1088.

FIG. 25 includes a flow diagram illustrating an embodiment 1100, wherein a call is initiated by a user in discreet/private mode. A user may wake the application from sleep mode 1102, wherein a customizable output to the user "text, email, voicemail, call, tweet, read texts, read emails, audio, listen to voicemails?" may be provided 1104. Upon input received by input device 1106 to "call", an output to user is provided "you are in your discreet contacts list, choose another list?" 1108, if dissentive/negative or no input is received 1110, the contacts in specified list (discreet list) are output to user 1116. If an input is received via input device 1110, output other contact lists in electronic device, or connected cloud or other storage, to user 1112, following input received via input device (affirmative/positive) 1114, contact list is chosen. Contacts in the specified list are output to the user 1116. Following input received via input device 1118, contact is chosen, and a list of customizable preset messages is output to user 1120. Following input received from input device 1122, a message is chosen. The system outputs to user "hear, initiate or cancel?" 1124, following input received via input device 1126 to "cancel" application enters sleep mode 1138. Following input to "hear", present message is played 1128, and logic proceeds to step 1124. Upon input via input device 1126 of "initiate", a call is initiated to contact. The selected customizable pre-set message is output when call is answered 1130. User hears contact's questions in their own voice 1132, input may be received via input device to answer questions by user 1134, a user may continue to hear contact's questions in their own voice 1132 until input is received to end call 1136 (or contact ends call) and application enters sleep mode 1138.

FIG. 26 includes a flow diagram illustrating an embodiment 1150, wherein an email is initiated in discreet mode. Upon waking application from sleep mode 1152, output provided to user "text, email, voicemail, call, tweet, read texts, read emails, audio, listen to voicemails?" 1154. Upon input received via input device 1156 to "email" an output is provided to user "you are in your discreet contacts list, choose another list?" 1158, following a negative/dissentive or no input received 1160 output of contacts in specified list to user 1166, and logic proceeds as will be described. If positive/affirmative input is received 1160, other contact lists in electronic device, or connected cloud or other storage, are output to user 1162, upon receiving input 1164, contact list is chosen, contacts are output in specified list to user 1166, upon receiving input via input device 1168, the contact is chosen. A listing of customizable preset messages is output to user 1170, upon receiving input via input device 1172, message is chosen. System outputs to user "read, send, save, or delete?" 1174, if input received 1178 is "read", the chosen preset message is read 1176, at which point the logic continues to step 1174, if input received is "send" the preset message is sent to contact 1184, and application may enter sleep mode 1186. If input received 1178 is "save", message is saved as a draft 1180 and application enters sleep mode, and if input received is "delete", the message is deleted, 1182, application may thereafter enter sleep mode 1186.

FIG. 27 is a flow diagram illustrating an embodiment 1200 wherein a text is initiated in discreet/private mode by a user. Upon waking the application from sleep mode 1202, an output is provided to the user "text, email, voicemail, call, tweet, read texts, read emails, audio, listen to voicemails?" 1204, wherein upon input received via input device 1206 to "text" an output is provided to user "you are in your discreet contacts list, chose another list?" 1208, upon negative/dissentive input received or no input received 1210, contacts are output in specified list to user 1216. If there are more than a preselected number of contacts in the list (i.e., 10 or 20 contacts, for example), the first letter of each contact name will be output to the user, and the user will be provided an opportunity to select the contact. Upon positive/affirmative input received 1210, other contact lists in electronic device, or connected cloud or other storage, are output to user 1212. Following input received via input device 1214, a contact list is chosen. Contacts are output in specified list to user 1216, and upon input received via input device 1218, a contact is chosen. Customizable preset messages of the system are output to the user 1220, upon input by user 1222 a message is chosen, an output to user occurs "read, send, save, or delete?" 1224, upon which following input received by input device 1228 to "read" the preset message is read 1226 to user, and logic returns to step 1224. If input received indicates "send", the preset message is sent to the contact 1234 and application enters sleep mode 1236. If input received is "save" message is saved as draft 1230 and application enters sleep mode 1236. If input received is "delete" message is deleted 1232, application enters sleep mode 1236.

FIG. 28 includes a flow diagram illustrating an embodiment 1250, wherein the user initiates a voicemail in discreet/private mode. Upon waking application 1252, an output is provided to user to "text, email, voicemail, call, tweet, read texts, read emails, audio, listen to voicemails?" 1254. Upon input by user 1256 indicating "voicemail" an output to user "you are in discreet contacts list, choose another list?" 1258 is provided. Upon no input received by input device or dissentive/negative input received 1260 contacts in specified list are output to user 1266. Upon affirmative/positive input received 1260, other contact lists on electronic device, or connected cloud or other storage, are output to user 1262. Upon input received via input device 1264, a contact list is chosen, contacts are output in that list to user 1266, following input 1268 a contact is chosen. Customizable prerecorded messages are output to user 1270, following input received via input device 1272, a message is chosen. Output is provided to user to "play, send, save, or delete?" 1274, upon input received via input device 1278 to "play", a preset/prerecorded message is read 1276, and logic returns to step 1274. Following input received 1278 to "send", the preset/prerecorded message is sent to contact 1284, and application goes to sleep 1286. Upon input received 1278 to "save" message is saved as draft 1280 and application goes to sleep 1286, upon "delete" message is deleted 1282, and application goes to sleep 1286.

Figure 29:
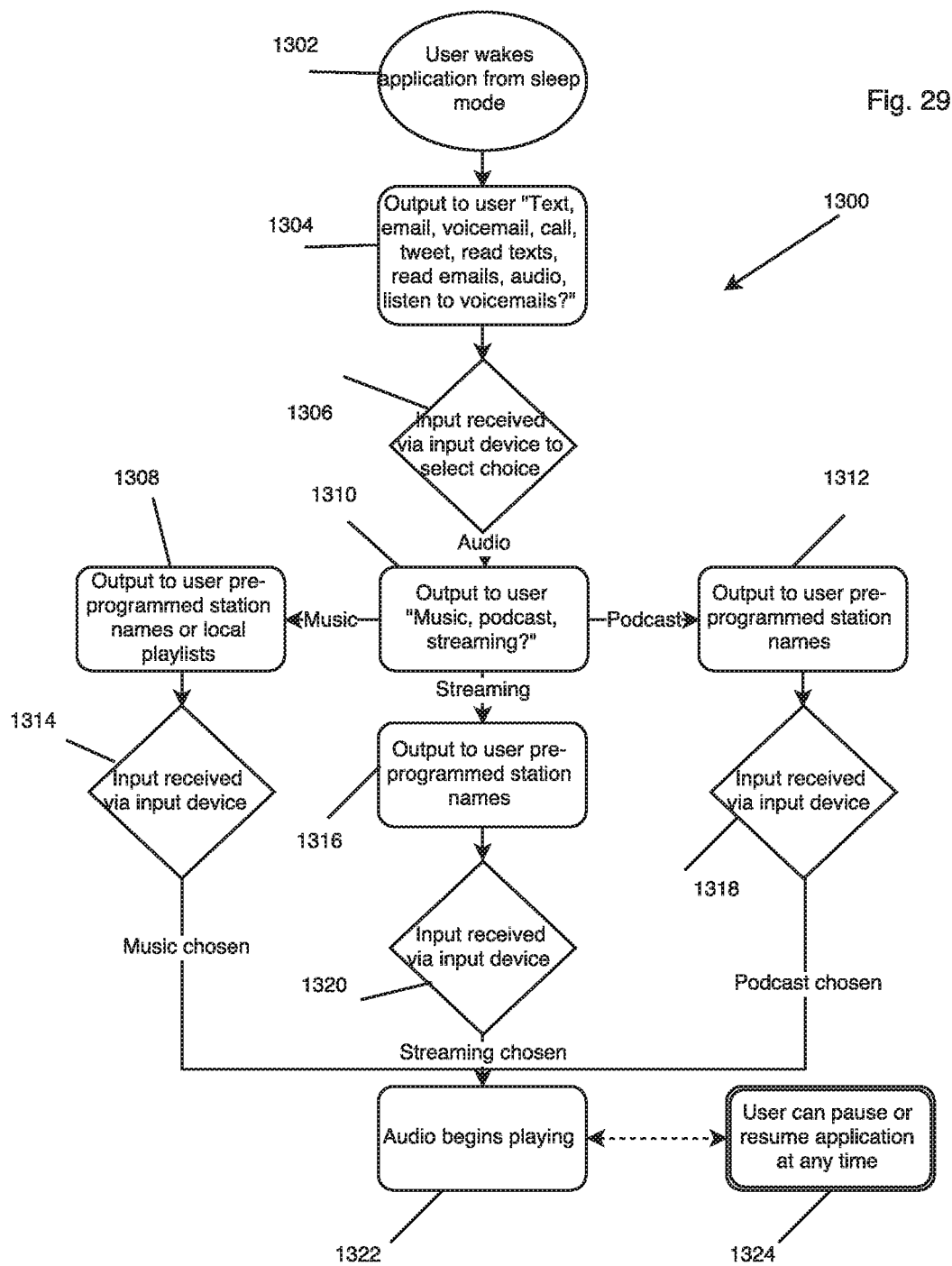
FIG. 29 includes a flow diagram illustrating an embodiment wherein a user may listen to audio in discreet/private mode FIG. 30 includes a flow diagram illustrating an embodiment when a user chooses to listen to their voicemails in discreet/private mode

FIG. 29 includes a flow diagram illustrating an embodiment 1300 wherein a user listens to audio in discreet/private mode. In a non-limiting embodiment, the user may wake the application from sleep mode 1302, and an output is provided to the user "text, email, voicemail, call, tweet, read texts, read emails, audio, listen to voicemails?" 1304. Upon input received 1306 to select choice, if "audio" is selected, the system outputs to user a customizable list such as; "music, podcast or streaming?", if music is selected, an output is provided to the user with customizable pre-programmed station names or local playlists 1308, following input received 1314, music selection is chosen, and audio begins playing 1322 at which point the application or the audio can be paused at any time 1324. If "podcast" is selected, an output to the user listing customizable pre-programmed station names 1312 is provided, following input received 1318, podcast selection is made, audio begins playing 1322. Upon selection of "streaming", an output to user of customizable pre-programmed station names 1316 is provided, upon input received via input device 1320, streaming selection is chosen, audio begins playing 1322.

Figure 30:
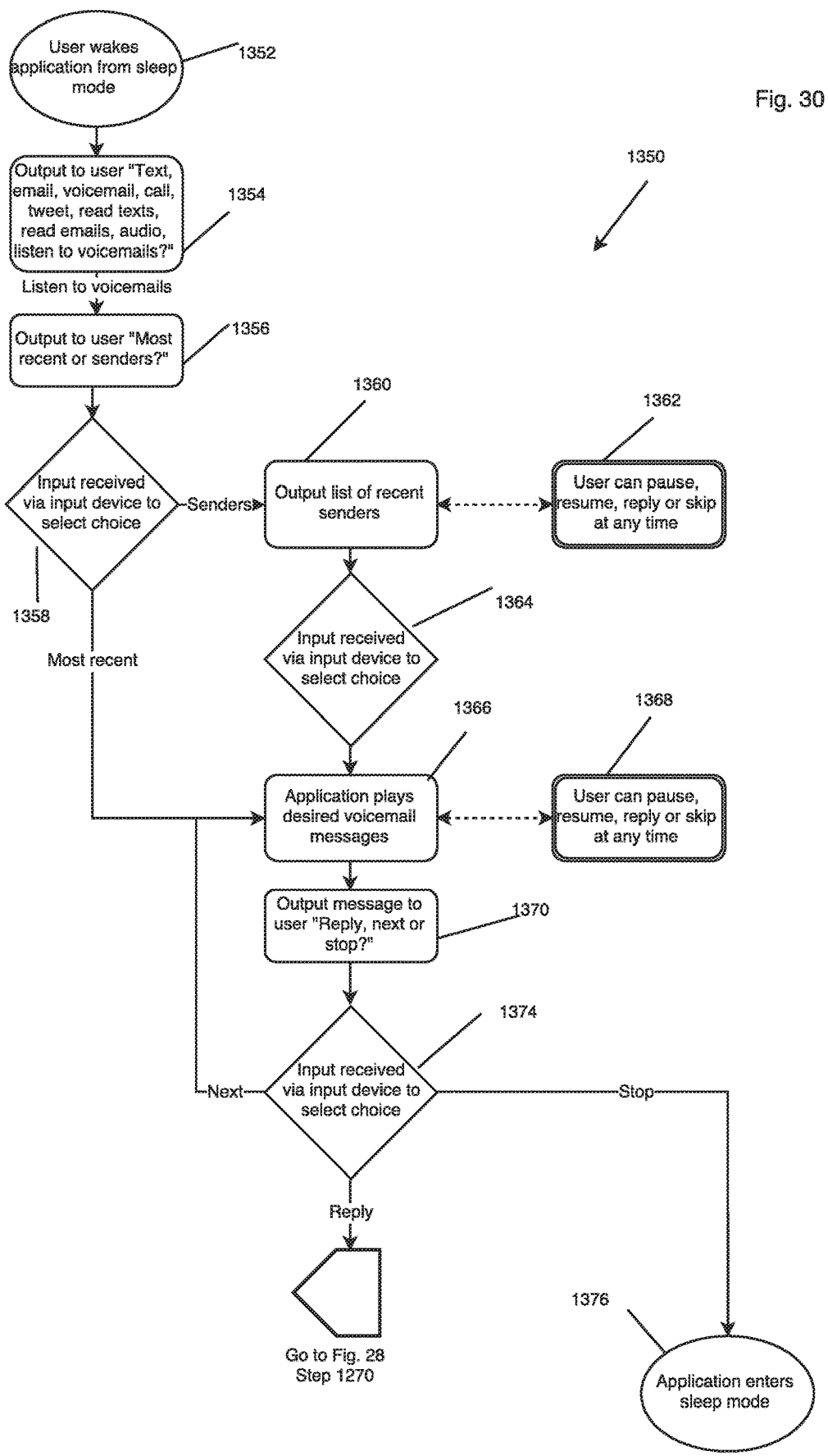

FIG. 30 includes a flow diagram illustrating an embodiment 1350 when a user chooses to listen to voicemail in discreet/private mode. User may wake application from sleep mode 1352, and an output may be provided to user "text, email, voicemail, call, tweet, read texts, read emails, audio, listen to voicemails?" 1354, if "listen to voicemails is chosen", an output is provided to user "most recent or senders?" 1356, upon which following input received 1358 from user to select choice, if "most recent is chosen" application plays desired voicemail messages 1366 during which time user can pause, resume, reply or skip at any time 1368, and message is output to user "reply, next or stop?" 1370, if "reply" is chosen via input device 1374, the logic continues on to FIG. 28, step 1270. If "next" is chosen, the application reads the next desired voicemail 1366. If "stop" is chosen, the application enters sleep mode 1376. If input received to select "senders" 1358, a list of recent senders 1360 is output to user. User can pause, resume, reply or skip at any time 1362. If input received to select choice 1364, application plays desired voicemail messages 1366 at which point user can pause, resume, reply or skip at any time 1368. Message may be output to user "reply, next or stop?" 1370 at which point logic continues as described above.

Figure 31:
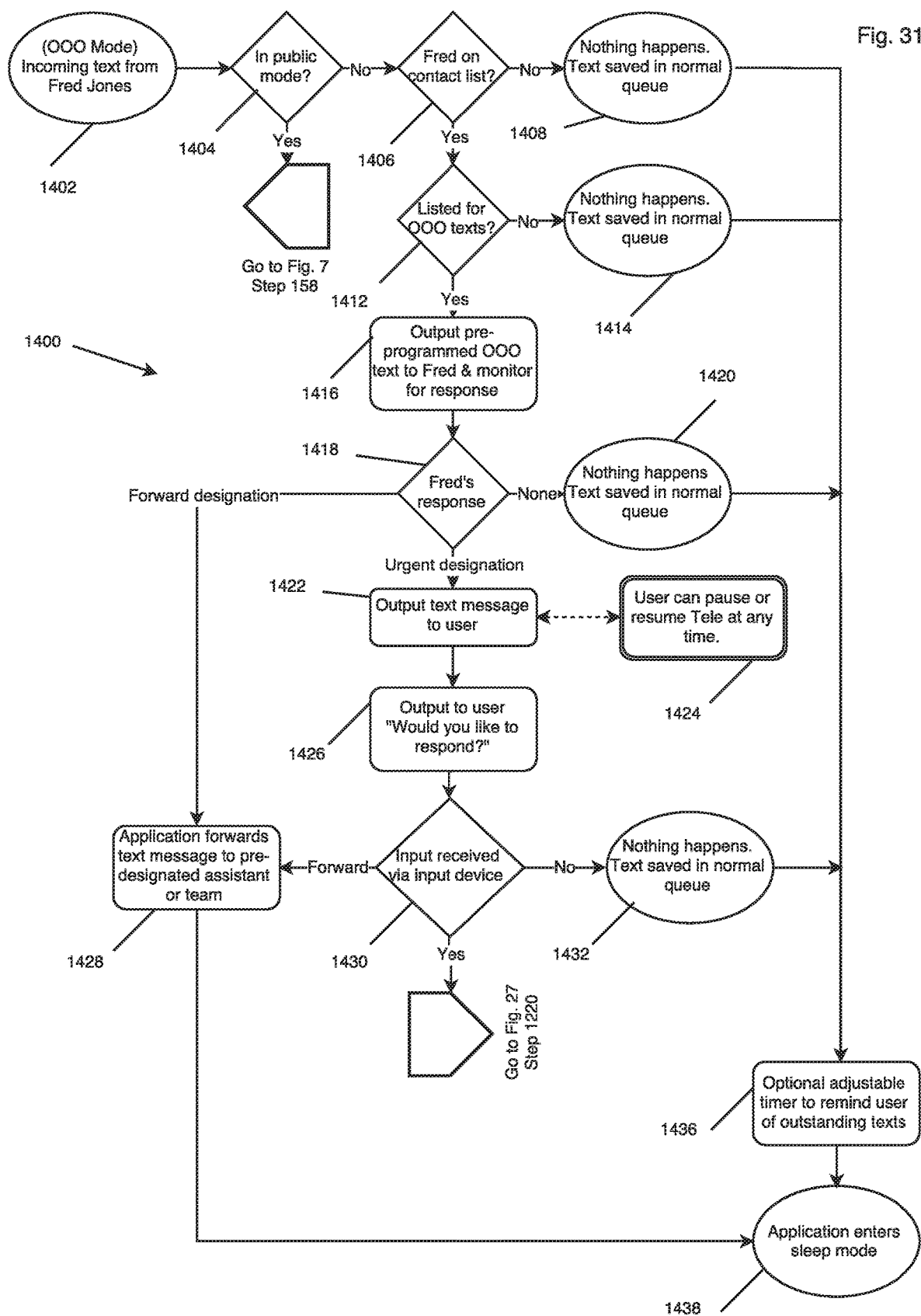
FIG. 31 is a flow diagram illustrating an embodiment where the system is in out of office (OOO) mode, and an incoming text is received

FIG. 31 is a flow diagram illustrating an embodiment 1400 where the system is in out of office (000) mode, and an incoming text is received from Fred Jones 1402. The system determines whether it is in public mode 1404, if it is, logic continues to FIG. 7, step 158. If not, the system determines whether Fred is on preselected contact list 1406, if he is not, nothing happens, text saved in queue 1408, an optional adjustable timer is provided to remind user of outstanding texts 1436, application goes to sleep 1438. If Fred is on pre-selected contact list 1406, system determines whether he is listed for OOO texts 1412. If he is not, nothing happens, text saved in queue 1414, and logic continues as above. If the list Fred is on is selected for OOO texts 1412, a customizable pre-programmed OOO text is output to Fred and the system monitors for a response 1416. If no response is received from Fred 1418, nothing happens 1420, text saved in queue 1420, system continues as described above. If Fred's response includes a forward designation, such as "forward" or "assistant" provided by the sender in response to the pre-programmed OOO text content output, application forwards text to pre-designated assistant or team 1428 (this step may be automatic in a non-limiting embodiment) and the application enters sleep mode 1438. If Fred's response includes an urgent designation, such as "urgent" or "emergency" provided by the sender in response to the listing in the pre-programmed OOO text content output, text message is output to user 1422, followed by an output of "would you like to respond?" 1426, if input received by user indicates "no", either dissentive/negative input or no input, nothing happens, text saved in normal queue 1432, logic continues as provided above and in FIG. 31. If input received 1430 includes an affirmative/positive input, go to FIG. 27, step 1220 to proceed with logic. If user input indicates forward, application forwards text message to pre-designated assistant or team 1428 and the application enters sleep mode 1438. Sample text provided to Fred may include "I am in a meeting. If you need immediate assistance, please reply with 4 and your message will be forwarded to my team. If you need me urgently, press 1 and I will be alerted."

Figure 32:
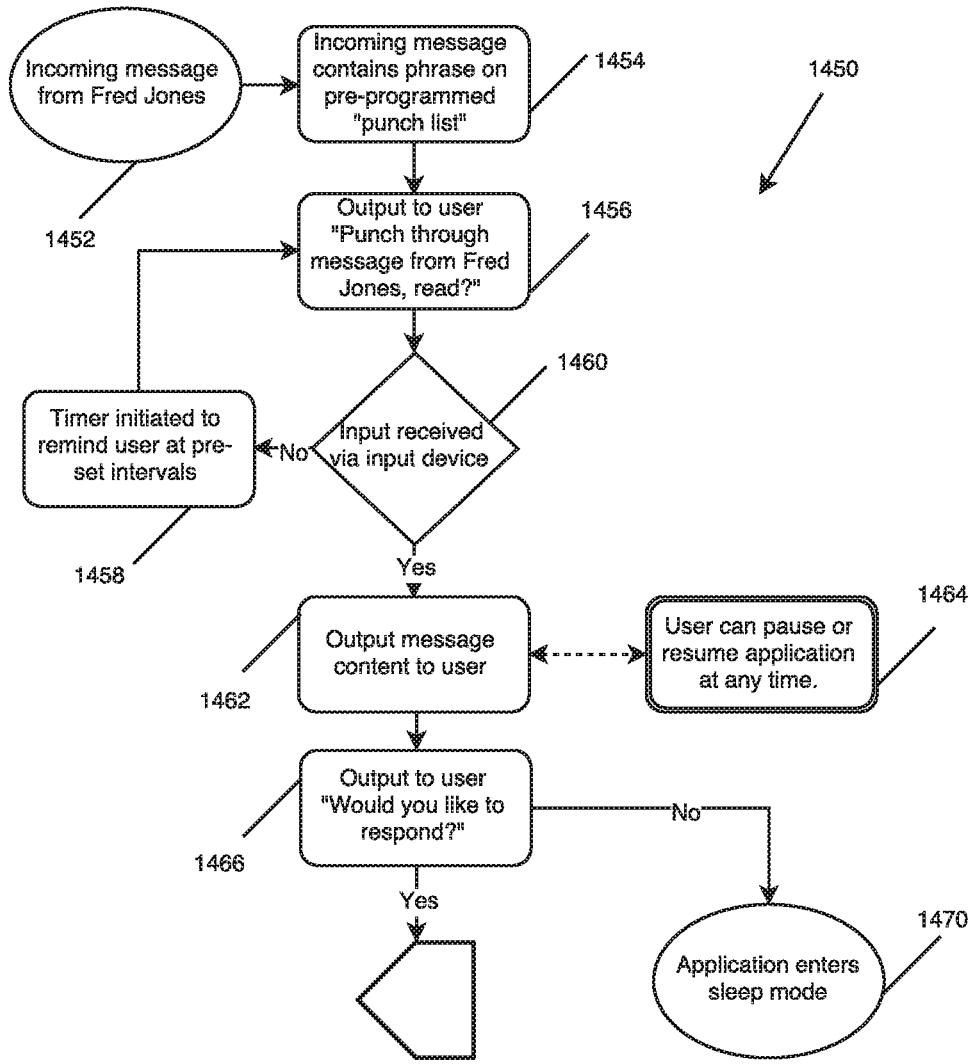
FIG. 32 is a flow diagram illustrating an embodiment of a "punch through" message received by a user.

FIG. 32 is a flow diagram illustrating an embodiment 1450 of a "punch through" message received by a user. Upon incoming message from Fred Jones 1452, if it contains a phrase on customizable pre-programmed "punch list" 1454, an output is provided to user "punch through message from Fred Jones, read?" 1456, at which point if no input is received from user 1460, or a negative/dissentive input is received, timer is initiated to remind user at pre-set intervals 1458, logic continues to step 1456. If positive/affirmative input is received from user 1460, "punch through" message content is output to user 1462, at which point user can pause or resume application at any time 1464. An output is provided to user "would you like to respond?" 1466, if no response, or negative/dissentive response, application enters sleep 1470. If positive/affirmative response/input received from user, logic will continue to appropriate FIG. & Step. Email, Public—FIG. 12 Step 422; Text, Public—FIG. 13 Step 472; Facebook Message, Public—FIG. 35 Step 1614; Voicemail, Public—FIG. 15 Step 572; Email, Discreet—FIG. 26 Step 1170; Text, Discreet—FIG. 27 Step 1220; Voicemail, Public—FIG. 28 Step 1270.

Figure 33:
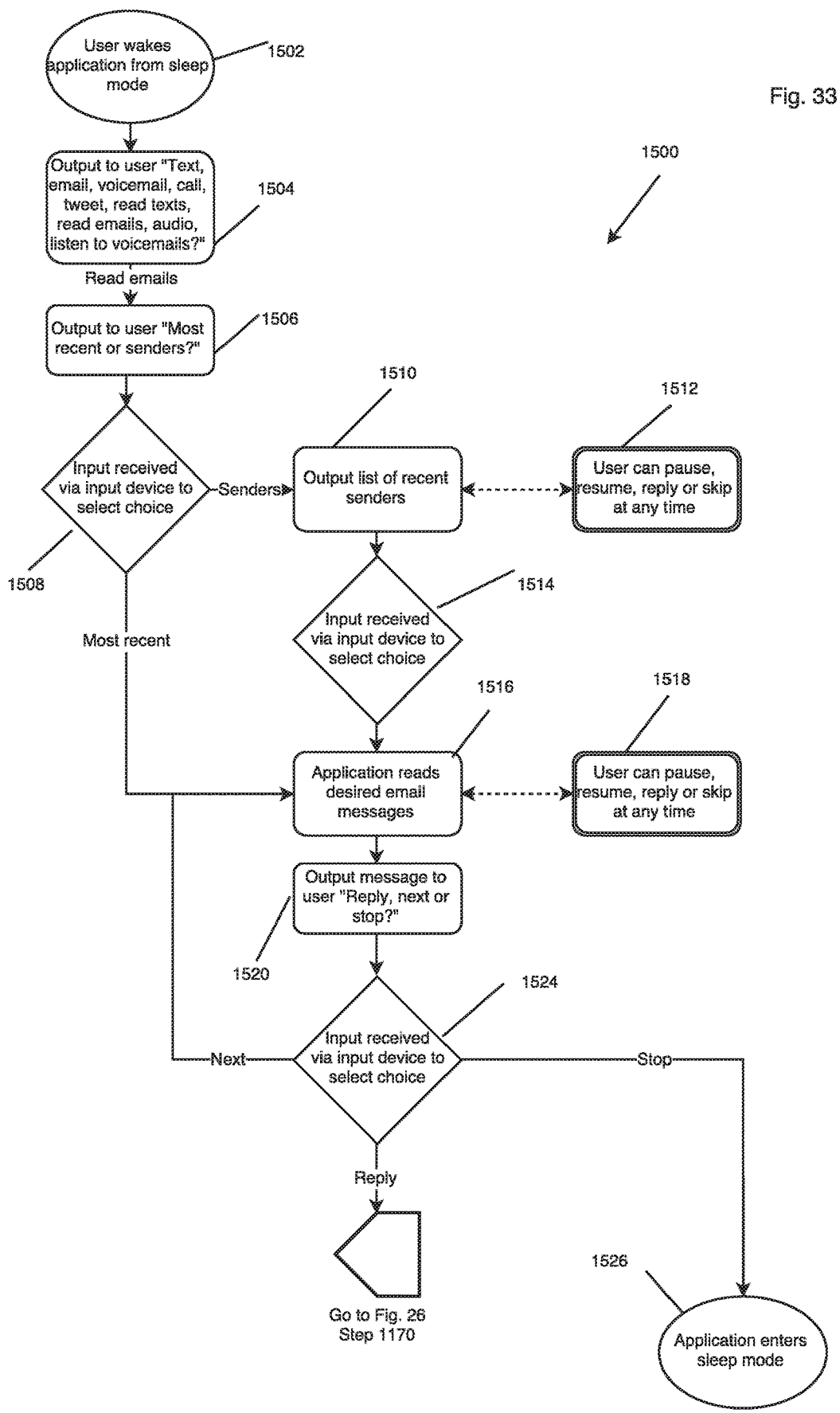
FIG. 33 is a flow diagram illustrating an embodiment wherein a user may read emails in discreet/private mode (i.e., have emails read to the user via the system).

FIG. 33 is a flow diagram illustrating an embodiment 1500, wherein a user may read emails in discreet/private modes (i.e., have emails read to the user via the system). Upon waking application from sleep mode 1502, in a non-limiting embodiment, an output is provided to user "text, email, voicemail, call, tweet, read texts, read emails, audio, listen to voicemails?" 1504. Upon selection of 'read emails', an output is provided to user "most recent or senders/" 1506, wherein upon input received to select choice from user 1508 of 'most recent', application reads desired (most recent) email 1516, user is able to pause, resume, reply or skip at any time 1512, output is provided to user "reply, next or stop?" 1520, upon input received via input device to select choice 1524, if "reply" is selected, logic continues to FIG. 26, step 1170, if "next" is selected, logic continues to step 1516 reading the next email in the list, if "stop" is selected, application may enter sleep mode 1526. If input is received to select choice 1508, and selection includes "senders", a list of recent senders is output to user 1510, user can pause, resume, reply or skip at any time 1512. Following receipt of input from user to select choice 1514, application reads desired emails messages 1516 (from selected recent sender). User can pause, resume, reply or skip at any time 1518. The logic continues following reading desired email message 1516 as described above and as provided in FIG. 33.

Figure 34:
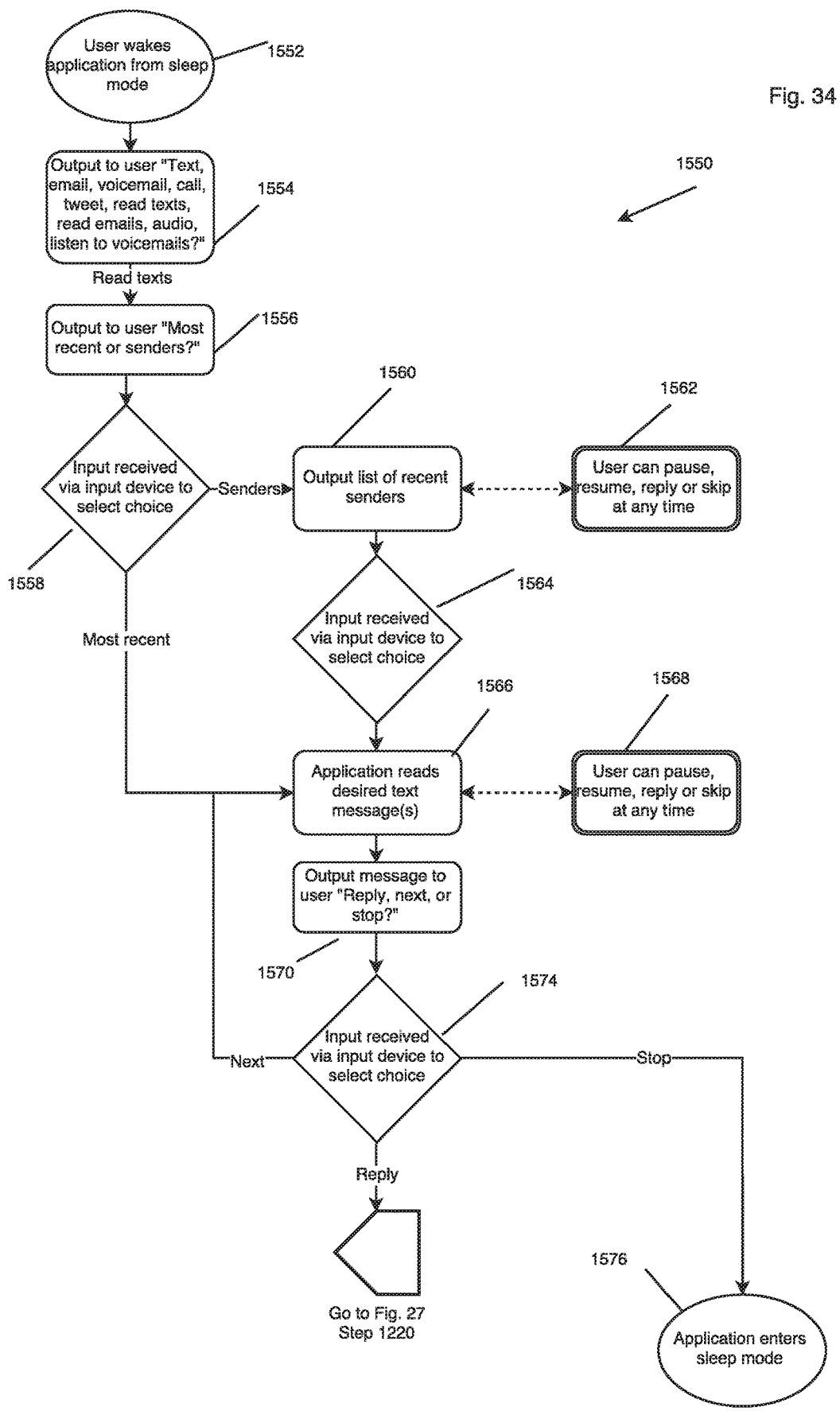
FIG. 34 is a flow diagram illustrating an embodiment wherein a user reads text messages in discreet/private mode.

FIG. 34 is a flow diagram illustrating an embodiment 1550, wherein a user reads texts in discreet/private mode. Upon waking the application from sleep mode 1552 in a non-limiting embodiment, an output is provided to the user "text, email, voicemail, call, tweet, read texts, read emails, audio, listen to voicemails?" 1554. Upon selection by user to "read texts" via input device, an output is provided to the user "Most recent or senders?" 1556. Following input received via input device to select choice 1558 of "senders" a list of recent senders 1560 is output to user, at which point user can pause, resume, reply or skip 1562 during step 1560. During output 1560 or following output list of recent senders 1560, an input received via the input device to select choice 1564 may occur. The application may read selected text message(s) 1566 at which point user can pause, resume, reply or skip at any time 1568. A message is output to user "reply, next or stop?" 1570, wherein upon receipt of input via input device to select choice 1574, if "reply" is selected, logic continues to FIG. 27, step 1220. If "next" is selected, application skips the current message and continues to read the next desired message 1566. If "stop" is selected, application enters sleep mode 1576. If at step 1558, input is received and choice selected includes 'most recent" desired text message(s) are output to user 1566, and logic continues as provided above.

Figure 35:
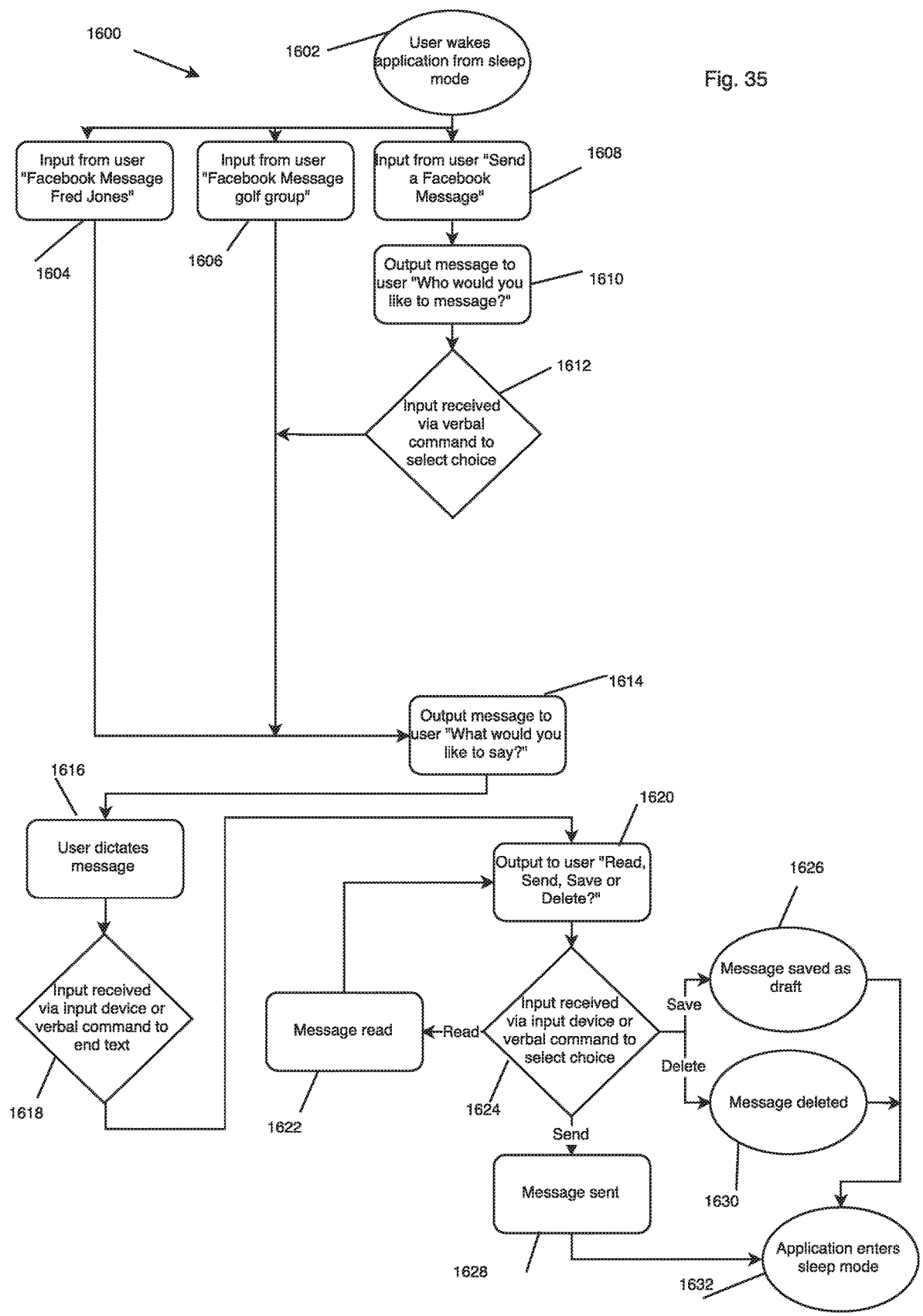
FIG. 35 is a flow diagram illustrating an embodiment wherein a user initiates a Facebook @ message in public mode.

FIG. 35 is a flow diagram illustrating an embodiment 1600, wherein a user initiates a Facebook® message in public mode. The system or application may be awoken in any number of ways 1602 at which point the user may initiate a Facebook® message by providing an input which may be provided verbally in some non-limiting embodiments, such as to say "Facebook Message Fred Jones" 1604, wherein the system outputs a message to the user asking "what would you like to say?" 1614, user may dictate a message 1616 receivable by a microphone of the system, or associated/paired component, input may be received by input device or verbal command to end text 1618, upon which an output may be provided to the user "Read, Send, Save or Delete?" 1620. A positive input from the user via input device or verbal command to select the choice 1624 occurs, wherein an input to "read" causes the message to be read 1622 upon which the system returns to step 1620, an input selection of "send" causes the message to be sent 1628, whereinafter the application may enter sleep mode 1632. If an input is received to "save" the message, the message is saved as a draft 1626, whereinafter the application may enter sleep mode 1632, and if the input received is to "delete" message, the message is deleted 1630, whereinafter the application may enter sleep mode 1632. When an input from user includes "Facebook message golf group" 1606, the system outputs a message to the user asking "what would you like to say?" 1614, and the logic continues as previously provided above. If user provides input after waking to "Send a Facebook message" 1608, a message will be output to user "who would you like to message" 1610, at which point an input may be received by user via verbal command to select choice 1612, the system then outputs a message to the user asking "what would you like to say?" 1614, and the logic continues as previously provided above.

A microphone 147 may be used to receive communication from a user in speech response (SR) mode, wherein a user is speaking in response to a communication received. In other embodiments, a microphone 147 may be used to initiate communications via the system embodiments described herein. In most embodiments, the microphone will only be used in public mode; however its use in other modes of the system/application is possible.

Figure 36:
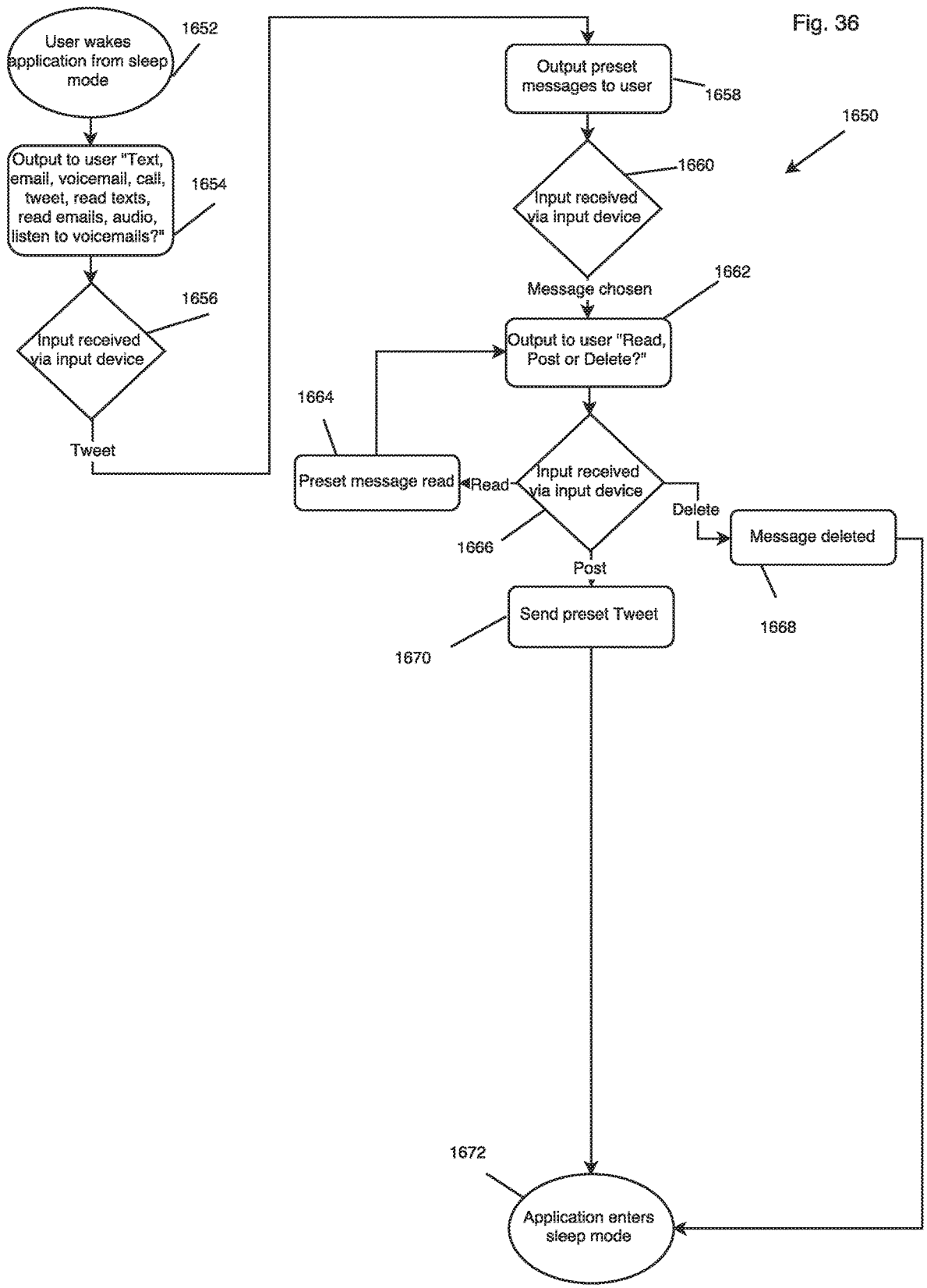
FIG. 36 is a flow diagram illustrating an embodiment wherein a user may initiate tweets in discreet/private mode FIG. 37 includes a flow diagram including an embodiment in which a user selects to read tweets from their feed in public mode.

FIG. 36 is a flow diagram illustrating an embodiment 1650, wherein a user may initiate tweets in discreet/private mode. Upon waking the application from sleep mode 1652, an output is provided to the user "text, email, voicemail, call, tweet, read texts, read emails, audio, listen to voicemails?" 1654. Upon selection by user to "tweet" via input device 1656, customizable preset messages of the system are output to the user 1658, upon input by user 1660 a message is chosen, an output to user occurs "read, post, or delete?"

1662, upon which following input received by input device 1666 to "read" the preset message is read 1664 to user, and logic returns to step 1662. If input received indicates "post", the preset message is tweeted 1670 and application enters sleep mode 1672. If input is "delete" message is deleted 1668, application enters sleep mode 1672.

Figure 37:
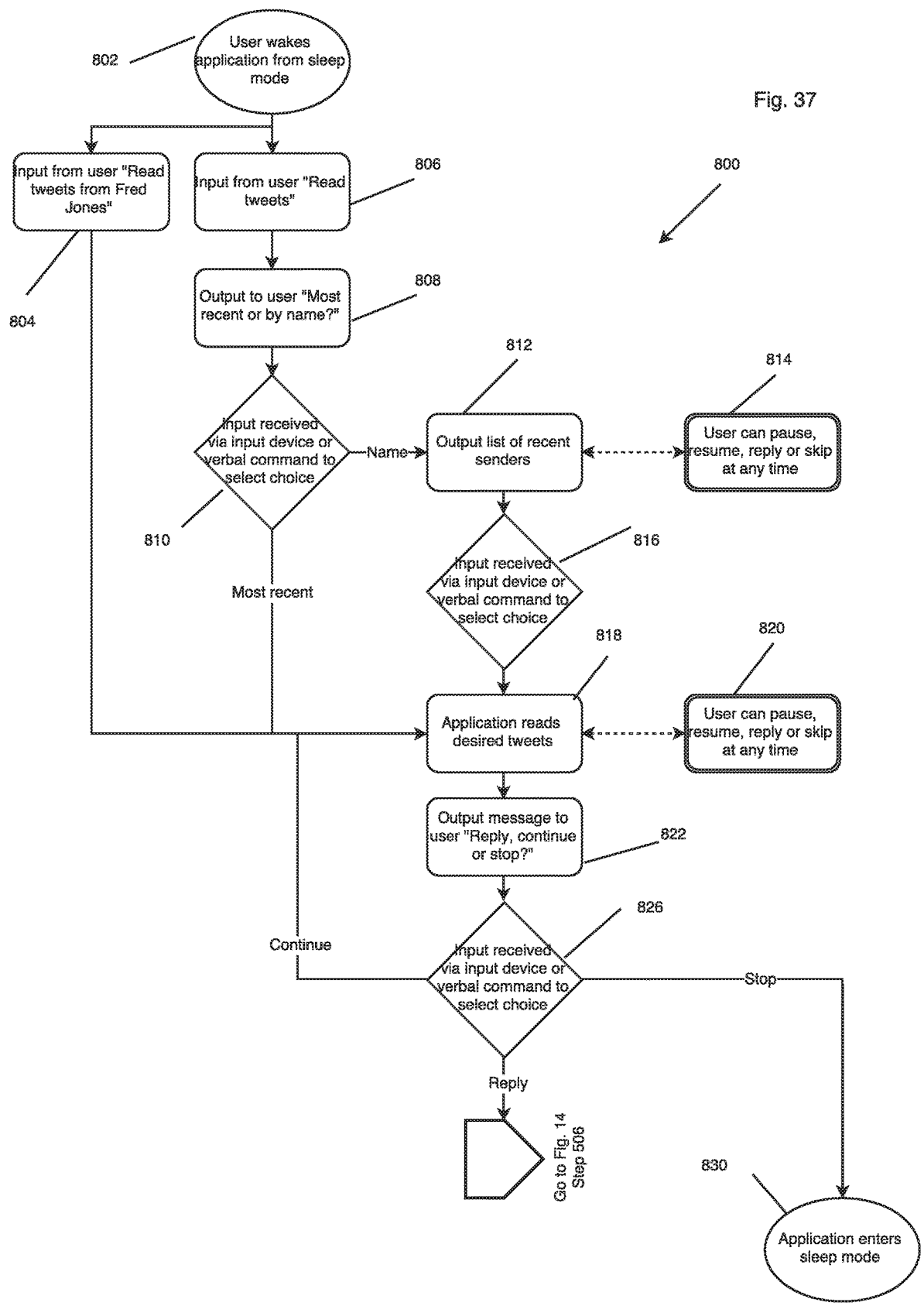

FIG. 37 includes a flow diagram including an embodiment 800 in which a user selects to read tweets received. User wakes application from sleep mode 802, and upon input from user "read tweets from Fred Jones" 804, the application reads desired tweets 818, a message is output to user "reply, continue, or stop?" 822, input is received via input device or verbal command to select choice 826, if stop application enters sleep mode 830. If "reply" logic continues to FIG. 14, step 506. If "continue' application reads desired tweets 818. At any point during output of tweet information/content, user can pause, resume, reply or skip 820. If an input from user upon waking application from sleep mode includes "read tweets" 806, an output is provided to the user "most recent or by name?" 808. Upon input received from user to select choice 810, if "most recent is selected" application reads desired (most recent) tweets 818, and continues logic as afore-described. If input choice 810 includes "name", a list of recent senders is output to user 812, user can pause, resume, reply or skip at any time 814, upon input received via input device or by verbal command to select choice 816, application reads desired tweets 818 and logic continues as described above.

FIG. 38 is a flow diagram illustrating an embodiment 1700 wherein a Facebook @ Message is initiated in discreet/private mode by a user. Upon waking the application from sleep mode 1702, an output is provided to the user "text, email, FB message, voicemail, call, tweet, read texts, read emails, audio, listen to voicemails?" 1704, wherein upon input received via input device 1706 to "Facebook® Message" an output is provided to user "you are in your discreet contacts list, chose another list?" 1708, upon negative/dissentive input received or no input received 1710, contacts are output in specified list to user 1716. Upon positive/affirmative input received 1710, other contact lists in electronic device, or connected cloud or other storage, and in this case Facebook are output to user 1712. Following input received via input device 1714, a contact list is chosen. Contacts are output in specified list to user 1716, and upon input received via input device 1718, a contact is chosen. Customizable preset messages of the system are output to the user 1720, upon input by user 1722 a message is chosen, an output to user occurs "read, send, save, or delete?" 1724, upon which following input received by input device 1728 to "read" the preset message is read 1726 to user, and logic returns to step 1724. If input received indicates "send", the preset message is sent to the contact 1734 and application enters sleep mode 1736. If input received is "save" message is saved as draft 1730 and application enters sleep mode 1736. If input received is "delete" message is deleted 1732, application enters sleep mode 1736.

FIG. 39 provides an example of a display screen wherein customization of user inputs may occur. These inputs are used, for example, to respond to communications received via the system through the responsive member. A user may choose to respond with the same content globally (all contacts) or may specify responses per contact list or per contact via the example customization display screen. In a non-limiting example, the user may elect to respond with a positive response via a thumbs up emoticon to a first contact associated, and with a negative/dissentive response via a thumbs down emoticon to the first contact. With regard to a second contact, the user may preselect a smiley face emoticon for a positive response, and a frowny face emoticon for a negative/dissentive response, for example. A third contact may receive a "Yes" for a positive response and a "No" for a negative/dissentive response. A third response may include a "maybe" response, which may include a third chosen emoticon, selected by the user or a phrase such as "Sorry, I'm busy right now. I'll get back to you soon." or "Call you back soon.". The responses may be associated with different responsive members, a combination of responsive members, or multiple triggering of responsive members in a certain time period selectable by a user to communicate via the system/application. A similar process would be followed by the user to customize pre-programmed content to be sent to initiate discreet conversations, to set Priority Mode words or phrases, and to select channels, stations or playlists for listening to audio options.

It should be borne in mind that all patents, patent applications, patent publications, technical publications, scientific publications, and other references referenced herein are hereby incorporated by reference in this application in order to more fully describe the state of the art to which the present invention pertains. While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A communication system comprising:
   a communication device to receive and emit verbal communications;
   an input device, the input device comprising a multi-way switch to accept an incoming call made to the communication device and to initiate a pre-recorded message instructing that responses during the incoming call will be answered by preset responses, the preset responses are selected by non-visual, non-verbal manipulation of the multi-way switch, said input device being in wireless communication with the communication device; and
   an output device in communication with the communication device for providing discreet audible communication to a user of the system,
   a processor upon which a tangible, non-transitory computer readable medium having program instructions executed by the processor occurs to:
   identify a caller of the incoming call;
   instruct the caller to types of communications answerable by the preset responses;
   provide the communication from the caller to the user in the caller's voice; and
   receive an input from the input device to initiate a preselected response to the caller, wherein the system provides communications to and from a user without a visual interface with the system.

2. The communication system according to claim 1, further comprising a storage device.

3. The communication system according to claim 2, wherein the communication device comprises a filter for incoming calls maintained in the storage device including calls allowed to be received and calls not allowed to be received when the filter is activated.

4. The communication system according to claim 3, wherein the storage device comprises one or more lists, such that the calls allowed to be received and calls not allowed to be received are filtered based on the one or more lists.

5. The communication system according to claim 1, wherein the program instructions are executed by the processor to:
   determine whether the incoming call is a call allowed to be received, wherein the processor detects if calls are a type of communication allowed to be received, and if the caller of the incoming call is on a preselected list of allowed callers, wherein if the incoming call is allowed to be received and the caller is on the preselected list of allowed callers, the caller information is transmitted to a user via the output device; and
   wherein if the processor detects either 1) calls are not a type of communication allowed to be received or 2) the caller of the incoming call is not on a preselected list of allowed callers, or 3) calls are a type of communication allowed to be received and the caller of the incoming call is on a preselected list of allowed callers and no input from the input device is received, or 4) calls are a type of communication allowed to be received and the caller of the incoming call is on a preselected list of allowed callers and a dissentive input from the input device is received, the call goes to voicemail.

6. The communication system according to claim 1, wherein the output device comprises a wearable headset, earpiece, bone conduction device, or earbud for transmitting discreet communication to the user.

7. The communication system according to claim 1, wherein the input device further comprises a wearable device.

8. The communication system according to claim 1, wherein the output device and/or input device comprises one device.

9. A communication system comprising:
   a communication device to receive and emit verbal communications;
   an input device, the input device comprising at least one tactile responsive member to accept an incoming call made to the communication device and to initiate a pre-recorded message instructing that responses during the incoming call will be answered by preset responses, the preset responses are selected by non-visual, non-verbal activation by manipulation of the at least one responsive member, said input device being in wireless communication with the communication device;
   an output device in communication with the communication device for providing audible communication to a user of the system covertly while in use, wherein the system provides communications to and from a user without a visual interface with the system;
   a storage device, wherein the communication device comprises a filter for incoming calls maintained in the storage device including calls allowed to be received and calls not allowed to be received when the filter is activated; and
   a processor upon which a tangible, non-transitory computer readable medium having program instructions executed by the processor occurs to:
   identify a caller of the incoming call;
   instruct the caller to types of communications answerable by the preset responses;
   provide the communication from the caller to the user in the caller's voice; and
   receive an input from the input device to initiate a preselected response to the caller.

10. The communications system of claim 9, wherein the tactile responsive member comprises a multi-way switch.

11. The communications system of claim 9, wherein more than one response is provided per responsive member.

* * * * *